(12) United States Patent  (10) Patent No.: US 7,697,106 B2
Sawasaki et al.  (45) Date of Patent: Apr. 13, 2010

(54) LIQUID CRYSTAL DISPLAY DEVICE AND METHOD OF MANUFACTURING THE SAME

(75) Inventors: Manabu Sawasaki, Kawasaki (JP); Takashi Takagi, Kawasaki (JP); Yoji Taniguchi, Kawasaki (JP); Hiroyasu Inoue, Kawasaki (JP); Susumu Nakano, Yonago (JP); Tomonori Tanose, Yonago (JP); Naonobu Matsui, Yonago (JP); Kazuyuki Hosokawa, Yonago (JP); Kazuhiko Sumi, Yonago (JP); Masahiro Ikeda, Kawasaki (JP); Naoshige Itami, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 41 days.

(21) Appl. No.: 09/759,424

(22) Filed: Jan. 12, 2001

(65) Prior Publication Data

US 2001/0026347 A1 Oct. 4, 2001

(30) Foreign Application Priority Data

Jan. 14, 2000 (JP) ............................ 2000-007176

(51) Int. Cl.
*G02F 1/1339* (2006.01)
*G02F 1/1333* (2006.01)
*G02F 1/1335* (2006.01)

(52) U.S. Cl. ...................... 349/155; 349/106; 349/129; 349/138

(58) Field of Classification Search ......... 349/106–108, 349/129, 138, 155–156
See application file for complete search history.

(56) References Cited

U.S. PATENT DOCUMENTS

| 5,040,875 | A | * | 8/1991 | Noguchi ..................... 349/143 |
| 5,434,690 | A | | 7/1995 | Hisataka et al. |
| 5,459,598 | A | | 10/1995 | Carrington |
| 5,815,232 | A | * | 9/1998 | Miyazaki et al. ............ 349/155 |
| 5,872,611 | A | | 2/1999 | Hirata et al. |
| 6,043,511 | A | * | 3/2000 | Kim ............................ 257/59 |
| 6,057,896 | A | * | 5/2000 | Rho et al. .................... 349/42 |
| 6,067,144 | A | | 5/2000 | Murouchi |
| 6,097,467 | A | * | 8/2000 | Fujimaki et al. ............ 349/155 |
| 6,281,960 | B1 | * | 8/2001 | Kishimoto et al. .......... 349/156 |
| 6,433,852 | B1 | * | 8/2002 | Sonoda et al. .............. 349/156 |
| 6,493,050 | B1 | * | 12/2002 | Lien et al. ................... 349/106 |

(Continued)

FOREIGN PATENT DOCUMENTS

EP  0 884 626  12/1998

(Continued)

*Primary Examiner*—Dung T. Nguyen
(74) *Attorney, Agent, or Firm*—Greer, Burns & Crain, Ltd.

(57) ABSTRACT

A liquid crystal display device of the present invention has a structure in which vertically aligned liquid crystal is sealed between a TFT substrate and a CF substrate. Pixel electrodes in which slits are provided are formed on the TFT substrate, while cell gap holding spacers and domain defining projections are formed on the CF substrate. For example, positive type photoresist is coated on a common electrode. Then, first exposure is executed by using a mask for light-shielding spacer forming regions and projection forming regions, and then second exposure is executed by using a mask for light-shielding the spacer forming regions. Then, the photoresist is developed. Accordingly, the spacers and the projections, each having a different height, can be formed simultaneously.

17 Claims, 63 Drawing Sheets

U.S. PATENT DOCUMENTS

| | | | |
|---|---|---|---|
| 6,501,529 B1 * | 12/2002 | Kurihara et al. | 349/160 |
| 6,522,379 B1 | 2/2003 | Ishihara et al. | |
| 6,661,488 B1 | 12/2003 | Takeda et al. | |
| 6,671,025 B1 * | 12/2003 | Ikeda et al. | 349/156 |
| 6,724,452 B1 | 4/2004 | Takeda et al. | |
| 6,836,308 B2 | 12/2004 | Sawasaki et al. | 349/129 |
| 6,879,364 B1 | 4/2005 | Sasaki et al. | |
| 7,136,140 B1 | 11/2006 | Inoue et al. | 349/191 |
| 7,167,224 B1 | 1/2007 | Takeda et al. | |
| 7,227,606 B2 | 6/2007 | Takeda et al. | |
| 7,245,345 B2 | 7/2007 | Sawasaki et al. | 349/155 |
| 7,304,703 B1 | 12/2007 | Takeda et al. | |
| 2002/0093617 A1 * | 7/2002 | Matsuyama et al. | 349/156 |
| 2002/0159012 A1 | 10/2002 | Yamada | |

FOREIGN PATENT DOCUMENTS

| | | |
|---|---|---|
| JP | 5289105 | 11/1993 |
| JP | 7114020 | 5/1995 |
| JP | 07-175050 | 7/1995 |
| JP | 10068955 | 3/1998 |
| JP | 10-153797 | 6/1998 |
| JP | 11064837 | 3/1999 |
| JP | 11-242225 | 9/1999 |
| JP | 11-248921 | 9/1999 |
| JP | 11-258605 | 9/1999 |
| JP | 11264968 | 9/1999 |
| JP | 11-311705 | 11/1999 |
| JP | 2000-155317 | 6/2000 |
| JP | 2000-169160 | 6/2000 |
| JP | 2001-083517 | 3/2001 |
| JP | 2002-107748 | 4/2002 |
| JP | 2000-169160 | 6/2002 |
| JP | 2002-169160 | 6/2002 |
| KR | 1999-006951 | 1/1999 |

* cited by examiner

SHIFT A MASK BY THREE PIXELS

SHIFT A MASK BY THREE PIXELS

① STAGE TRACE OCCURRING AREA (STRONG)
② STAGE TRACE OCCURRING AREA (WEAK)

① "B" PIXEL OPENING AREA
② "R" PIXEL OPENING AREA
③ "G" PIXEL OPENING AREA
④ "B" EDGE (RB OVERLAP)
⑤ "R" EDGE (RB OVERLAP)
⑥ "G" EDGE (RG OVERLAP)

① "B" PIXEL OPENING AREA
② "R" PIXEL OPENING AREA
③ "G" PIXEL OPENING AREA
④ "B" EDGE (RB OVERLAP)
⑤ "R" EDGE (RB OVERLAP)
⑥ "G" EDGE (RG OVERLAP)

① (ii)"G" EDGE (RGB OVERLAP)
② (ii)"R" EDGE (RGB OVERLAP)
③ (ii)"B" EDGE (RGB OVERLAP)
④ (i)"G" EDGE (RG OVERLAP)
⑤ (i)"R" EDGE (RG OVERLAP)
⑥ (i)"B" EDGE (GB OVERLAP)

FIG. 53

| SAMPLE NUMBER | No.1 | No.2 | No.3 | No.4 | No.5 |
|---|---|---|---|---|---|
| DENSITY cm$^{-2}$ | 141 | 283 | 567 | 1133 | 3400 |
| x μm | 0.57 | 0.38 | 0.25 | 0.17 | 0.09 |
| x/d | 0.143 | 0.095 | 0.063 | 0.043 | 0.023 |
| HIGH TEMPERATURE EXPANSION 60°C | NOT OCCURRED | NOT OCCURRED | NOT OCCURRED | OCCURRED | OCCURRED |
| LOW TEMPERATURE FOAMING −20°C | NOT OCCURRED | NOT OCCURRED | NOT OCCURRED | OCCURRED | OCCURRED |

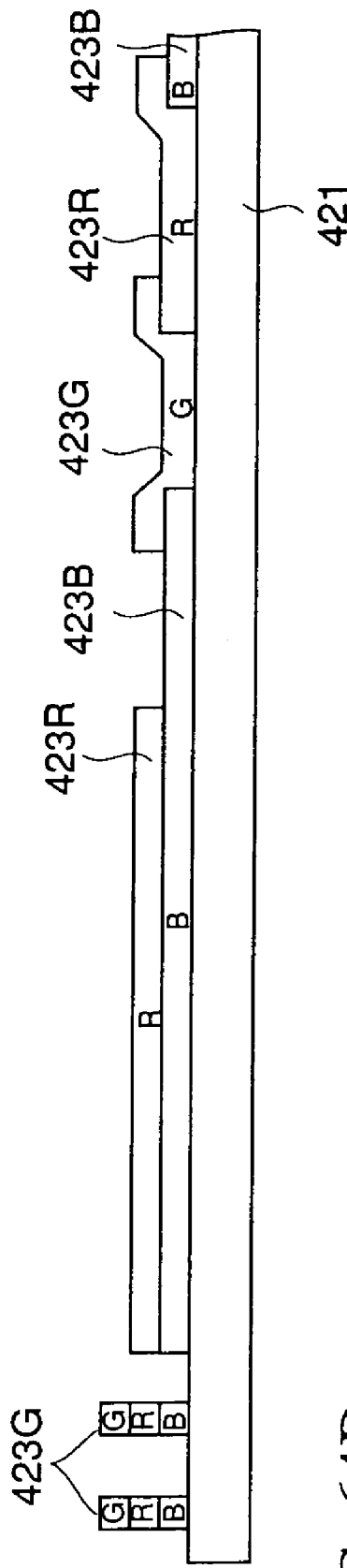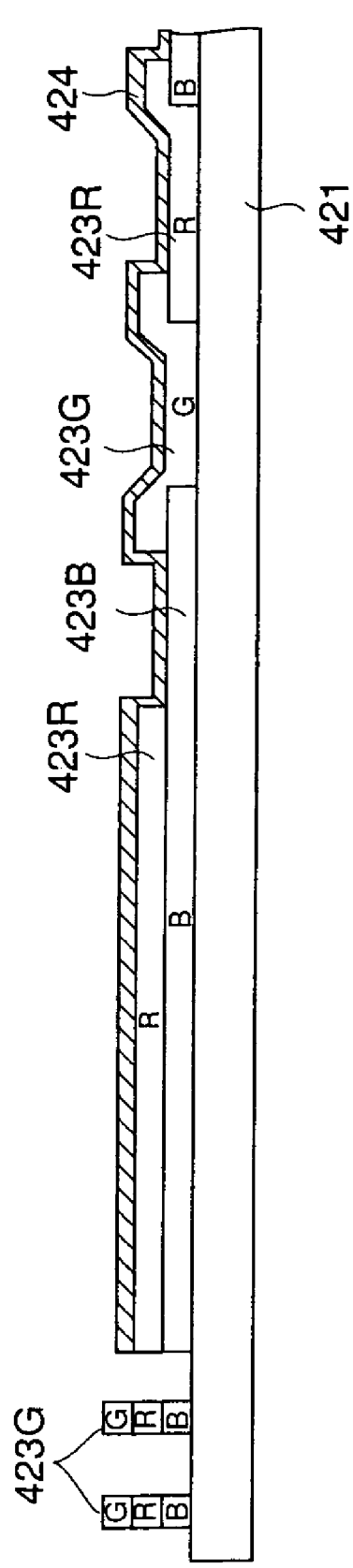

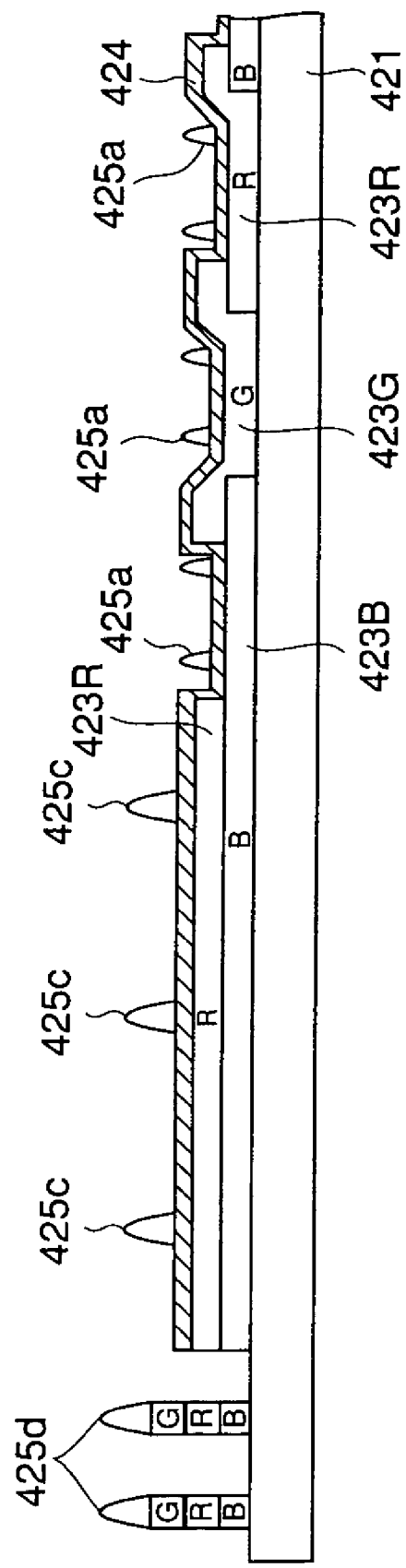

LIQUID CRYSTAL DISPLAY DEVICE AND METHOD OF MANUFACTURING THE SAME

BACKGROUND OF THE INVENTION

1. Field of the Invention

The present invention relates to a liquid crystal display device capable of providing color display and having excellent display quality, and a method of manufacturing the same.

2. Description of the Prior Art

The active matrix liquid crystal display device can prevent the cross-talk by providing a switching element, that is turned off so as to cut off a signal when it is not selected, to respective pixels, and can exhibit excellent display characteristic rather than the simple matrix liquid crystal display device. In particular, the liquid crystal display device using TFT (Thin Film Transistor) as the switching element exhibits the excellent display characteristic equivalent to CRT (Cathode-Ray Tube) since the TFT has the high driving capability.

Normally, the liquid crystal display device has a structure in which the liquid crystal is sealed between two transparent substrates. Out of two surfaces (opposing surfaces) of these transparent substrates that oppose to each other, the common electrode, the color filter, the alignment film, etc. are formed on one surface side while the TFT, the pixel electrode, the alignment film, etc. are formed on the other surface side. In addition, polarizing plates are stuck onto an opposing surface and an opposite surface of the transparent substrate respectively. In the case of the TN (Twisted Nematic) liquid crystal display device, for example, two sheets of polarizing plates are arranged such that their polarization axes of the polarizing plates intersect orthogonally with each other. This liquid crystal display device is operated in such a mode that the light is passed through when the electric field is not applied and the light is shielded when the electric field is applied, i.e., the normally white mode. Also, in the case that the polarization axes of two sheets of the polarizing plates are aligned in parallel, this liquid crystal display device is operated in the normally black mode. In the following, the substrate on which the TFT, the pixel electrode, etc. are formed is called a TFT substrate and the substrate on which the common electrode, the color filter, etc. are formed is called a CF substrate.

In recent years, the liquid crystal display device is required to achieve the higher performance. Especially, the improvement in the visual characteristic and the display quality is strongly requested. The VA (Vertically Aligned) liquid crystal display device, especially MVA (Multi-domain Vertically Aligned) liquid crystal display device, is promising as the display device to satisfy such requirement.

FIG. 1 is a sectional view showing an example of the MVA liquid crystal display device in the prior art.

This liquid crystal display device consists of a TFT substrate 510, a CF substrate 520, and a vertically aligned liquid crystal 529 that is sealed between these substrates 510, 520. Also, the polarizing plates (not shown) are arranged under the TFT substrate 510 and on the CF substrate 520 respectively such that their polarization axes intersect orthogonally with each other, for example.

The TFT substrate 510 is formed as follows. That is, a plurality of pixel electrodes 516 that are aligned in a matrix fashion, the TFTs (not shown) connected to the pixel electrodes 516, data bus lines and gate bus lines (both not shown) for supplying the image data to the pixel electrodes 516 via the TFTs are formed on the transparent glass substrate 511. The pixel electrodes 516 are formed of transparent conductor such as ITO (Indium-Tin Oxide).

Also, domain defining projections 517 are formed on the pixel electrode 516. In addition, surfaces of the pixel electrodes 516 and the projections 517 are covered with an alignment film (not shown) formed of polyimide, or the like.

In contrast, the CF substrate 520 is formed as follows. That is, a black matrix 522 made of Cr (chromium), or the like is formed on the lower surface side of the glass substrate 521, and regions between the pixels are light-shielded by the black matrix 522. Also, any one of red (R), green (G), and blue (B) color filters 523 is formed every pixel on the lower surface side of the glass substrate 521. A common electrode 524 made of transparent conductor such as ITO, or the like is formed under the color filter 523. Domain defining projections 525 are formed under the common electrode 524. Also, surfaces of the common electrode 524 and the projections 525 are covered with the alignment film (not shown) formed of polyimide, or the like.

In the liquid crystal display device constructed as above, when the voltage is not applied, liquid crystal molecules 529a are aligned in the vertical direction to the alignment film. In this case, since the incident light passed through the polarizing plates from the lower side of the TFT substrate 510 is cut off by the polarizing plates arranged over the CF substrate 520, the display device exhibits the dark display. In contrast, when the sufficient voltage is applied between the pixel electrodes 516 and the common electrode 524, the liquid crystal molecules 529a are aligned in the perpendicular direction to the alignment film, as shown in FIG. 2. In this case, the liquid crystal molecules 529a are tilted in different directions on both sides of the projections 517, 525, so that alignment division (multi-domain) can be achieved. In this state, since the incident light passed through the polarizing plates from the lower side of the TFT substrate 510 is passed through between the polarizing plates arranged over the CF substrate 520, the display device exhibits the light display. The desired image can be displayed on the liquid crystal display device by controlling the applied voltage every pixel. Also, it is possible to suppress the leakage of the light along the oblique direction by the above alignment division and thus the visual characteristic can be improved.

In the above example, the case is explained where the projections are formed on both the TFT substrate 510 and the CF substrate 520. As shown in FIG. 3, the alignment division can be achieved similarly by providing slits 516a in the electrodes on one substrate side (in FIG. 3, the pixel electrode on the TFT substrate side).

Normally, in the liquid crystal display device in the prior art, spherical or cylindrical spacers whose diameter is uniform are employed to maintain a clearance between the pixel electrode and the common electrode (cell gap) constant. The spacers are formed of resin, ceramic, or the like, and are scattered on any one substrate when the TFT substrate 510 and the CF substrate 520 are stuck together. Hence, the cell gap between the pixel electrode and the common electrode is decided by the diameter of the spacer.

In Patent Application Publication (KOKAI) Hei 10-68955 and Patent Application Publication (KOKAI) Hei 11-264968, such an approach is set forth that cylindrical members formed by the photoresist is employed as the spacers in order to avoid generation of faults such as non-uniformity of the cell gap due to the spherical or rod-like spacers.

SUMMARY OF THE INVENTION

It is an object of the present invention to provide a liquid crystal display device capable of obtaining good display quality rather than the prior art, a method of manufacturing the same, a color filter substrate, and a method of manufacturing the same.

A liquid crystal display device set forth in claim 1 of the present invention provides a liquid crystal display device in which vertically aligned liquid crystal (negative type liquid crystal) is sealed between a pair of substrates, which comprises cell gap adjusting spacers formed on at least one of the pair of substrates, for maintaining a cell gap constant, and domain defining projections formed on a substrate side, to which the spacers are formed, with same material as the spacers by same steps to have a height lower than the spacers.

In the present invention, the spacers for maintaining the cell gap constant and the projections whose height is lower than the spacers are provided, and the spacers and the projections are formed of the same material and formed by the same steps.

BRIEF DESCRIPTION OF THE DRAWINGS

FIG. 53 is a table showing results to examine presences of high temperature expansion and low temperature foaming by changing a spacer distribution density;

DESCRIPTION OF THE PREFERRED EMBODIMENTS

Embodiments of the present invention will be explained in detail with reference to the accompanying drawings hereinafter.

First Embodiment

Figure 4:
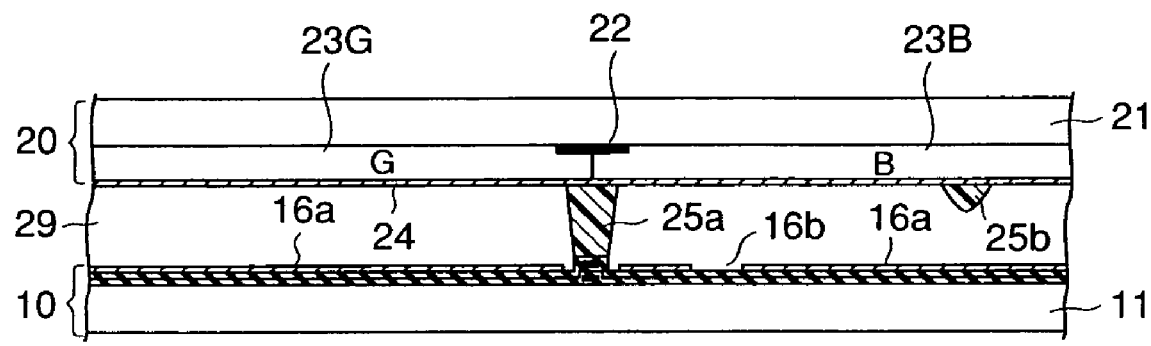
FIG. 4 is a sectional view showing a liquid crystal display device according to a first embodiment of the present invention.
Figure 5:
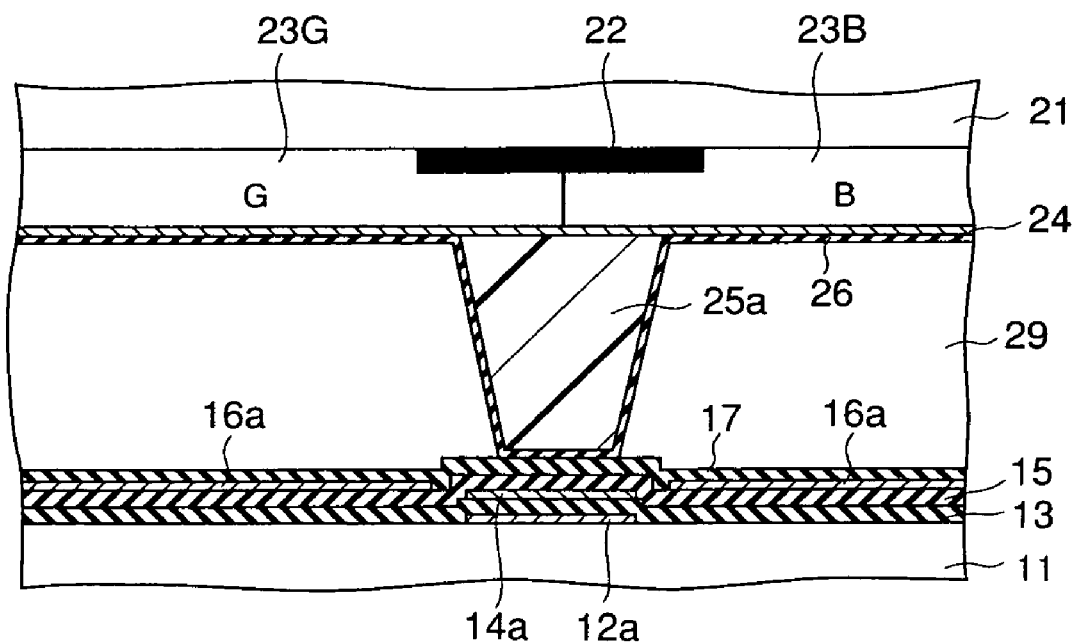
FIG. 5 is an enlarged sectional view showing a spacer forming region of the liquid crystal display device shown in FIG. 4.
Figure 6:
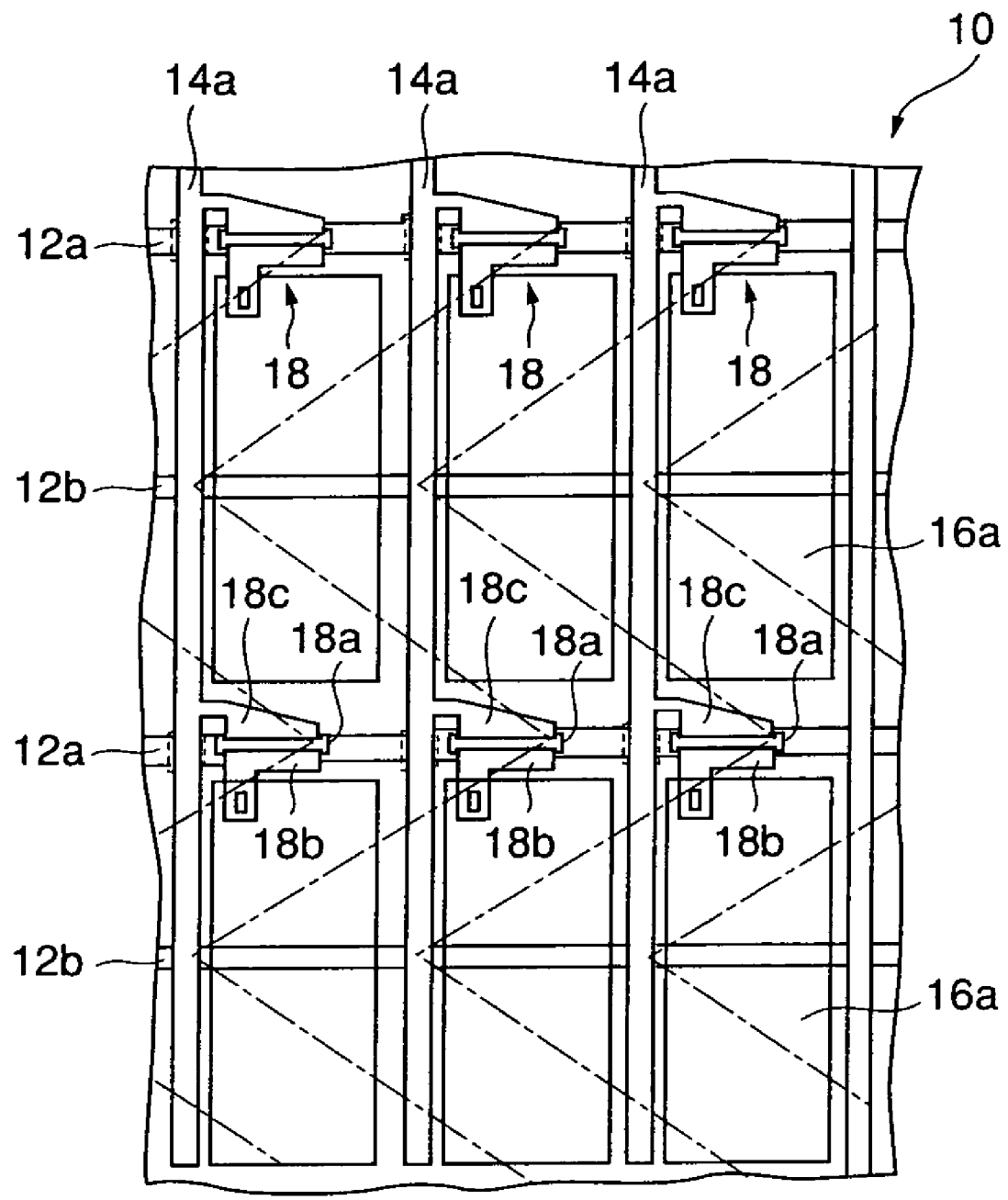
FIG. 6 is a plan view showing a TFT substrate of the liquid crystal display device shown in FIG. 4.
Figure 7:
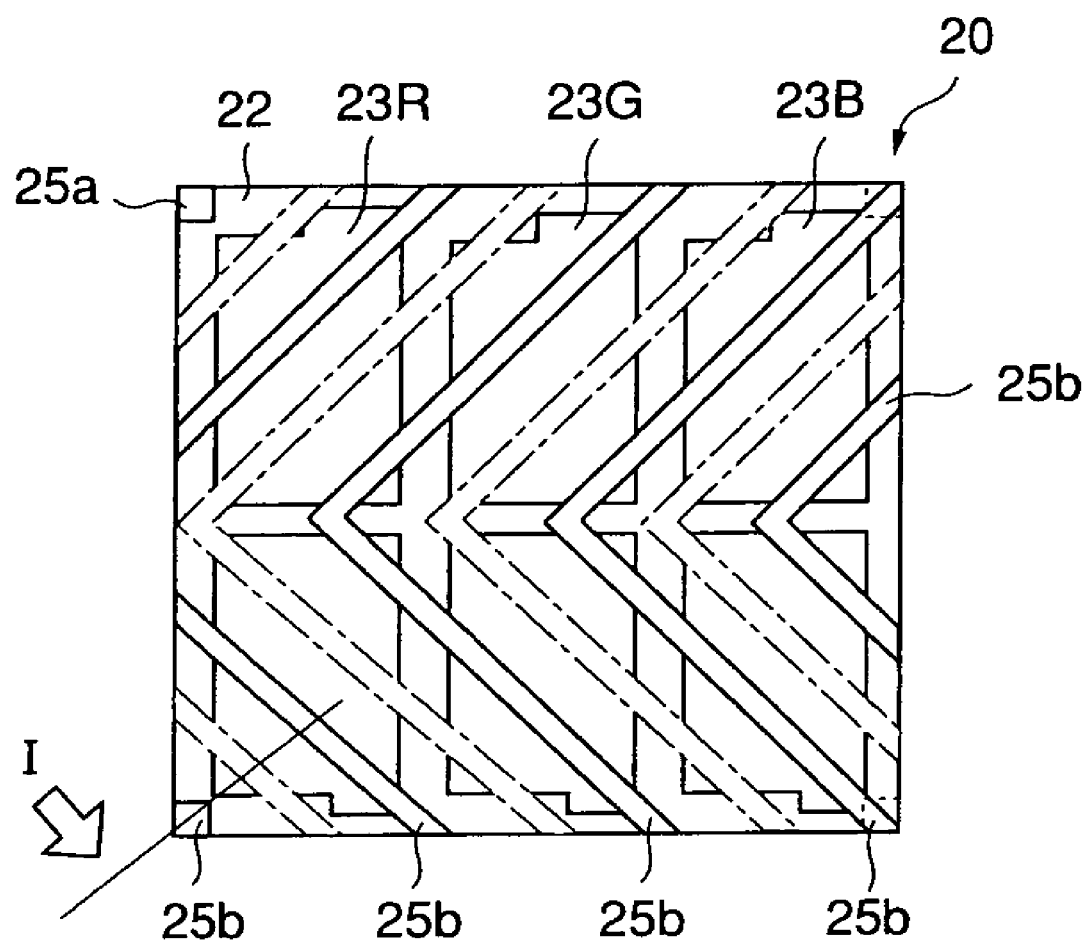
FIG. 7 is a plan view showing a CF substrate of the liquid crystal display device shown in FIG. 4.

FIG. 4 is a sectional view showing a liquid crystal display device according to a first embodiment of the present invention. FIG. 5 is an enlarged sectional view showing a spacer forming region of the liquid crystal display device shown in FIG. 4. FIG. 6 is a plan view showing a TFT substrate of the liquid crystal display device shown in FIG. 4. FIG. 7 is a plan view showing a CF substrate of the liquid crystal display device shown in FIG. 4. In this case, FIG. 4 and FIG. 5 are sectional views taken along a line shown by an arrow I in FIG. 7.

The liquid crystal display device according to the first embodiment has a structure in which a vertically aligned liquid crystal (negative type liquid crystal) 29 is sealed between a TFT substrate 10 and a CF substrate 20. Also, the polarizing plates (not shown) are arranged under the TFT substrate 10 and on the CF substrate 20 respectively. These polarizing plates are arranged such that their polarization axes intersect orthogonally with each other.

The TFT substrate 10 consists of a substrate (referred simply to as a "glass substrate" hereinafter) 11 formed of transparent material such as glass, plastics, etc., pixel electrodes 16a, insulating films 13, 15, an alignment film 17, and the like. That is, as shown in FIG. 6, a plurality of gate bus lines 12a are formed in parallel mutually on the glass substrate 11. Also, auxiliary capacitance bus lines 12b are formed between the gate bus lines 12a respectively. The gate bus lines 12a and the auxiliary capacitance bus lines 12b are covered with an insulating film (gate insulating film) 13 formed on the upper surface side of the glass substrate 11 (see FIG. 5). A silicon film 18a serving as an active layer of the TFT 18 is selectively formed on the insulating film 13. The silicon film 18a is formed of amorphous silicon or polysilicon.

The silicon film 18a is covered with an insulating film (not shown), and then a plurality of data bus lines 14a, and source electrodes 18b and drain electrodes 18c of the TFTs 18 are formed on the insulating film. The data bus lines 14a are arranged to intersect orthogonally with the gate bus lines 12a. Also, rectangular regions partitioned by the gate bus lines 12a and the data bus lines 14a are regions acting as respective pixels.

The data bus lines 14a and the source electrodes 18b and the drain electrodes 18c are covered with an insulating film (final protection film) 15. Then, pixel electrodes 16a made of ITO are formed pixel by pixel on the insulating film 15. The pixel electrodes 16a are electrically connected to the source electrodes 18b via contact holes formed in the insulating film 15.

Slits 16b are formed in the pixel electrodes 16a along a zigzag dot-dash line shown in FIG. 6. Also, a vertical alignment film 17 is formed on the overall upper surface of the glass substrate 11, and surfaces of the pixel electrodes 16a are covered with this vertical alignment film 17.

In contrast, the CF substrate 20 consists of a glass substrate 21, a black matrix 22 formed on the lower surface side of the glass substrate 21, color filters 23R, 23G, 23B, a common electrode 24, spacers 25a, projections 25b, a vertical alignment film 26, and the like. That is, as shown in FIG. 5, the black matrix 22 made of a thin film of chromium (Cr) is formed on a lower surface of the glass substrate 21. As shown in FIG. 7, the black matrix 22 is shaped to cover the gate bus lines 12a, the data bus lines 14a, the auxiliary capacitance bus lines 12b, and the TFTs 18 on the TFT substrate 20.

Also, the red (R), green (G), and blue (B) color filters 23R, 23G, 23B are formed on the lower surface side of the glass substrate 21. These color filters 23R, 23G, 23B are arranged at positions to oppose to the pixel electrodes 16a on the TFT substrate 10 such that any one of the red (R), green (G), and blue (B) color filters 23R, 23G, 23B corresponds to one pixel electrode 16a.

The common electrode 24 made of ITO is formed under the black matrix 22 and the color filters 23R, 23G, 23B. Also, cell gap adjusting spacers 25a and domain defining projections 25b are formed under the common electrode 24. As shown in FIG. 7, the projections 25b are formed zigzag, and the spacers 25a are arranged in the neighborhood of the intersecting positions of the gate bus lines 12a and the data bus lines 14a. A height of the spacer 25a (height from a surface of the common electrode) is about 4.0 μm and is formed of insulating resin. Also, a height of the projection 25b (height from the surface of the common electrode) is about 1.5 μm and is formed of the same material as the spacer 25a, as described later. In FIG. 7, a dot-dash line indicates the position of the slit 16b provided in the pixel electrode 16a on the TFT substrate 10. The vertical alignment film 26 is formed under the common electrode 24, and surfaces of the spacers 25a and the projections 25b are covered with the vertical alignment film 26.

In the first embodiment, the projections 25b on the CF substrate 20 side are formed to have a height of about 1.5 μm, and the spacers 25a are formed to have a height of about 4.0 μm. Then, as shown in FIG. 4, top end portions of the spacers 25a come into contact with the TFT substrate 10 to maintain the cell gap constant. Therefore, in the first embodiment, the spherical or rod-like spacers required in the prior art are not needed and thus the step of scattering the spacers can be omitted. Also, since a distance between the pixel electrodes 16a on the TFT substrate 10 side and the common electrode 24 on the CF substrate 20 side can be maintained by the spacers 25a formed at predetermined positions, short-circuit between the pixel electrodes 16a and the common electrode 24 can be avoided without fail. In addition, in case the spherical or rod-like spacers are used like the liquid crystal display device in the prior art, the liquid crystal molecules are aligned along the surfaces of the spacers in the neighborhood of the spacers, and thus the alignment is disordered to cause the display failure. In contrast, in the first embodiment, since the spherical or rod-like spacers are not used, the good display quality can be achieved.

Further, in the first embodiment, since the alignment division can be achieved by the slits 16b provided in the pixel electrodes 16a on the TFT substrate 10 side and the projections 25b provided on the CF substrate 20 side, the good visual characteristic and the good contrast characteristic can be obtained.

Moreover, in the first embodiment, the cell gap can be maintained constant by the spacers 25a provided on the CF substrate 20 side. These spacers 25a are fixed onto the common electrode 24 to cover the area of both adjacent edges of respective adjacent color filters 23G, 23B (as well as 23R, not shown), and thus the cell gap is never changed by the vibration and the impact. Accordingly, degradation in the display quality due to the movement of the spacers can be avoided.

A method of manufacturing the liquid crystal display device according to the first embodiment will be explained hereunder.

FIGS. 8A to 8F, FIGS. 9A and 9B, FIGS. 10A and 10B, and FIG. 11 show the method of manufacturing the CF substrate of the liquid crystal display device according to the first embodiment in the order of step.

Figure 8A:
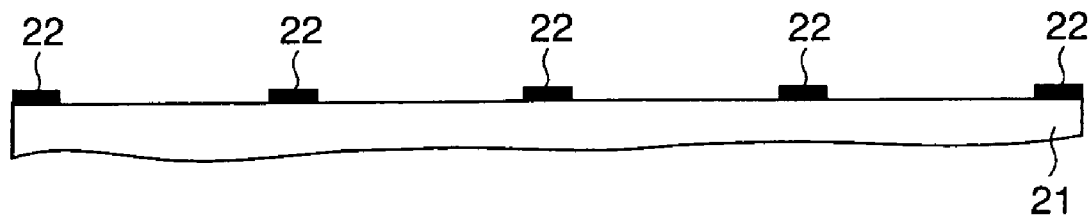
FIGS. 8A to 8F are sectional views (#1) showing a method of manufacturing the CF substrate of the liquid crystal display device according to the first embodiment.

First, as shown in FIG. 8A, a low reflection Cr (chromium) film is formed on one surface (upper surface in FIG. 8A) of the transparent substrate 21, and then positive type novolak-based photosensitive resist is coated on the Cr film. Then, the Cr film is left only in a predetermined region by exposing selectively this resist by using a predetermined mask and then applying the developing process to the resist. As a result, the black matrix 22 consisting of the Cr film is formed.

Figure 8B:
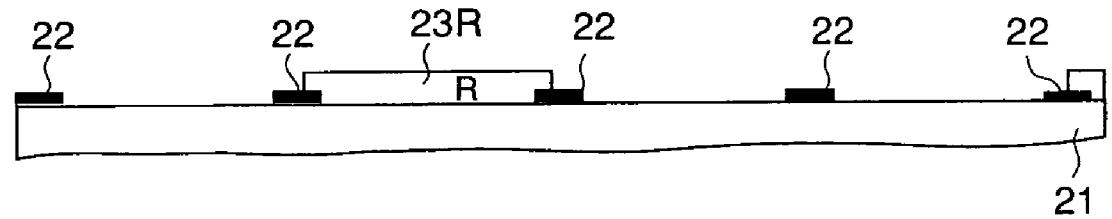

Then, as shown in FIG. 8B, the red color filter 23R of about 1.5 μm thickness is formed on red pixel portions by coating the pigment dispersed type red photosensitive resist on the overall upper surface of the substrate 21 and then exposing/developing it.

Figure 8C:
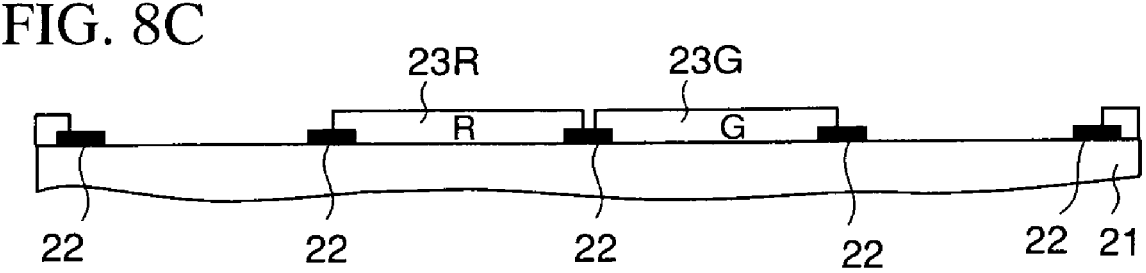

Then, as shown in FIG. 8C, the green color filter 23G of about 1.5 μm thickness is formed on green pixel portions by coating the pigment dispersed type green photosensitive resist on the overall upper surface of the substrate 21 and then exposing/developing it.

Figure 8D:
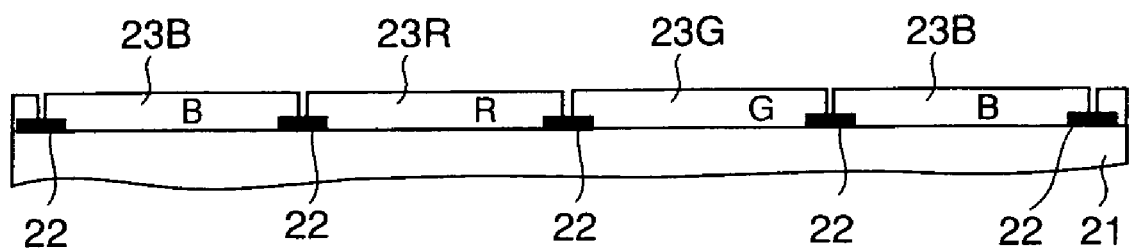

Then, as shown in FIG. 8D, the blue color filter 23B of about 1.5 μm thickness is formed on blue pixel portions by coating the pigment dispersed type blue photosensitive resist on the overall upper surface of the substrate 21 and then exposing/developing it.

Figure 8E:
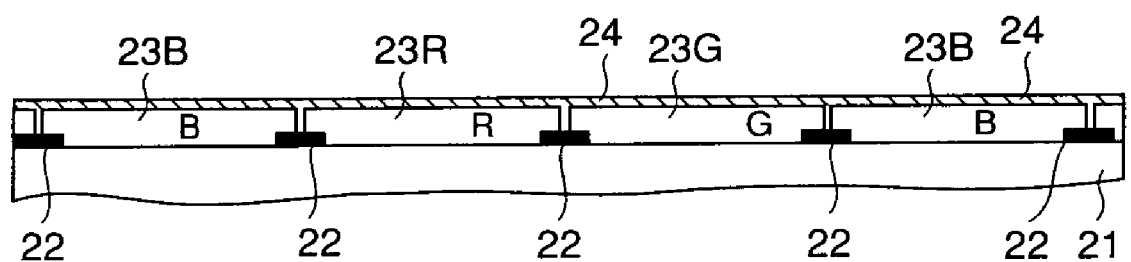

Then, as shown in FIG. 8E, the common electrode 24 is formed by forming ITO on the overall upper surface of the substrate 21 to have a thickness of about 0.15 μm.

Figure 8F:
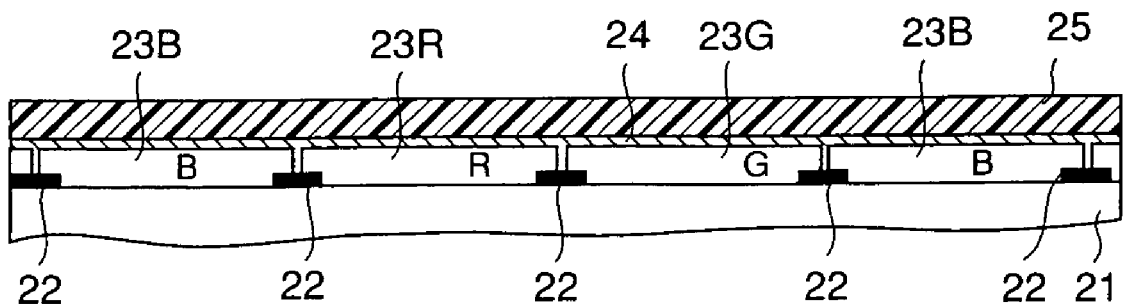

Then, as shown in FIG. 8F, the positive type novolak-based photosensitive resist 25 is coated on the common electrode 24 by the spin coating method to have a thickness of about 4.0 μm, and then prebaked.

Figure 9A:
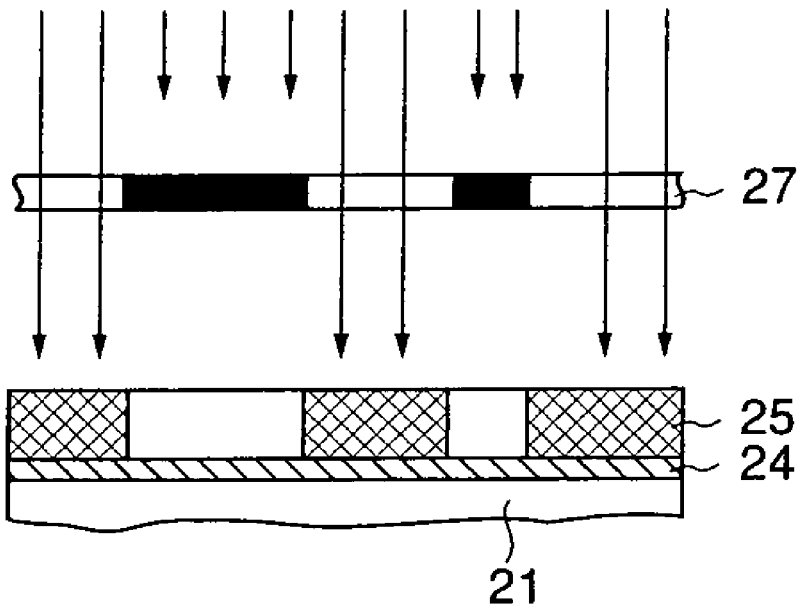
FIGS. 9A and 9B are sectional views (#2) showing a method of manufacturing the CF substrate of the liquid crystal display device according to the first embodiment.

Then, as shown in a schematic view of FIG. 9A, the resist 25 is subjected to the proximity exposure by using a large size mask 27 that can light-shield the spacer forming portions and the projection forming portions. An exposure at this time must be set to such an extent that exposed portions of the resist 25 are not left after the developing process. In FIG. 9A, shaded portions of the resist 25 show the exposed portions. Also, in FIG. 9A, illustration of the black matrix 22 and the color filters 23R, 23G, 23B is omitted.

Figure 9B:
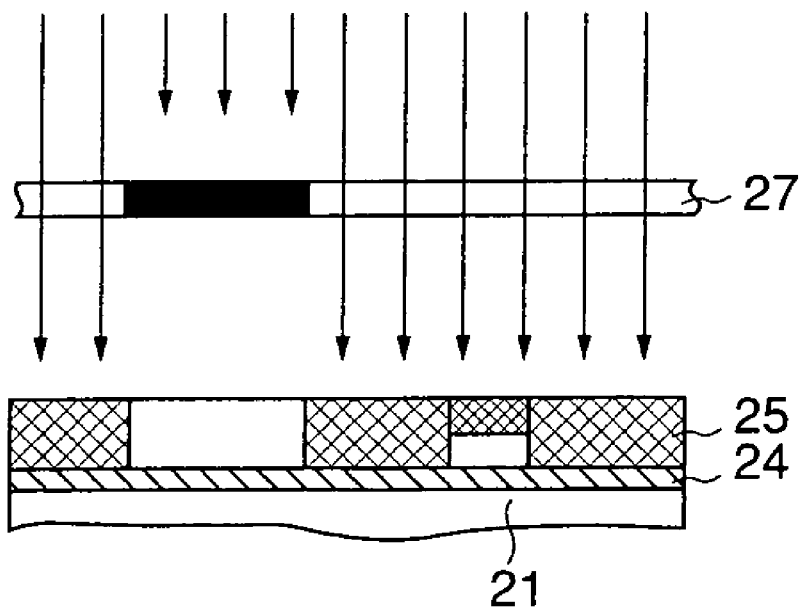

Then, as shown in a schematic view of FIG. 9B, the resist 25 is subjected to the proximity exposure by using a large size mask 28 that can light-shield the spacer forming portions. An exposure at this time must be set to such an extent that the exposed portions of the resist 25 (projection forming portions) are left to have a thickness of 1.5 µm after the developing process.

Figure 10A:
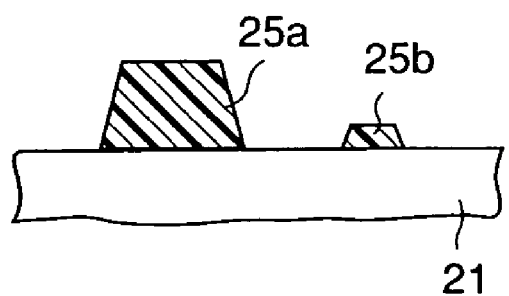
FIGS. 10A and 10B are sectional views (#3) showing a method of manufacturing the CF substrate of the liquid crystal display device according to the first embodiment.
Figure 10B:
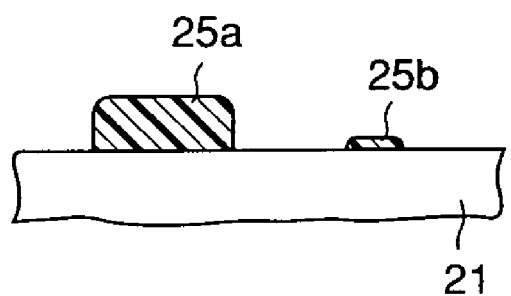
Figure 11:
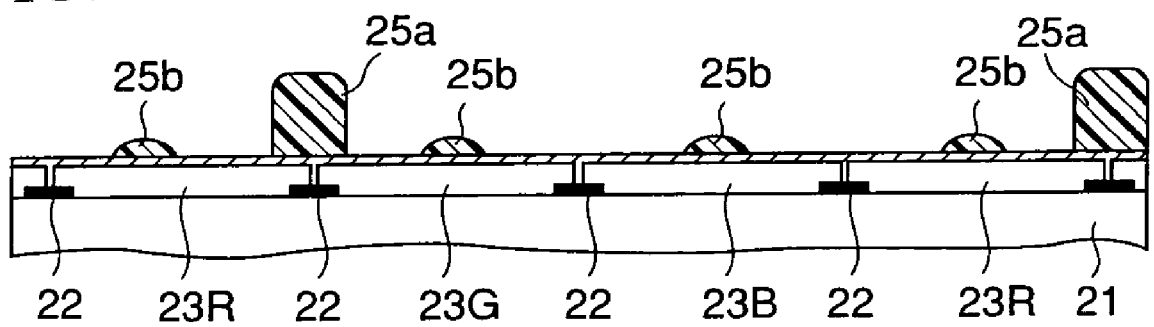
FIG. 11 is a sectional view (#4) showing a method of manufacturing the CF substrate of the liquid crystal display device according to the first embodiment.

Then, the resist 25 is shower-developed by using the TMAH (tetramethylammoniumhydrooxide) alkali developer having a concentration of 2.2%. Accordingly, as shown in FIG. 10A, the spacers 25a and the projections 25b, that have different heights, are formed simultaneously by using the resist 25. After this, the substrate 21 is post-baked at the temperature of 200° C. for about one hour by putting the it into a clean oven. Therefore, as shown in FIG. 10B, shapes of the spacers 25a and the projections 25b are slightly changed because the resist resin is softened. A sectional shape of the CF substrate 20 after the post baking is shown in FIG. 11.

Then, the alignment film 26 (see FIG. 5) is formed on the overall upper surface of the substrate 21, and surfaces of the common electrode 24, the spacers 25a, and the projections 25b are covered with the alignment film 26. Accordingly, the CF substrate is completed.

In contrast, the TFT substrate 10 is formed according to the well known method. That is, the gate bus lines 12a and the auxiliary capacitance bus lines 12b are formed on the glass substrate 11, and then the insulating film (gate insulating film) 13 is formed thereon. Then, the silicon film 18a acting as the active layer of the TFT 18 is formed on the insulating film 13, and then the data bus lines 14a and the source electrodes 18b and the drain electrodes 18c of the TFTs 18 are formed (see FIG. 5, FIG. 6).

Then, the insulating film (final protection film) 15 is formed on the overall upper surface of the glass substrate 11, and then the pixel electrodes 16a made of ITO are formed thereon. At this time, the slits 16b are formed in the pixel electrodes 16a along a zigzag line shown in FIG. 6. Then, the alignment film 17 is formed on the overall upper surface of the substrate 11 and the surfaces of the pixel electrodes 16a are covered with the alignment film 17. Accordingly, the TFT substrate 10 is completed.

As shown in FIG. 4 and FIG. 5, the TFT substrate 10 and the CF substrate 20 constructed in this manner are arranged such that their surfaces on which the alignment films 17, 26 are formed are opposed mutually to bring top end portions of the spacers 25a into contact with the regions between the pixels (regions at which the gate bus lines and the data bus lines intersect with each other). Then, sealing material is coated on the outside of the display regions on at least one of the TFT substrate 10 and the CF substrate 20 such that the TFT substrate 10 and the CF substrate 20 are jointed together by the sealing material. Then, the liquid crystal is injected into a space between the TFT substrate 10 and the CF substrate 20 and then a liquid crystal injection port is stopped up by the resin. Accordingly, the liquid crystal display device can be completed.

In the first embodiment, as shown in FIGS. 9A and 9B, since the spacers 25a are formed by exposing and developing the photoresist 25, the spacers 25a can have a uniform height and can be arranged at predetermined positions. Hence, in the first embodiment, there is an advantage such that, irrespective of the presence of the domain defining projections 25b, the cell gap can be maintained constant over the entire display region rather than the prior art method in which the spherical or cylindrical spacers are scattered. Therefore, the display quality can be improved rather than the prior art. Also, in the first embodiment, since the common electrode 24 is formed on the substrate 21 side closer than the spacers 25a, a distance between the common electrode 24 and the pixel electrodes 16a and thus a possibility of shirt-circuit is small.

In addition, in the first embodiment, since the spacers 25a and the projections 25b having a different height respectively can be formed simultaneously by exposing the resist 25 twice while using two types of masks 27, 28, the increase in the number of manufacturing steps can be avoided. Accordingly, the liquid crystal display device having the excellent visual characteristic can be easily manufactured.

As described above, if the positive type resist is employed to form the spacers 25a and the projections 25b, it is preferable that either the resist having a long exposure time or the positive resist having a large molecular weight should be employed to loosen the reduction in film thickness (a reduction rate of the resist film thickness per unit time) in the resist development. Otherwise, the increase of the prebaking temperature or the decrease of the concentration of the liquid developer is effective to loosen the reduction of film thickness in the development.

Further, in the above example, the novolak-based resist is employed as material to form the spacers 25a and the projections 25b, but the spacers 25a and the projections 25b are not limited to such material. For example, acrylic resin resist or epoxy resin resist may be employed as material of the spacers 25a and the projections 25b. In addition, the negative type photosensitive resist may be employed in place of the positive resist.

Moreover, in the above example, the case is explained where the spacers 25a and the projections 25b are formed on the CF substrate 20 side. But the spacers and the projections are formed on the TFT substrate side. In this case, the slits or the projections are formed in or on the common electrode 24 on the CF substrate 20 side.

Second Embodiment

A second embodiment of the present invention will be explained hereunder. A difference of the second embodiment from the first embodiment resides in that the method of forming the spacers 25a and the projections 25b on the CF substrate 20 is different. Since other configurations are basically similar to the first embodiment, their redundant explanation of overlapped portions will be omitted.

Figure 12A:
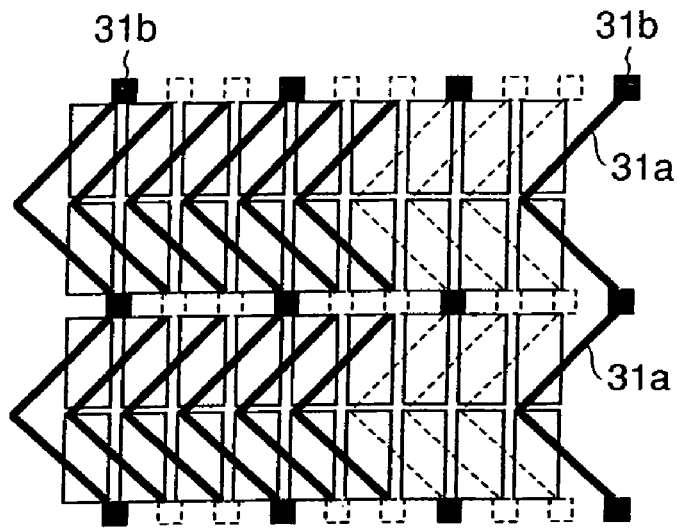
FIGS. 12A to 12C are plan views showing a method of manufacturing a CF substrate of a liquid crystal display device according to a second embodiment of the present invention, wherein positional relationships between a light shielding pattern of the mask and pixels are shown.
Figure 12B:
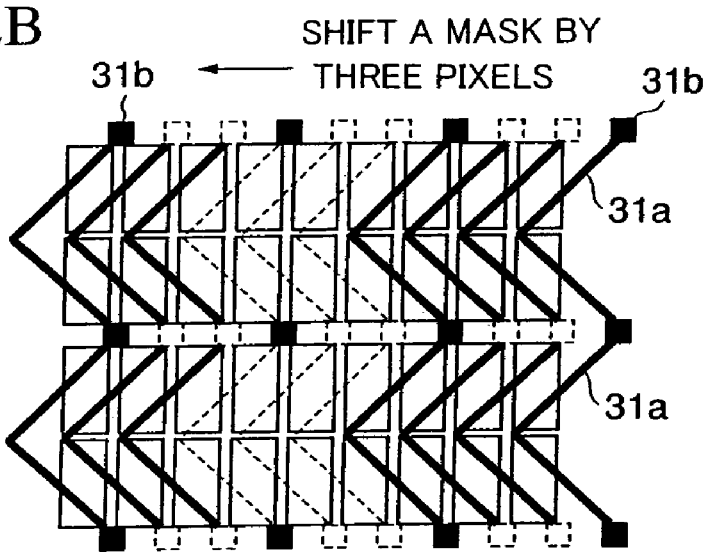
Figure 12C:
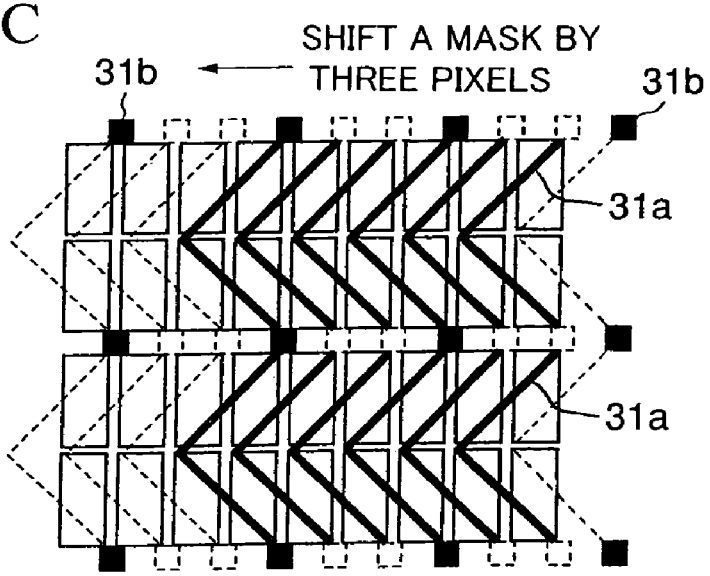
Figure 13:
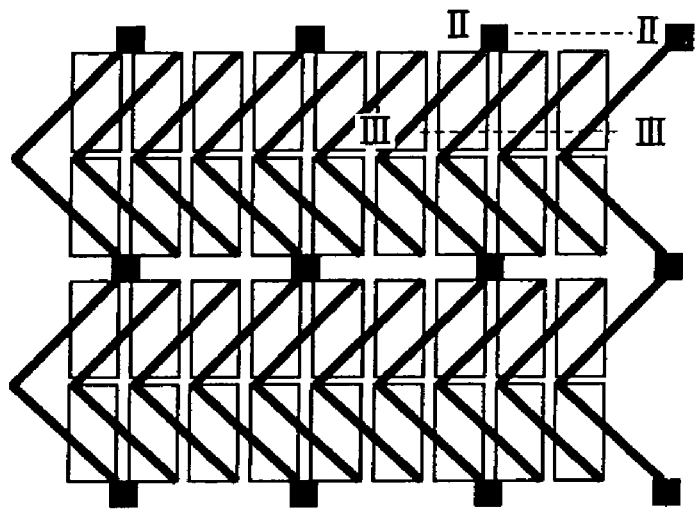
FIG. 13 is a plan view showing a method of manufacturing the CF substrate of the liquid crystal display device according to the second embodiment, wherein formed patterns of the spacers and the projections are shown.
Figure 14A:
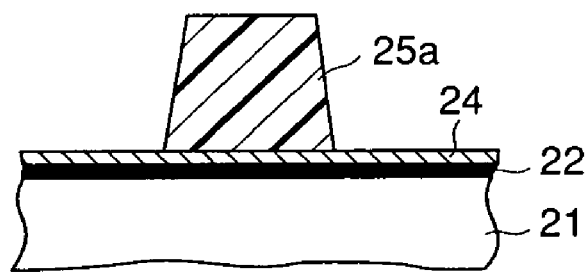
FIG. 14A is a sectional view taken along a II-II line in FIG. 13.
Figure 14B:
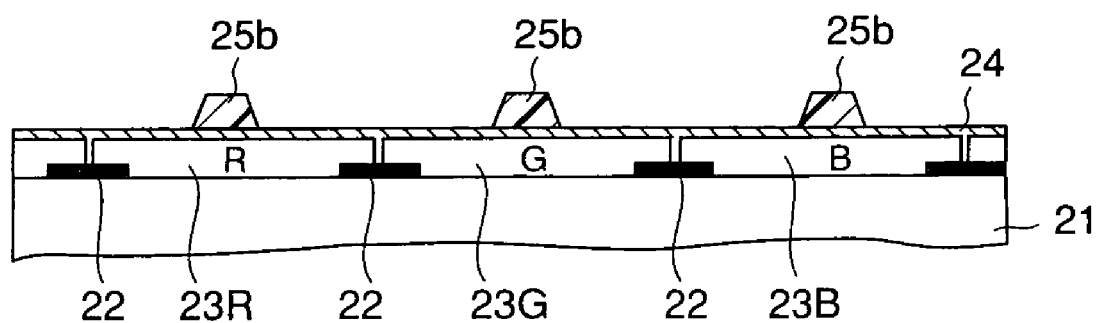
FIG. 14B is a sectional view taken along a III-III line in FIG. 13.
Figure 15A:
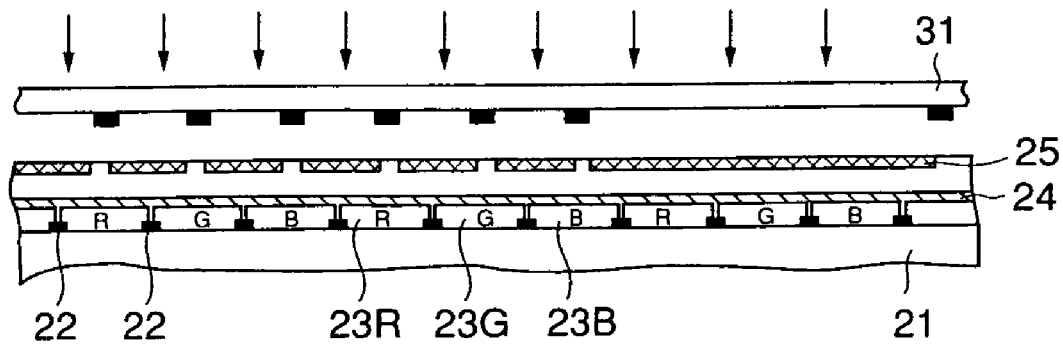
FIGS. 15A to 15C are sectional views showing the method of manufacturing the CF substrate of the liquid crystal display device according to the second embodiment, wherein the projection forming region is shown.
Figure 15B:
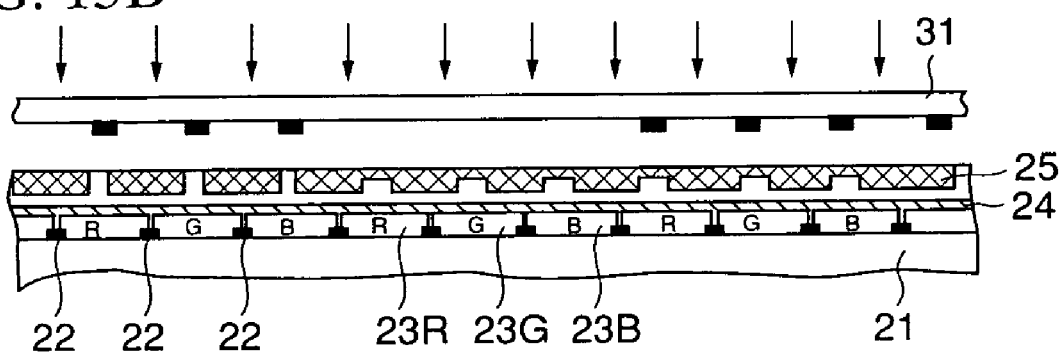
Figure 15C:
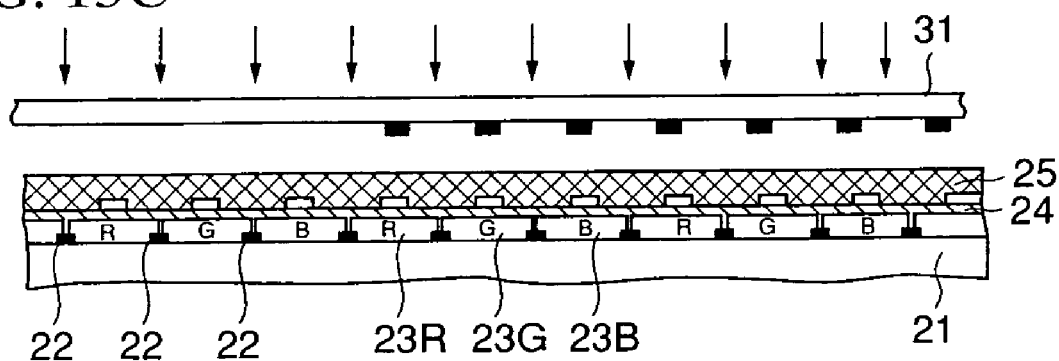
Figure 16A:
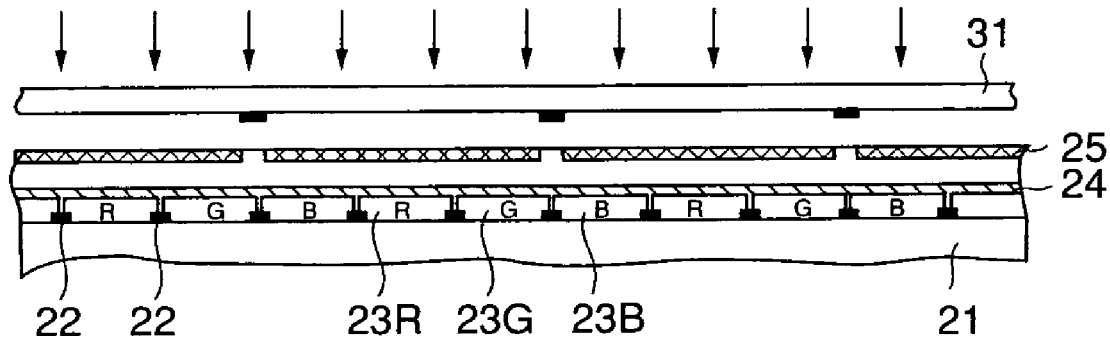
FIGS. 16A to 16C are sectional views showing the method of manufacturing the CF substrate of the liquid crystal display device according to the second embodiment, wherein the spacer forming region is shown.
Figure 16B:
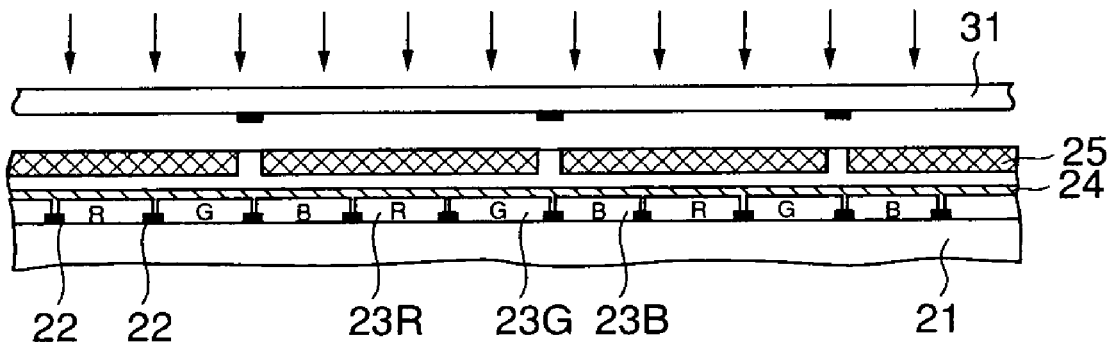
Figure 16C:
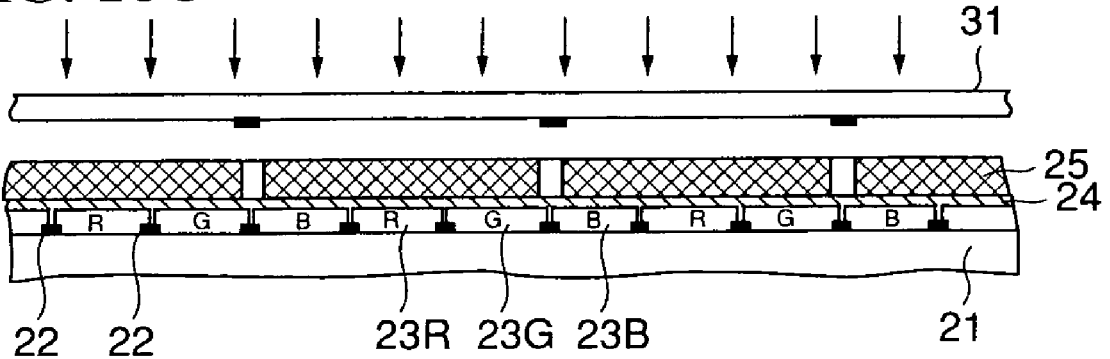

FIGS. 12A to 12C, FIG. 13, FIG. 14A and FIG. 14B, FIGS. 15A to 15C, and FIGS. 16A to 16C show a method of manufacturing a of a liquid crystal display device according to the second embodiment. FIGS. 12A to 12C are plan views showing a method of manufacturing a of a liquid crystal display device according to, wherein positional relationships between a light shielding pattern of the mask and pixels are shown. FIG. 13 is a plan view showing formed patterns of the spacers 25a and the projections 25b. FIG. 14A is a sectional view showing the spacer 25a forming portion (taken along a II-II line in FIG. 13), and FIG. 14B is a sectional view showing the projection 25b forming portion (taken along a III-III line in FIG. 13). FIGS. 15A to 15C are sectional views showing the method of manufacturing the CF substrate of the liquid crystal display device, taken along the III-III line in FIG. 13. FIGS. 16A to 16C are sectional views showing the method of manufacturing the CF substrate of the liquid crystal display device, taken along the II-II line in FIG. 13. In FIG. 14A to FIG. 16C, the same references are affixed to the same elements as the first embodiment.

First, as shown in FIG. 15A and FIG. 16A, like the first embodiment, the black matrix 22, the color filters 23R, 23G, 23B, and the common electrode 24 are formed on the glass substrate 21, and then the positive type novolak-based resist 25 is coated on the common electrode 24 by the spin coating method to have a thickness of about 4.0 µm and then prebaked.

Then, the resist is subjected to the proximity exposure. In this case, as shown in FIG. 12A, a mask 31 in which a projection light-shielding pattern (zigzag pattern) 31a and a spacer light-shielding pattern (rectangular pattern) 31b are formed is employed. In this mask 31, three unit pixel regions are arranged in the lateral direction while using three pixels of RGB arranged in the lateral direction as one unit, and six projection light-shielding patterns 31a having the same profile are provided at portions that correspond to two unit pixel regions and no projection light-shielding pattern 31a is provided in the portion (portion indicated by a broken line in FIG. 12A) that corresponds to the remaining one unit pixel region. Also, the spacer light-shielding pattern 31b is arranged at the rate of three pixels to one at portions that correspond to the intersecting regions between the data bus lines and the gate bus lines.

First, as shown in FIG. 12A, FIG. 15A, FIG. 16A, the first exposure is executed after the mask 31 is positioned. At this time, an amount of the exposure is set to ⅓ of the normal exposure for the resist having the film thickness of 4 µm. The shading in FIG. 15A to FIG. 15C, FIG. 16A to FIG. 16C indicate the exposed portion. In this case, an amount of the normal exposure means a degree of the exposure not to leave the exposed portion after the developing process.

Then, as shown in FIG. 12B, FIG. 15B, FIG. 16B, the second exposure is executed by an amount of the exposure, that is ⅓ of the normal exposure, after the mask 31 is shifted by three pixels in a predetermined direction (direction indicated by an arrow in FIG. 12B). In this case, all the spacer forming regions are light-shielded by the light-shielding pattern 31b of the mask 31.

Then, as shown in FIG. 12C, FIG. 15C, FIG. 16C, the third exposure is executed by an amount of the exposure, that is ⅓ of the normal exposure, after the mask 31 is shifted by three pixels in a predetermined direction (direction indicated by an arrow in FIG. 12C). In this case, all the spacer forming regions are also light-shielded by the light-shielding pattern 31b of the mask 31. Also, the exposure light is irradiated onto all the projection forming regions by an amount of the exposure that is ⅓ of the normal exposure.

Then, the developing process is applied to the resist 25. At this time, as shown in FIG. 14A, FIG. 14B, difference in thickness (height) is caused after the development since the projection forming regions are exposed by an amount of the exposure, that is ⅓ of the normal exposure, and the spacer forming regions are not exposed. In this manner, the spacers 25a and the projections, both having a different height, can be formed simultaneously on the glass substrate 21. Like the first embodiment, the post baking is executed after the developing process. Then, the alignment film is formed on the overall upper surface of the glass substrate 21. As a result, the CF substrate can be completed.

In the second embodiment, in addition to the same advantage as those in the first embodiment, there is such an advantages that only one sheet of mask used to form the spacers 25a and the projections 25b is needed.

Figure 17:
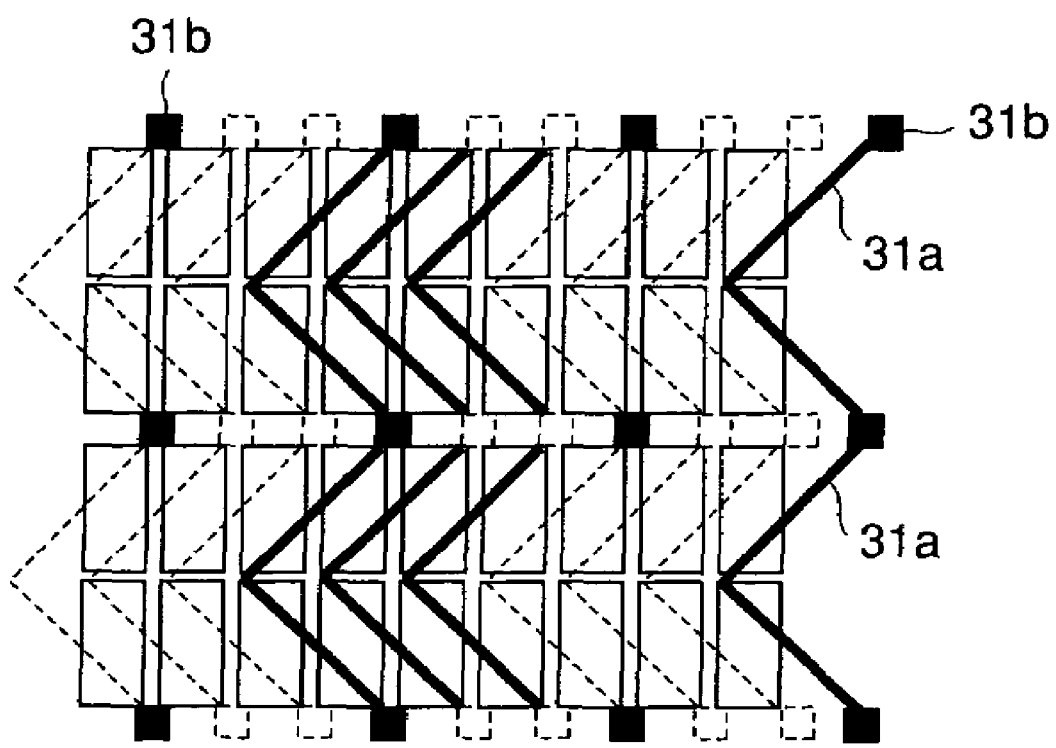
FIG. 17 is a plan view showing the method of manufacturing the CF substrate of the liquid crystal display device according to the second embodiment, wherein the pattern exposure used when the resist whose film thickness is 1.5 μm after development and whose exposure is ½ of normal exposure is employed is shown.

In the above example, the case is explained where, in the case of the thickness of 4.0 µm, the resist that gives the exposure, that is ⅓ of the normal exposure to provide the film thickness of 4.0 µm after the development, is used. For example, in the case of the resist that provides the film thickness of 1.5 µm after the development by the exposure that is ½ of the normal exposure, as shown in FIG. 17, there may be employed the mask in which the projection light-shielding patterns 31a are provided at portions that correspond to one unit pixel region out of two unit pixel regions and no projection light-shielding pattern 31a is provided in the portion that corresponds to the other pixel region. Then, after the first exposure is executed, the second exposure is executed after the mask is shifted by three pixels and then the developing process is applied. In this manner, in the second embodiment, the used mask and the number of exposure can be set appropriately according to the characteristic of the used resist.

Third Embodiment

A third embodiment of the present invention will be explained hereunder. A difference of the third embodiment from the first embodiment resides in that the method of forming the spacers 25a and the projections 25b on the CF substrate 20 is different. Since other configurations are basically similar to the first embodiment, their redundant explanation of overlapped portions will be omitted.

Figure 18:
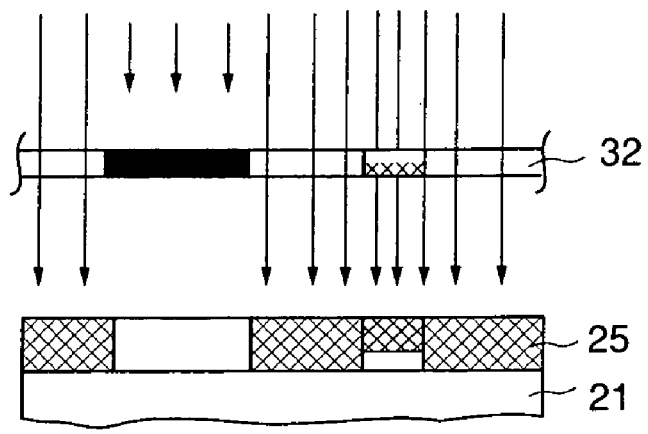
FIG. 18 is a schematic sectional view showing a method of manufacturing a CF substrate of a liquid crystal display device according to a third embodiment of the present invention, wherein the exposure step is shown.
Figure 19:
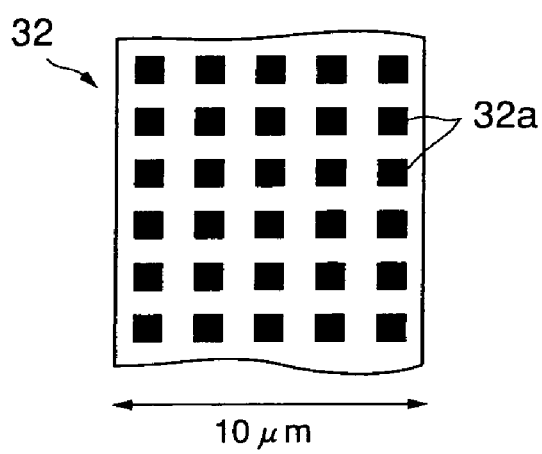
FIG. 19 is a plan view showing the method of manufacturing the CF substrate of the liquid crystal display device according to the third embodiment, wherein a projection forming pattern is shown.
Figure 20:
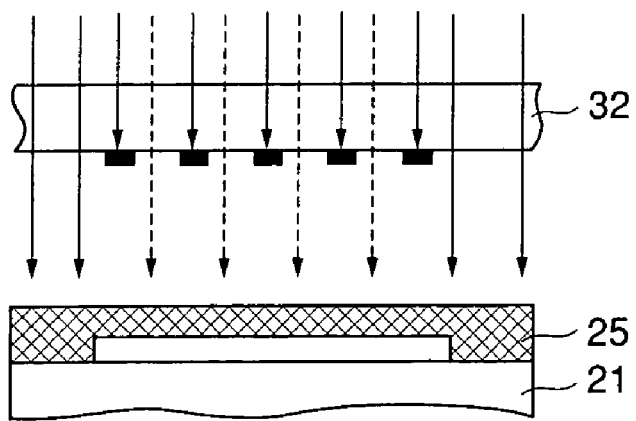
FIG. 20 is a schematic sectional view showing the method of manufacturing the CF substrate of the liquid crystal display device according to the third embodiment, wherein the projection forming region in the exposure step is shown.

FIG. 18, FIG. 19 and FIG. 20 are schematic views showing a method of manufacturing the CF substrate of the liquid crystal display device according to the third embodiment of the present invention. FIG. 18 is a schematic sectional view showing the exposure step, FIG. 19 is a plan view showing a projection forming pattern, and FIG. 20 is a schematic enlarged sectional view showing the projection forming region in the exposure step. In FIG. 18 and FIG. 20, illustration of the black matrix 22, the color filters 23R, 23G, 23B, and the common electrode 24 formed on the substrate 21 are omitted.

First, like the first embodiment, the black matrix 22, the color filters 23R, 23G, 23B, and the common electrode 24 are formed on the substrate 21, and then the positive type novolak-based resist 25 is formed on the common electrode 24 by the spin coating method to have a thickness is about 4.0 µm and then prebaked.

Then, the resist 25 is subjected to the proximity exposure. Here, as shown in FIG. 18, a mask having light-shielding patterns that have different light transmittance (light shielding amount) in the spacer forming region and the projection forming region is employed. That is, a spacer forming pattern that shields the light up to almost 100% and a projection forming pattern that transmits the light to extent of almost ½ to ¹⁄₁₀ are provided in the mask 32. For example, both the spacer forming pattern and the projection forming pattern are formed by patterning the Cr film. As shown in FIG. 19, a large number of small opening portions 32a whose resolution is less than the limit value are provided to the projection forming pattern. In this case, the light transmittance can be controlled by adjusting a density of the opening portions 32a and an opening area of the opening portions 32a.

When the developing process is applied after the resist 25 is exposed by using such Mask 32, the resist 25 is not exposed in the spacer forming region and thus the resist 25 remains thick. In contrast, since the resist 25 is exposed in the projection forming region by an amount of exposure that is smaller than the normal exposure, the resist still remains on the substrate 21 but a thickness of the projection forming region becomes smaller than the spacer forming region.

In this fashion, the spacers 25a and the projections 25b having the different height can be formed at a time by one exposure and development process.

Then, the post baking is performed like the first embodiment, and then the alignment film is formed on the overall upper surface of the glass substrate 21. As a result, the CF substrate 20 can be completed.

In the third embodiment, in addition to the advantage similar to that in the first embodiment, there is such an advantage that, since both the exposing process step and the developing process step required to form the spacers 25a and the projections 25b are needed only once, the reduction in manufacturing time can be achieved.

In the above embodiments, such a situation may be considered that, since the pattern having the opening portions 32a is employed as the projection forming pattern, an unevenness is caused on a surface of the resist (projections 25b) remained after the development. However, the surface of the resist becomes smooth since the resist is softened (reflown) by the heat in the post-baking step executed after the development. Accordingly, the alignment abnormality of the liquid crystal molecules due to the unevenness of the surface of the projections 25b can be avoided.

Figure 21:
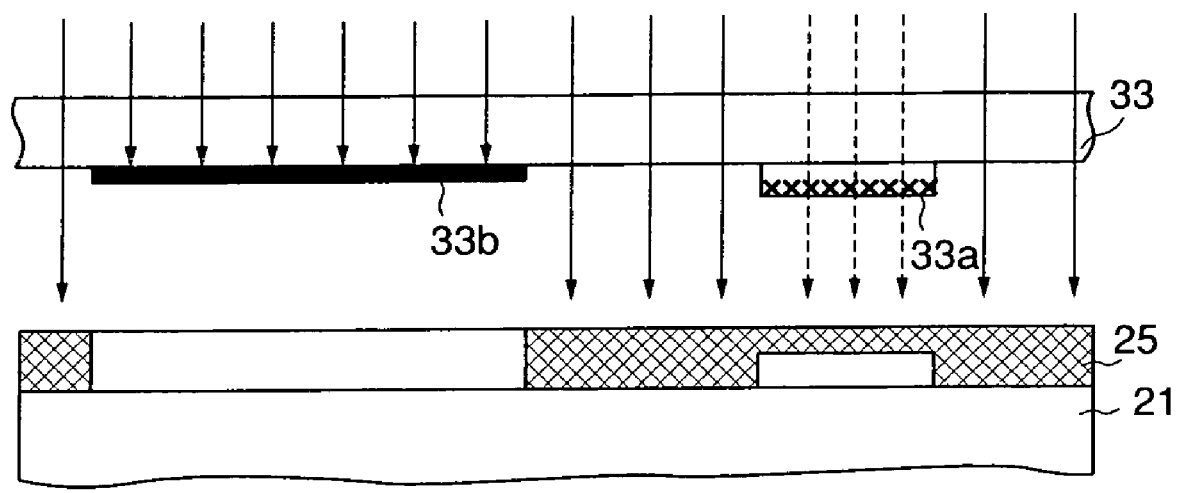
FIG. 21 is a schematic sectional view showing the method of manufacturing the CF substrate of the liquid crystal display device according to the third embodiment, wherein a method of forming the projections by using a pattern made of material having a low transmittance is shown.

Also, in the above embodiments, the pattern having the minute opening portions 32a is used as the projection forming pattern. As shown in FIG. 21, an amount of exposure applied to the projection forming region may be adjusted by forming a projection forming pattern 33a, that is formed of material having the UV resistance and the small transmittance, on or under the mask 33. As the material of the projection forming pattern 33a, for example, the material in which the pigment is mixed into the photosensitive acrylic resin, that is used similarly to form the color filters, to control its i-light ray (wavelength: 365 nm) transmittance into 25% may be employed.

In this case, the mask 33 is formed as follows. That is, the photosensitive acrylic resin containing the pigment is coated on the surface of the mask 33 in which the spacer light-shielding pattern 33b is formed by etching the Cr film. Then, the projection forming pattern is transferred by exposing the photosensitive acrylic resin while using a mask in which the projection forming pattern is provided. Then, the mask 33 having the spacer forming patterns 33b and the projection forming patterns 33a is formed by carrying out the exposure, the development, and the post baking. In this manner, the mask 33 having the spacer forming patterns 33b that shields the light up to almost 100% and the projection forming patterns 33a made of the resist whose i-light ray transmittance is 25% can be formed.

Here, the light transmittance of the projection forming patterns 33a is set to 25%, but such light transmittance of the projection forming patterns 33a may be adjusted appropriately according to the resist kind, the height of the projections, etc.

Fourth Embodiment

A fourth embodiment of the present invention will be explained hereunder. A difference of the fourth embodiment from the first embodiment resides in that the method of forming the spacers 25a and the projections 25b on the CF substrate 20 is different. Since other configurations are basically similar to the first embodiment, their redundant explanation of overlapped portions will be omitted.

Figure 22:
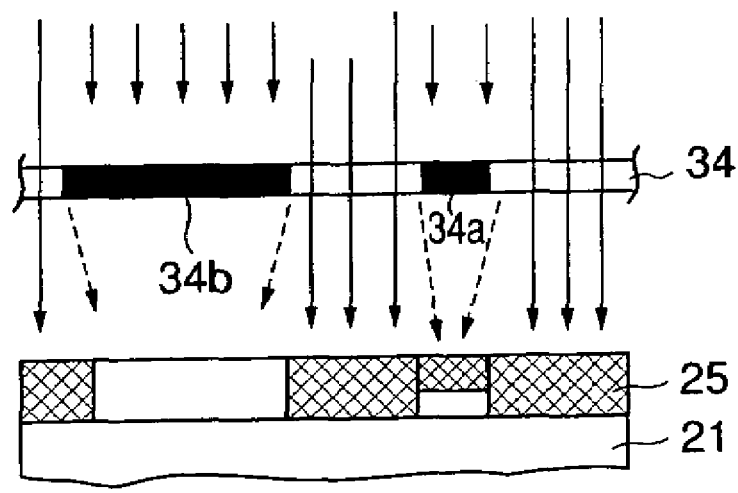
FIG. 22 is a schematic sectional view showing a method of manufacturing a CF substrate of a liquid crystal display device according to a fourth embodiment of the present invention, wherein the exposure step is shown.
Figure 23:
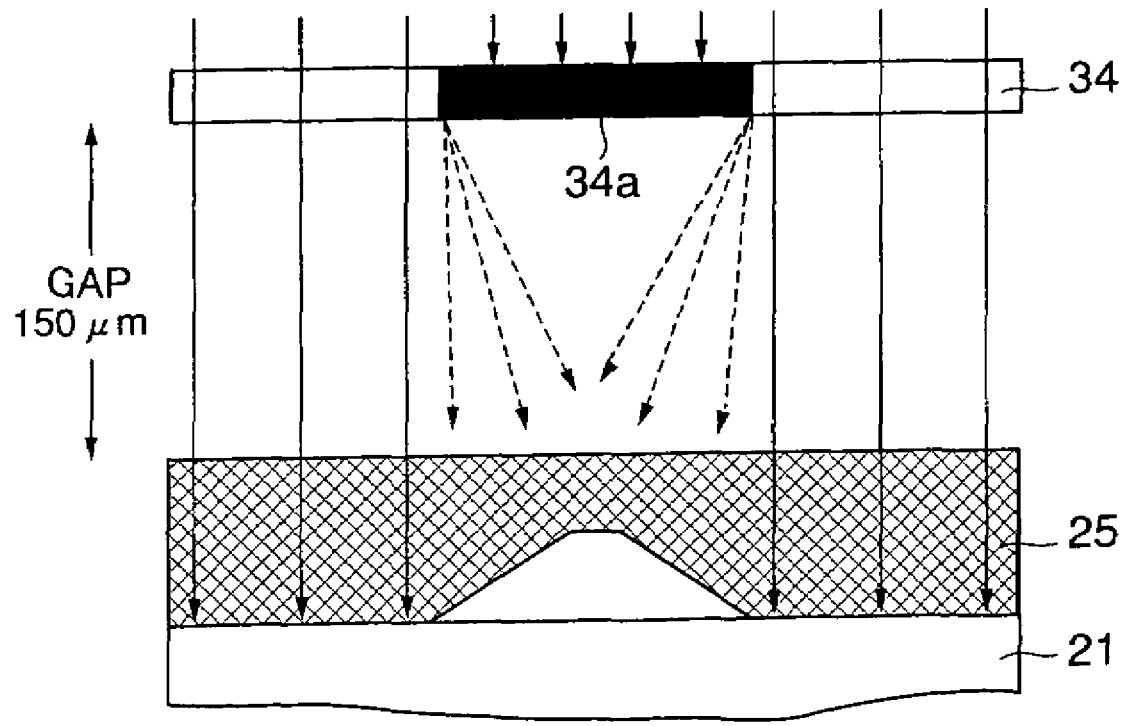
FIG. 23 is an enlarged sectional view showing the projection forming region in FIG. 22.

FIG. 22 and FIG. 23 are view showing a method of manufacturing a CF substrate of a liquid crystal display device according to the fourth embodiment. FIG. 22 is a schematic sectional view showing the exposure step, and FIG. 23 is an enlarged sectional view showing the projection forming region in FIG. 22. In FIG. 22 and FIG. 23, the illustration of the black matrix 22, the color filters 23R, 23G, 23B, and the common electrode 24 formed on the substrate 21 are omitted.

First, like the first embodiment, the black matrix 22, the color filters 23R, 23G, 23B, and the common electrode 24 are formed on the substrate 21, and then the positive type novolak-based resist 25 is formed on the common electrode 24 by the spin coating method to have a thickness is about 4.0 μm and then prebaked.

Then, the resist 25 is subjected to the proximity exposure while using the mask 34. The projection forming pattern 34a whose width is 10 μm and the spacer forming pattern 34b whose width is 20 to 35 μm are provided to the mask 34.

In the fourth embodiment, the proximity gap is set to 150 μm to increase an amount of diffraction by the diffraction light and the resist 25 is exposed by an amount of exposure that is 1.5 times the normal exposure. Therefore, since the light-shielding region is also exposed weakly by the diffraction light on the spacer forming pattern 34b side having the small line width, the film thickness obtained after the development becomes thinner than the unexposed region. In contrast, since the size is larger than the projection forming pattern 34a on the spacer forming pattern 34a side, the influence of the diffraction light is small. Accordingly, the film thickness obtained after the development becomes thinner than the unexposed portion at the edge portion of the pattern 34a, but the same thickness as the unexposed portion can be obtained in the center portion. For this reason, the projections having the small height and the spacers having the large height can be formed at the same time.

Then, the post baking is performed like the first embodiment, and then the alignment film is formed on the overall upper surface of the glass substrate 21. As a result, the CF substrate 20 can be completed.

In the fourth embodiment, in addition to the advantage similar to that in the first embodiment, there is such an advantage that, since both the exposing process step and the developing process step required to form the spacers and the projections are needed only once, the reduction in manufacturing time can be achieved.

The height and the width of the projection are changed according to the film thickness of the resist 25, the width of the projection forming pattern 34, the parallelism of the light emitted from the proximity exposing equipment, the proximity gap (distance between the mask and the resist film), and an amount of exposure. Accordingly, these conditions must be set appropriately according to the height and the width of the desired projection.

Fifth Embodiment

A fifth embodiment of the present invention will be explained hereunder. A difference of the fifth embodiment from the first embodiment resides in that the method of forming the spacers 25a and the projections 25b on the CF substrate 20 is different. Since other configurations are basically similar to the first embodiment, their redundant explanation of overlapped portions will be omitted.

Figure 24:
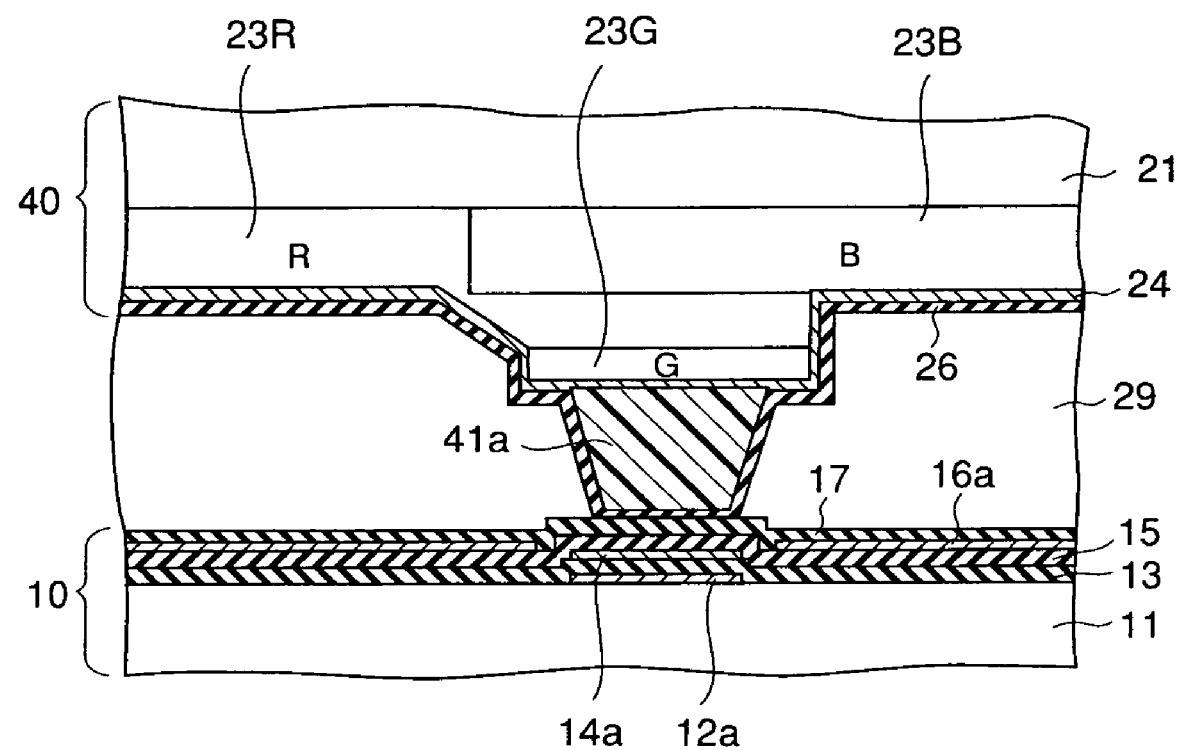
FIG. 24 is a sectional view showing a liquid crystal display device according to a fifth embodiment of the present invention.

FIG. 24 is a sectional view showing a liquid crystal display device according to the fifth embodiment of the present invention.

In the fifth embodiment, three color filters 23B, 23R, 23G are laminated as three layers in the spacer forming region, and a cell gap adjusting spacer 41a is formed thereon (on the lower side in FIG. 24). Also, in the fifth embodiment, the blue color filter 23B and the red color filter 23R after laminated are used as the black matrix.

In this manner, since the black matrix is formed by laminating the color filters 23B, 23R, the Cr film forming step and the Cr film etching step can be omitted, and thus the manufacturing time can be shortened. Also, since the color filters 23B, 23R, 23G are laminated as three layers in the spacer forming region, the predetermined cell gap can be maintained if the height of the spacer 41 is set small.

It may be considered that the spacers are formed by the laminated color filters 23R, 23G, 23B and the domain defining projections provided to pass over them. In this case, the area of the spacer forming region is small and also the novolak resin or the acrylic resin used normally as the color filter has the good flatness. Therefore, even if the thickness of the color filters 23R, 23G, 23B is set to 1.5 µm respectively and the height of the projections is set to 1.5 µm, for example, the cell gap become smaller than 4.0 µm.

Normally, when the color filters are laminated in the spacer forming region, the leveling occurs in the second and third laminated resin portions until the resin is dried. Thus, the thickness of the second layer color filter is reduced to about 70% of the first layer color filter, and also the thickness of the third layer color filter is reduced to about 50% of the first layer color filter.

If it is assumed that no spacer 41a is provided, the cell gap is decided by the laminated thickness of the color filters. Therefore, the thickness of the color filters at the laminated areas of the color filters must be made thick. In order to make the thickness of the second and third layer color filters thick, there may be considered a method of reducing the leveling by accelerating the drying by virtue of the vacuum drying, a method of increasing the film thickness of the coated resin, and the like, for example. However, coating unevenness or drying irregularity are caused by these methods, and yield of the manufacture is lowered.

Figure 25:
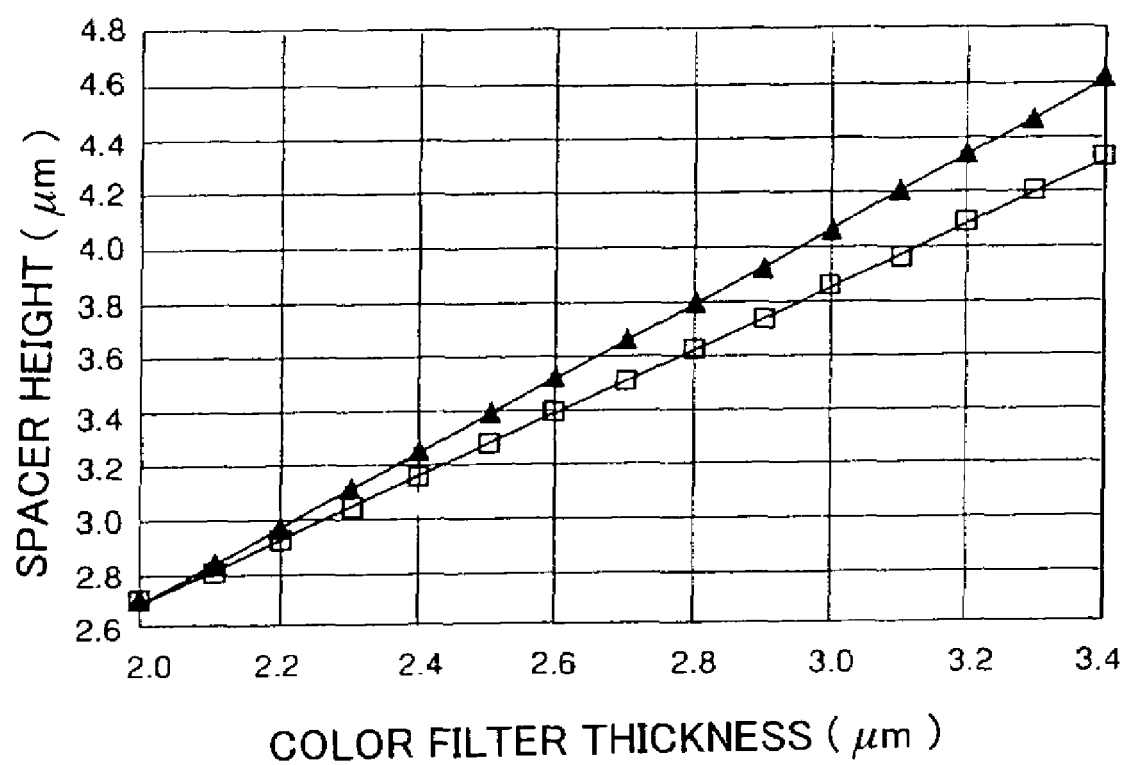
FIG. 25 is a graph showing a relationship between a thickness of a color filter and a height of a spacer.

FIG. 25 is a graph showing a relationship between the thickness of the color filter and the height of the spacer, wherein an abscissa denotes the thickness of the color filter in the pixel region and an ordinate denotes the height of the spacer (overlapped height of the color filters). Where a ▲ mark indicates the case where the height of the projection is equal to the thickness of each color filter, and a □ mark indicates the case where the projection is set to 2.0 µm. As can be seen from FIG. 25, in order to get the cell gap of 4 µm, both the thickness of each color filter and the height of the projection in the pixel region must be set to 3 µm. However, if the height of the projection is reduced smaller than 30% or increased larger than 50% of the cell gap, reduction in the transmittance or reduction in the contrast is brought about. Therefore, it is preferable that the height of the projection should be set to 1.2 to 2.0 µm. If so, it becomes difficult to finely pattern the pigment-dispersed resist used as material of the color filter when the thickness of such resist exceeds 3 µm. Also, there are caused the problems that the drying speed after the coating becomes slow and thus the productivity is lowered. Accordingly, it is not practical to set the thickness of the color filter to more than 3 µm.

It may also be considered that the material such as polyimide that has poor flatness is used as material of the color filter. In this case, since polyimide is not photosensitive, the etching step is needed in patterning. Thus, there is a disadvantage such that the manufacturing cost is increased because of the increase of the number of steps. If the color filter can be formed thick, the common electrode in the spacer portion and the pixel electrode on the TFT substrate side are formed very close and thus short-circuit failure occurs easily.

In the fifth embodiment, as described above, a spacer 41a is formed on the laminated portions of the color filters 23R, 23G, 23B, and then the cell gap can be adjusted by the spacer 41a. Therefore, even if the thickness of the color filters 23R, 23G, 23B is set to less than 3 µm, the sufficient cell gap can be assured.

Next, a method of manufacturing a CF substrate 40 of the liquid crystal display device according to the fifth embodiment will be explained with reference to FIGS. 26A to 26E hereunder.

Figure 26A:
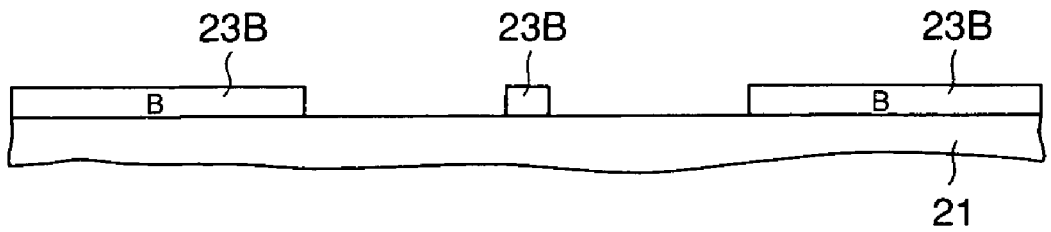
FIGS. 26A to 26E are sectional views showing a method of manufacturing a CF substrate of the liquid crystal display device according to the fifth embodiment.

First, as shown in FIG. 26A, the pigment-dispersed type photosensitive blue resist is coated on the glass substrate 21. Then, the blue color filter 23B (blue resist) of about 1.5 µm thickness is formed on the blue pixel regions, the black matrix forming region, the spacer forming regions (regions corresponding to intersecting portions between the gate bus lines and the data bus lines on the TFT substrate side) and mark (alignment mark, etc.) forming regions by exposing/developing this blue resist.

Figure 26B:
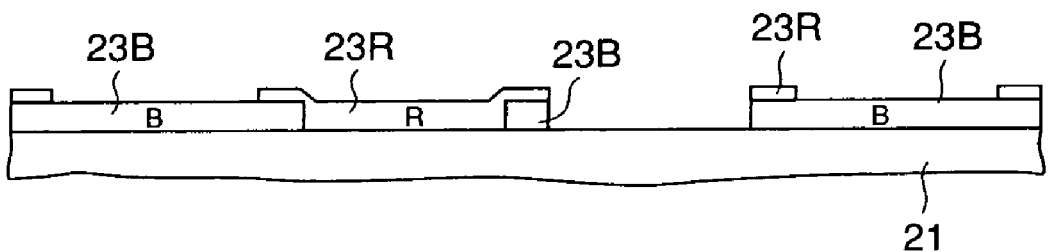

Then, as shown in FIG. 26B, the pigment-dispersed type photosensitive red resist is coated on the glass substrate 21. Then, the red color filter 23R (red resist) of about 1.5 µm thickness is formed on the red pixel regions, the black matrix forming region, and the spacer forming regions by exposing/developing this red resist.

Figure 26C:
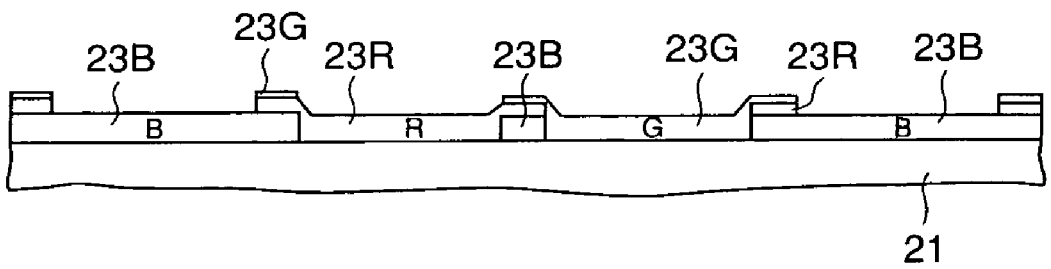

Then, as shown in FIG. 26C, the pigment-dispersed type photosensitive green resist is coated on the glass substrate 21. Then, the green color filter 23G (green resist) of about 1.5 µm thickness is formed on the green pixel regions and the spacer forming regions by exposing/developing this green resist.

Figure 26D:
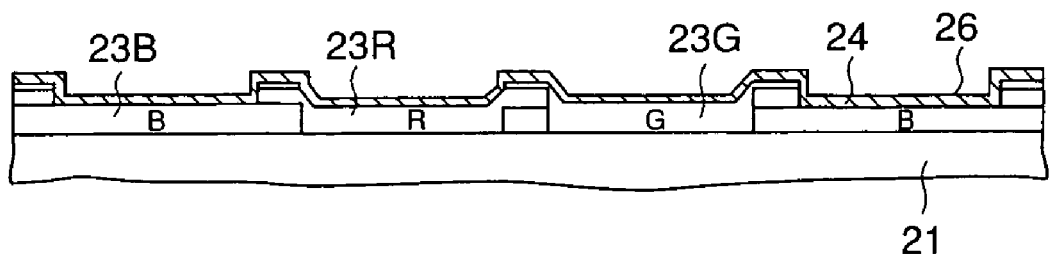

Then, as shown in FIG. 26D, the common electrode 16 is formed by forming ITO of about 0.15 µm thickness on the overall upper surface of the glass substrate 21.

In the fifth embodiment, two color filters are laminated in the black matrix forming region, and three color filters are laminated in the spacer forming region. In this case, the thickness of the color filter is 1.5 µm in the pixel portions (in which a single layer color filter is formed), but the thickness of the second and third layer color filters becomes thinner than this thickness. A height of a laminated body of three layer color filters (height of the pixel portion from the surface of the color filter) formed by the steps made up to now in the spacer forming region is about 1.8 µm. A height of a laminated body of two layer color filters (height of the pixel portion from the surface of the color filter) in the black matrix forming region is about 1.1 µm.

Figure 26E:
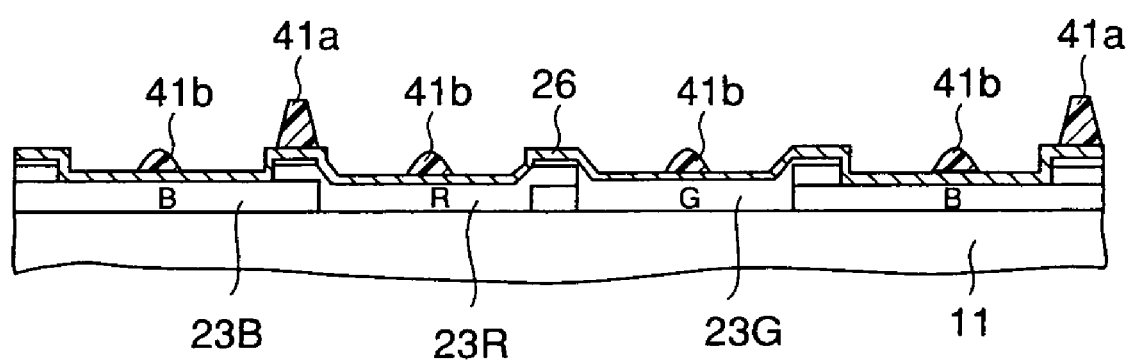

Then, the positive type novolak-based resist is coated on the overall upper surface of the glass substrate 21 by the spin coating method, or the like to have a film thickness of 2.5 µm. Then, while using a reticle in which the width of the spacer forming pattern is set to 30 µm and the width of the projection forming pattern is set to 6 µm, the resist is stepper-exposed at a predetermined amount of exposure and then developed. Accordingly, as shown in FIG. 26E, cell gap adjusting spacers 41a and domain defining projections 41b are formed. After the development, the film thickness of the resist is about 2.0 µm in the spacer forming region and is about 2.3 µm in the projection forming region.

Then, the resultant structure is post-baked at 220° C. for about one hour by using an oven. In the spacer forming region, the film thickness becomes about 2.0 µm and the line width becomes about 30 µm after the baking is finished. In contrast, in the projection forming region, the film thickness becomes about 1.5 μm and the line width becomes about 10 μm since the resist is reflown by the heat in the post baking. Thus, the desired profile can be obtained.

In the fifth embodiment, in addition to the advantage similar to that in the first embodiment, there can be achieved the advantage such that the Cr film forming step and the Cr film etching step applied in the first embodiment can be omitted and thus the manufacturing cost can be reduced.

In the above example, the spacers 41a and the projections 41b are formed by the stepper-exposure. However, if the desired resolution can be obtained, the resist can be exposed by virtue of the proximity exposure, the mirror projection method, etc.

Also, in the above example, three color filters are laminated in the spacer forming region. But the present embodiment is not limited to this, and the layer number of the color filters may be set one layer or two layers.

Sixth Embodiment

A sixth embodiment of the present invention will be explained hereunder. A difference of the sixth embodiment from the first embodiment resides in that the method of forming the spacers and the projections on the CF substrate 20 is different. Since other configurations are basically similar to the first embodiment, their redundant explanation of overlapped portions will be omitted.

Figure 27A:
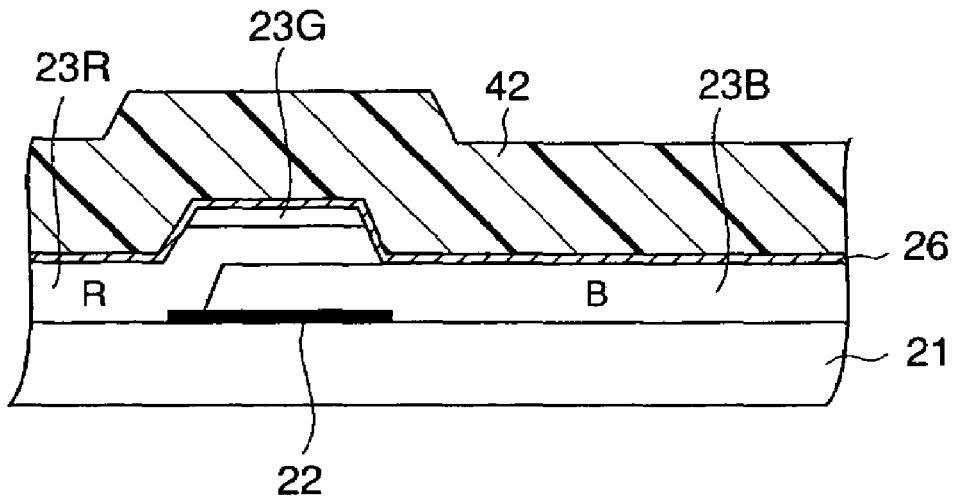
FIGS. 27A to 27C are sectional views showing a method of manufacturing a CF substrate of a liquid crystal display device according to a sixth embodiment of the present invention.
Figure 27B:
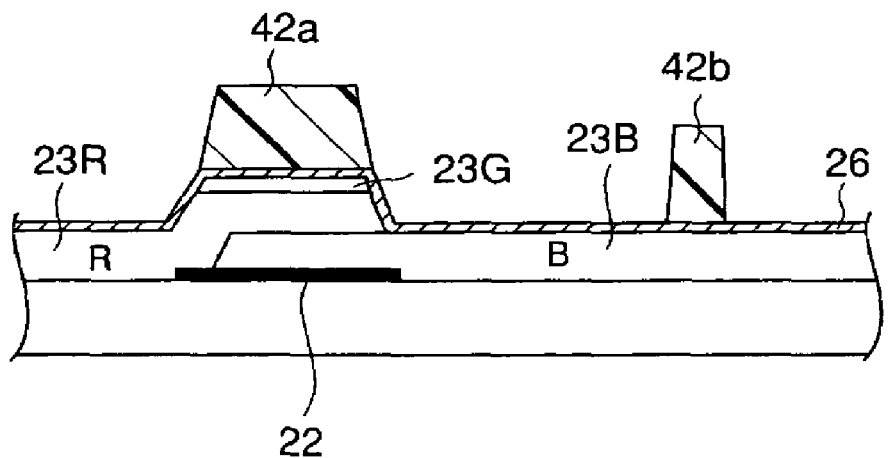
Figure 27C:
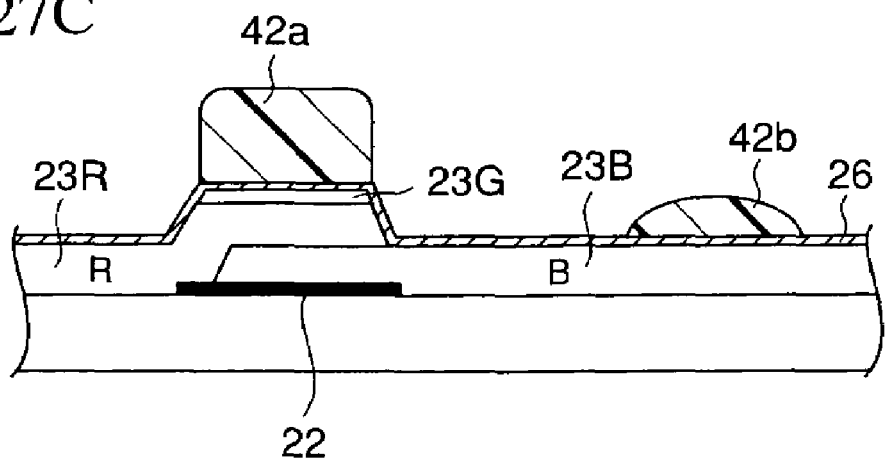

FIGS. 27A to 27C are sectional views showing a method of manufacturing a CF substrate of a liquid crystal display device according to a sixth embodiment of the present invention.

First, as shown in FIG. 27A, the Cr film is formed on the glass substrate 21 and then the black matrix 22 is formed by patterning the Cr film. Then, the color filters 23B, 23R, 23G are formed sequentially on the glass substrate 21. At this time, the color filters 23B, 23R, 23G are laminated on the black matrix 22 in the spacer forming portion.

Then, the common electrode 24 made of ITO is formed on the overall upper surface of the substrate 21. Then, the positive type novolak-based resist 42 is coated on the common electrode 24 by the spin coating method.

Then, as shown in FIG. 27B, the spacers 42a and the projections 42b are formed by exposing the resist 42 while employing the reticle in which the width of the spacer forming pattern is set to 30 μm and the width of the projection forming pattern is set to 6 μm, and then developing such resist.

Then, the resultant structure is post-baked at the temperature of 220° C. for about one hour. Since the width of the projections 42b is narrow, the resist is reflown by the heat in the post baking. Thus, as shown in FIG. 27C, the height of the projections 42b is lower than the height of the spacers 42a. In this way, the spacers 42a and the projections 42b, both having the different height, can be formed simultaneously. In the sixth embodiment, the similar advantage to that in the first embodiment can be achieved.

In the above embodiment, the case is explained where the black matrix 22 is formed of the Cr film. But the black matrix 22 may be formed of black resin. Also, in the above example, three layers of color filters 23B, 23R, 23G are laminated in the spacer forming portion. But the present embodiment is not limited to this example, and the layer number of the color filters in the spacer region may be set to one or two. In this case, if the level difference in the spacer region is increased, the distance between the common electrode and the pixel electrodes on the TFT substrate side is reduced. Thus, it is preferable that, since the short-circuit failure easily occurs, the level difference in the spacer region should not be so increased.

Seventh Embodiment

A seventh embodiment of the present invention will be explained hereunder.

Normally, in the prior art, the black matrix is formed of a metal film such as the Cr film, etc. or black resin. It is said that the OD value necessary for the black matrix is in excess of 2.5 in the normally white liquid crystal display device and is in excess of 2.0 in the normally black liquid crystal display device. However, the OD value necessary for the black matrix is changed according to the kind of the liquid crystal, the cell gap, the structure of the TFT substrate, etc.

Meanwhile, there are the dyeing method, the pigment-dispersing method, the electrodeposition method, the printing method, and the like as the color filter forming method. However, the dyeing method has the drawback such that the number of steps is large, and the electrodeposition method has the drawback such that the management of the electrodeposition solution is troublesome and the state of the formed film is easily varied. The printing method is not enough in the film thickness distribution and the pattern precision and does not come to the practical stage yet. As a result, the pigment-dispersing method is the mainstream at present as the color filter forming method.

In the pigment-dispersing method, the resist is patterned by the photolithography technology while using the photoresist into which the pigment is dispersed. Therefore, in the prior art, in order to form the CF substrate, four times photolithography steps are required in total for the formation of the black matrix and the formation of the color filters, which causes the reduction in the manufacturing yield and the increase in the equipment cost and the material cost.

Therefore, it is proposed that, if the black matrix can be formed by laminating at least two color filters out of three RGB color filters, the Cr film or the black resin forming step and the patterning step should be reduced. In this case, upon patterning the photoresist, the positions of the edges of the color filters are minutely changed due to the reflected light from the groves provided on the atage of the exposing equipment and thus the irregularity in display is caused.

Figure 28:
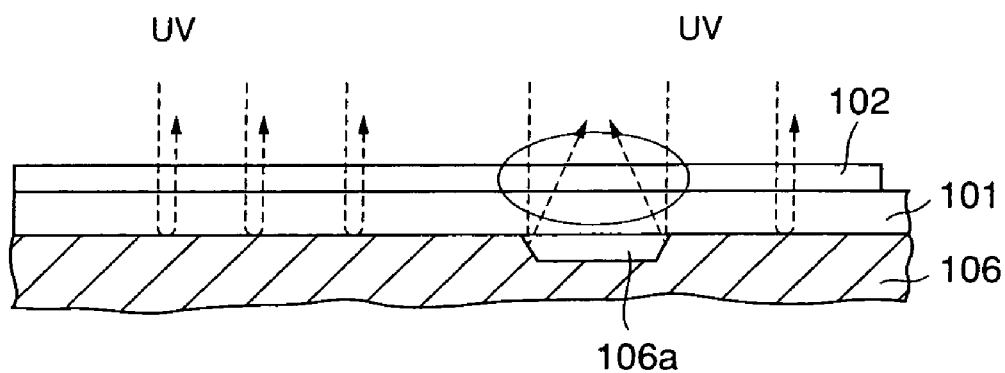
FIG. 28 is a schematic sectional view showing the step of exposing photoresist acting as a color filter.

FIG. 28 is a schematic sectional view showing the step of exposing the photoresist acting as the color filter. As shown in FIG. 28, the photoresist into which the pigment is dispersed is coated on the glass substrate 101, then the glass substrate 101 is loaded on a stage 106 of the exposing equipment, and then the ultraviolet (UV) ray is irradiated onto the glass substrate 101 via a mask in which predetermined patterns are provided.

Grooves 106a such as a hole used to suck and fix the glass substrate 101 and others (referred simply to as the "groove" hereinafter) are provided onto the stage 106 of the exposing equipment. The light being output form the light source and transmitted through the glass substrate 101 is reflected in the perpendicular direction at the flat portion of the stage 106, but is reflected in the oblique direction at the groove 106a. Accordingly, an amount of exposure is changed in vicinity of the groove 106a and thus a shape of the groove 106a is transferred onto the resist pattern after the development. Such shape of the groove 106a transferred onto the resist pattern is called a stage trace hereinafter.

Ordinarily, for the sake of formation of the alignment mark, etc. and in view of the light-shielding capability of the black matrix, the blue color filter or the red color filter is at first formed. Normally, in the case of the single color, the blue (B) filter has the largest OD value of the color filters, and also the OD value of the green (G) filter is equal to or smaller than the OD value of the red (R) filter (B>R≧G). Also, if the color filters are laminated, the OD value obtained when three color filters of red, green, and blue are laminated is largest, then the OD value obtained when two color filters of red and blue are laminated is next largest, then the OD value obtained when two color filters of red and green are laminated is next largest, and then the OD value obtained when two color filters of blue and green are laminated is equal to or smaller than the OD value obtained when two color filters of red and green are laminated (RGB>RB>RG≧BG). The OD value and the transmittance obtained when the normal transmission-type color filters of two layers or more are laminated are given in Table 1.

TABLE 1

| Laminated Layers | OD Value | Transmittance |
|---|---|---|
| R + G | 1.3 | 5.0% |
| G + B | 1.1 | 7.9% |
| B + R | 2.1 | 0.8% |
| R + G + B | 2.5 | 0.3% |

Figure 29:
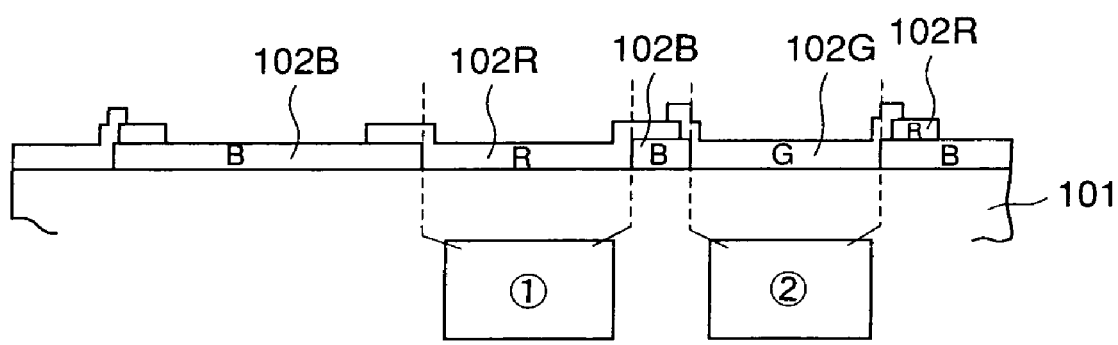
FIG. 29 is a schematic sectional view showing a normal example of a black matrix constructed by laminating the color filters.

FIG. 29 is a schematic sectional view showing a normal example of the black matrix constructed by laminating the color filters. In this manner, the blue color filter 102B is formed on the glass substrate 101, then the red color filter 102R is formed, and then the green color filter 102G is formed. In this case, the edge of the blue pixel region is decided by the edge of the red color filter 102R, and the edge of the red pixel region is decided by the edge of the blue color filter 102B, and the edge of the green pixel region is decided by the edge of the blue color filter 102B.

When the blue color filter 102B is at first formed on the glass substrate 101, such blue color filter 102B is affected by the groove 106a on the stage 106, as described above. In the liquid crystal display device shown in FIG. 29, since the edges of the red pixel region and the green pixel region are decided by the edge of the blue color filter 102B, the trace of the stage occur in the red pixel region and the green pixel region. In this case, since the OD value of the laminated body of the blue color filter 102B and the red color filter 102R is larger than the OD value of the laminated body of the blue color filter 102B and the green color filter 102G, the trace of the stage occur more strongly in the red pixel region. Since the edge of the pixel is decided by the second layer red color filter 102R in the blue pixel region, the blue pixel region is seldom affected by the trace of the stage. It is difficult to discriminate the trace of the stage in the individual pixel, nevertheless such trace of the stage can be clearly found on the overall liquid crystal panel.

In the prior art, the surface treatment of the stage 106 or the position of the groove is improved not to leave the trace of the stage. However, it is impossible to perfectly eliminate the groove 106a because the holes for sucking the substrate, etc. must be formed on the stage 106.

Therefore, the seventh embodiment provides a method of manufacturing the liquid crystal display device in which the trace of the stage of the exposing equipment is difficult to occur.

FIGS. 30A to 30D are sectional views showing a method of manufacturing a CF substrate of a liquid crystal display device according to the seventh embodiment. FIGS. 31A to 31C are plan views showing the method of manufacturing the CF substrate of the liquid crystal display device shown in FIGS. 30A to 30D. In this case, in FIGS. 31A to 31C, the inside of a broken line indicates selectively a region acting as the red pixel region (referred simply to as "red pixel region" hereinafter), a region acting as the green pixel region (referred simply to as "green pixel region" hereinafter), and a region acting as the blue pixel region (referred simply to as "blue pixel region" hereinafter).

Figure 30A:
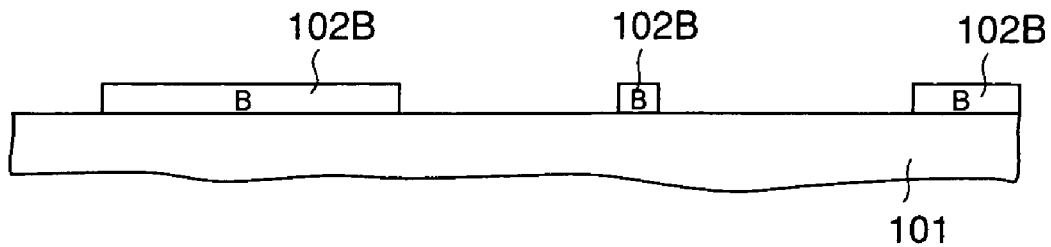
FIGS. 30A to 30D are sectional views showing a method of manufacturing a CF substrate of a liquid crystal display device according to a seventh embodiment of the present invention.
Figure 31A:
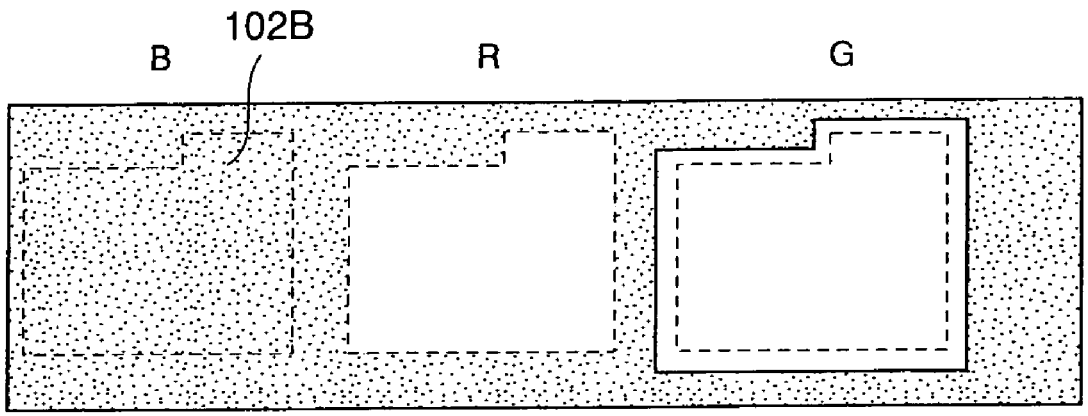
FIGS. 31A to 31C are plan views showing the method of manufacturing the CF substrate of the liquid crystal display device shown in FIGS. 30A to 30D.
Figure 31B:
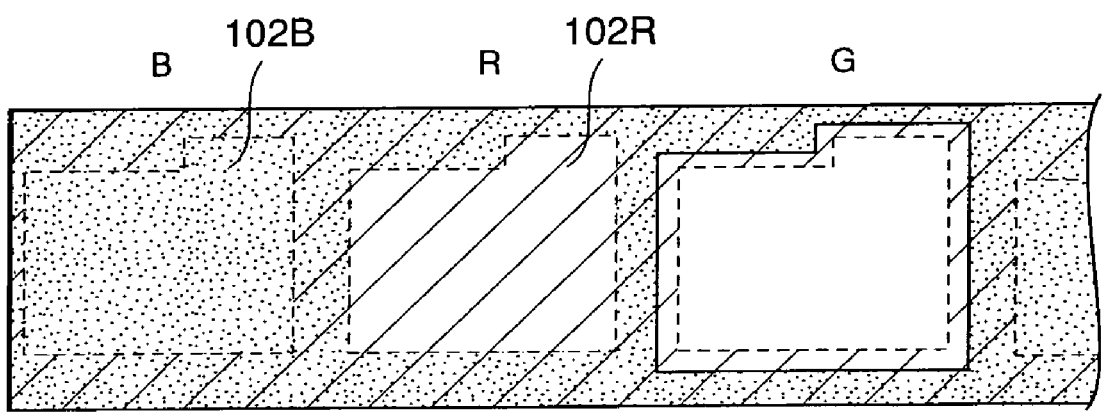
Figure 31C:
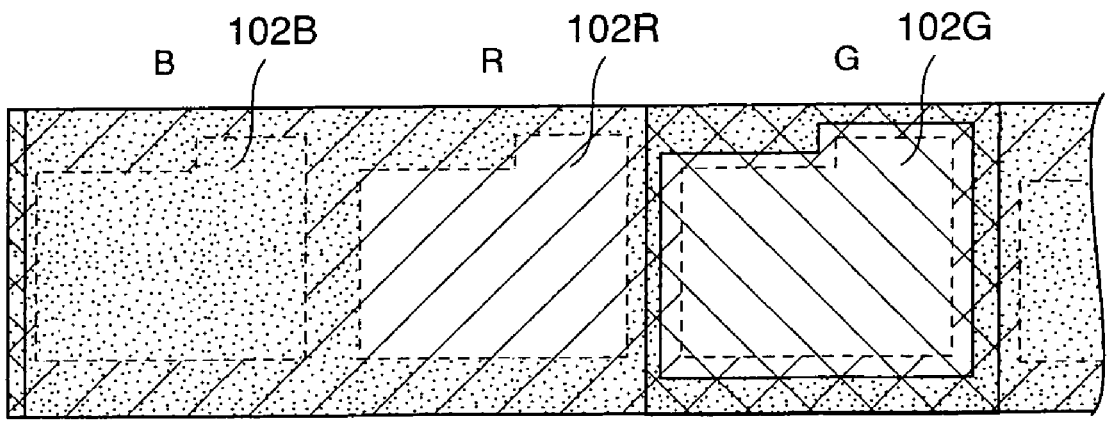

First, as shown in FIG. 30A and FIG. 31A, the blue color filter 102B is formed on the blue pixel region (B) and its periphery, the red pixel region (R) and its periphery, the green pixel region (G) and its periphery, and the mark forming region (not shown), by coating the photoresist containing the blue pigment on the glass substrate 101 to have a thickness of about 1.5 μm, and then exposing and developing the photoresist. In this case, as shown in FIG. 31A, the blue color filter 102B is not formed in a predetermined area from the edge portion of the green pixel region (G).

Figure 30B:
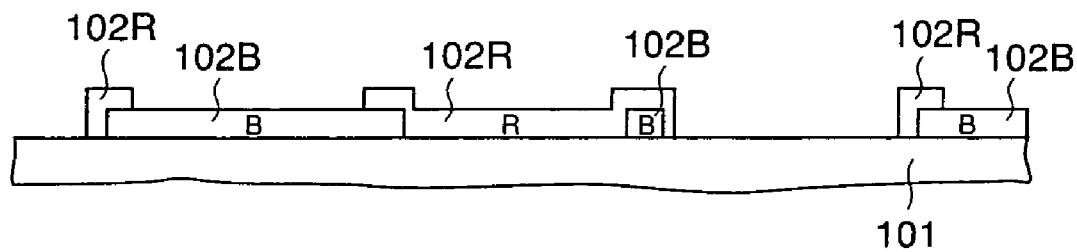

Then, as shown in FIG. 30B and FIG. 31B, the red color filter 102R is formed on the red pixel region (R) and its periphery, the blue pixel region (B) and its periphery, and the green pixel region (G), by coating the photoresist containing the red pigment on the glass substrate 101 to have a thickness of about 1.5 μm, and then exposing and developing the photoresist. In this case, as shown in FIG. 30B, the red color filter 102R is positioned on the inner side than the blue color filter 102B in the periphery of the green pixel region (G).

Figure 30C:
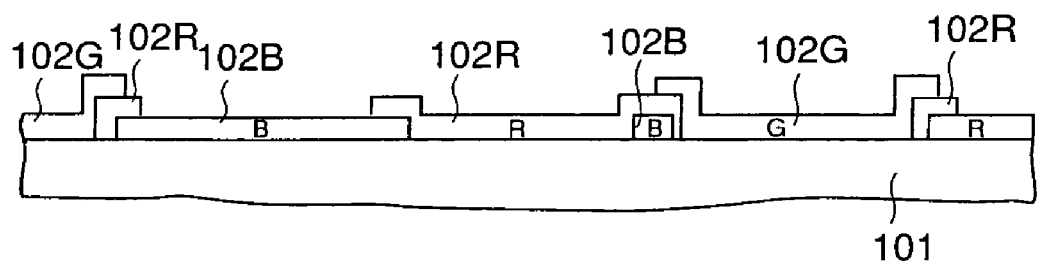

Then, as shown in FIG. 30C and FIG. 31C, the green color filter 102G is formed on the green pixel region (G) and its periphery, by coating the photoresist containing the green pigment on the glass substrate 101 to have a thickness of about 1.5 μm, and then exposing and developing the photoresist. Accordingly, as shown in FIG. 30C, three color filters 102B, 102R, 102G are laminated as three layers in the periphery of the green pixel region (G), and also two color filters 102B, 102R are laminated as two layers in the peripheries of the blue pixel region (B) and the red pixel region (R).

Figure 30D:
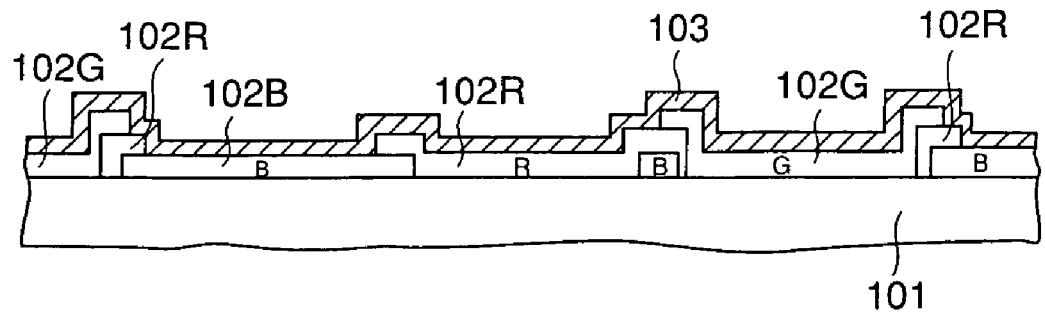

Then, as shown in FIG. 30D, a common electrode 103 made of ITO is formed on the overall upper surface of the substrate 101 to have a thickness of about 0.15 μm. Also, as occasion demands, like the first embodiment, the projections and the spacers are formed on the CF substrate and then the alignment film (not shown) is formed on the overall upper surface of the substrate 101. Accordingly, the CF substrate can be completed.

Then, the CF substrate constructed in this manner is jointed to the TFT substrate, and then the liquid crystal is sealed between both substrates. As a result, the liquid crystal display device can be completed.

Figure 32:
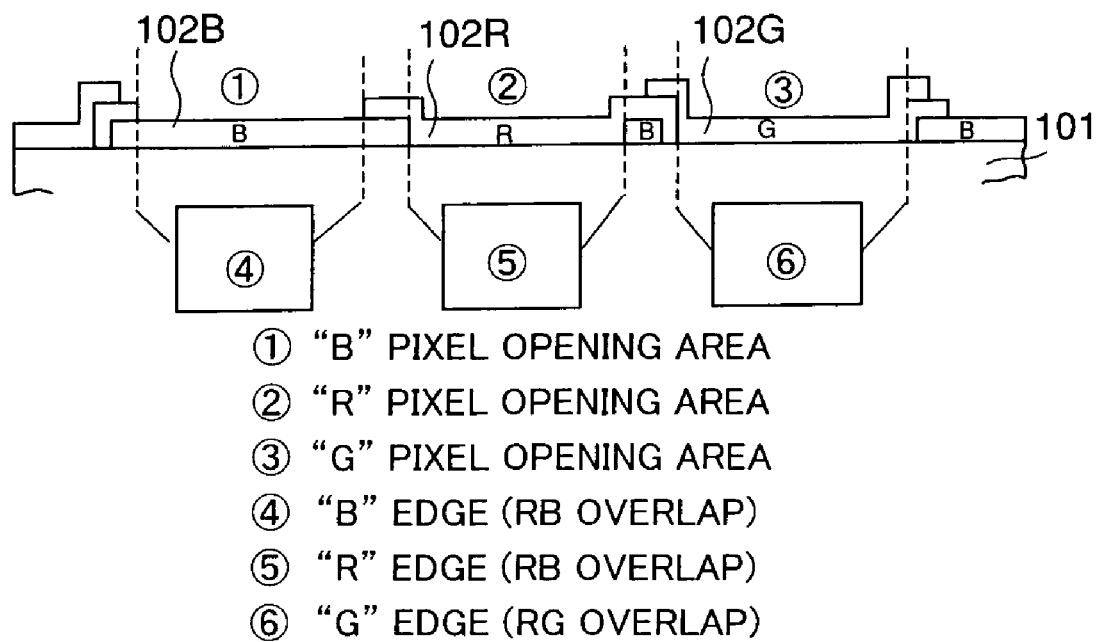
FIG. 32 is a schematic sectional view showing edges of the color filters to decide edges of the pixel portion, according to the seventh embodiment.

In the seventh embodiment, as shown in FIG. 32, the edge of the red pixel region (R) is decided by the edge of the first layer blue color filter 102B, but both the edge of the blue pixel region (B) and the edge of the green pixel region (G) are decided by the edge of the second layer red color filter 102R. Even if the groove is provided on the stage of the exposing equipment, the edge of the blue pixel region (B) is attenuated when the light passes through the first layer blue color filter 102B. Therefore, the edge of the blue pixel region (B) is seldom affected by the reflected light from the groove upon patterning the red color filter 102R. Also, the edge of the green pixel region (G) is subjected to the influence of the stage groove of the exposing equipment upon patterning the red color filter 102R, but the trace of the stage is difficult to be conspicuous since the OD value of the laminated body of the red color filter 102R and the green color filter 102G is small and the green pixel region (G) has different color from the first layer blue color filter 102B that decides the edge of the red pixel region (R).

According to the seventh embodiment, since the black matrix is formed by laminating the color filters, the reduction in the manufacturing time and the reduction in the manufacturing cost can be achieved rather than the case where the black matrix is formed by the Cr film or the black resin. Also, according to the seventh embodiment, since the display is seldom affected by the reflected light from the stage of the exposing equipment upon patterning the color filter that decides the edge of the pixel, it is possible to manufacture the liquid crystal display device that can provide the good display quality in which the trace of the stage is reduced even if the groove is provided on the stage of the exposing equipment.

In the seventh embodiment, the color filters are formed in the order of the blue color filter 102B, the red color filter 102R, and the green color filter 102G. In this case, as described above, if the edges of more than two color pixel regions out of three color pixel portions are decided by the edge of the second layer color filter, the order of forming the color filters may be set not to follow the above order.

Also, in the seventh embodiment, the case is explained where the invention set forth in claim 13 is applied to the vertically aligned liquid crystal display device. But the scope of the present invention is not restricted by the above case, and the present invention may be applied to other liquid crystal display device having the structure in which the black matrix is formed by laminating two color filters or more.

Figure 33:
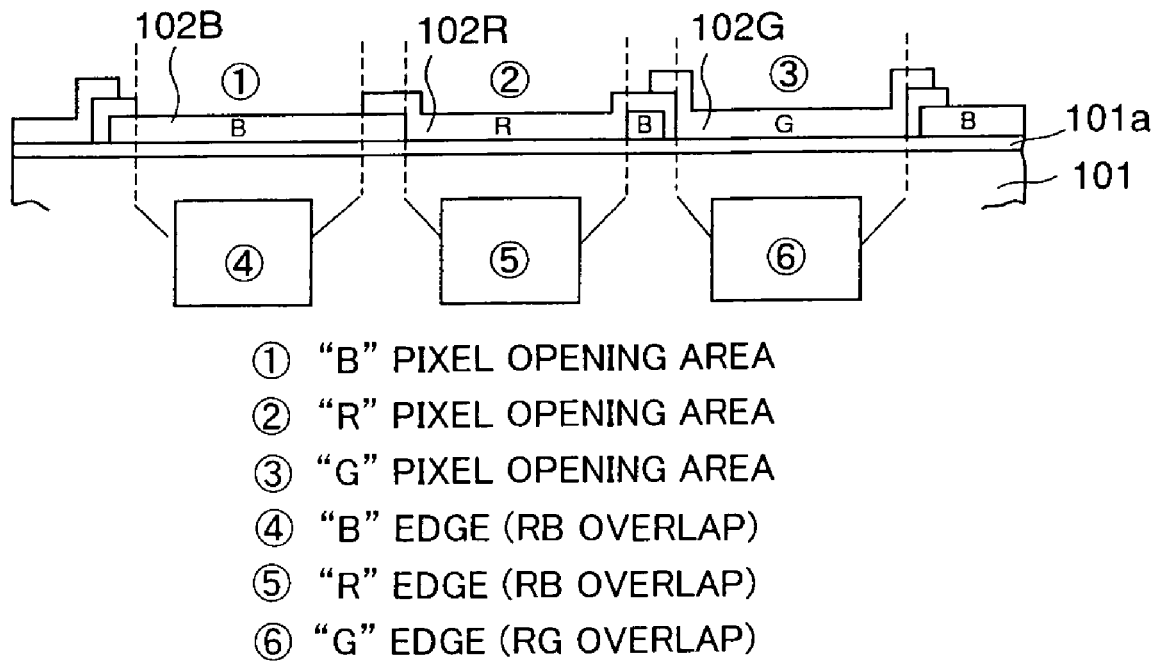
FIG. 33 is a schematic sectional view showing the liquid crystal display device using a substrate, in which a ultraviolet-ray absorbing film is formed, according to the seventh embodiment.

Further, in the seventh embodiment, the case is explained where the glass plate is employed as the substrate 101. In this case, if a plate formed of organic material such as acrylic resin that has high absorptivity of the ultraviolet (UV) ray as the sensitive wavelength of the photoresist is used as the substrate 101, the light passing through the substrate 101 is attenuated by the substrate 101. Thus, the influence of the groove can be reduced much more. Also, as shown in FIG. 33, in case a UV absorbing film 110a made of material such as acrylic resin that can absorb easily a ultraviolet ray rather than the substrate 101 is formed on the substrate 101, the similar advantage can be achieved.

Eighth Embodiment

Figure 34A:
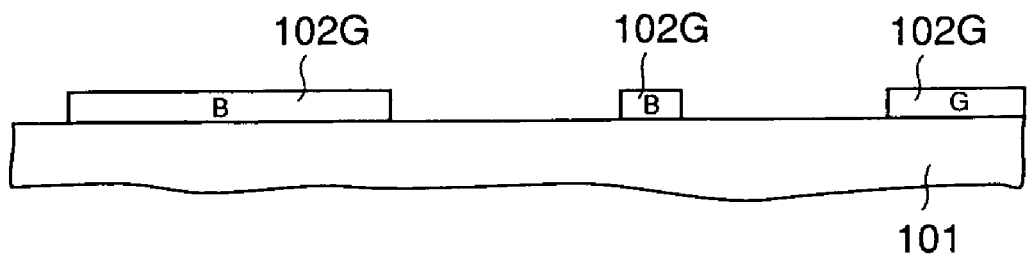
FIGS. 34A to 34C are sectional views showing a method of manufacturing a CF substrate of a liquid crystal display device according to an eighth embodiment of the present invention.
Figure 34B:
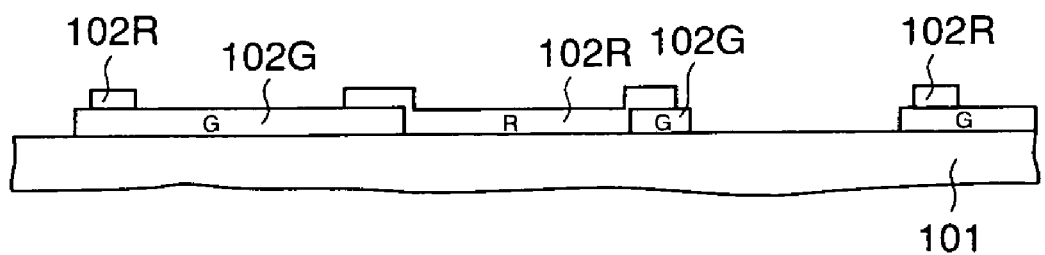
Figure 34C:
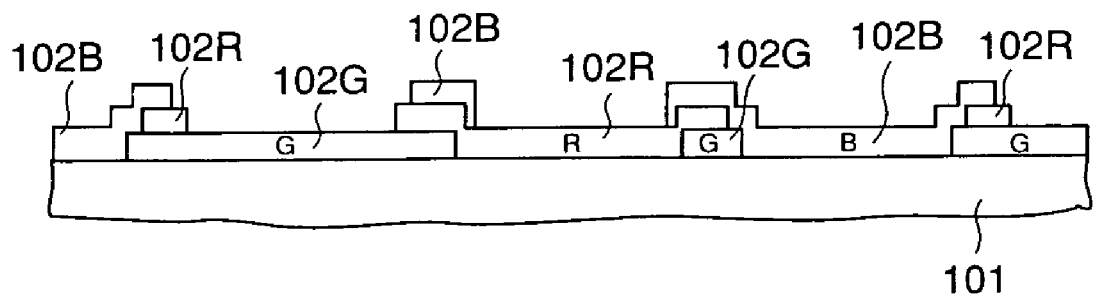
Figure 35A:
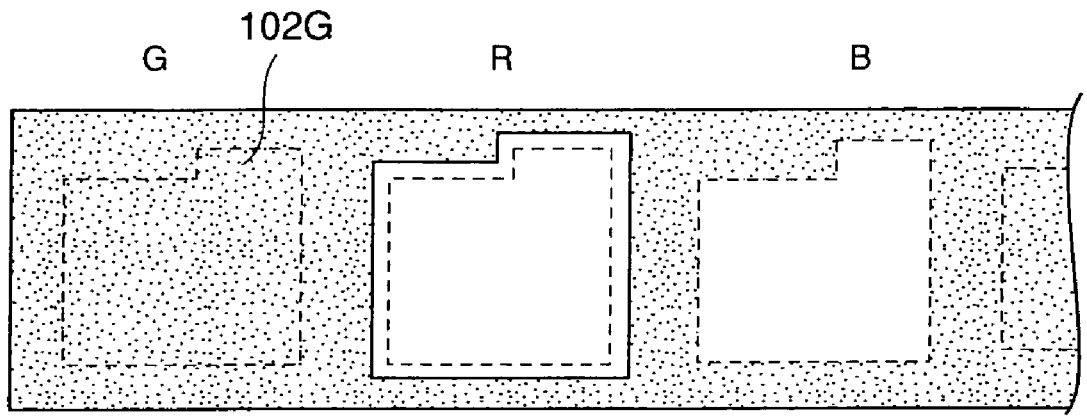
FIGS. 35A to 35C are plan views showing the method of manufacturing the CF substrate of the liquid crystal display device shown in FIGS. 34A to 34C.
Figure 35B:
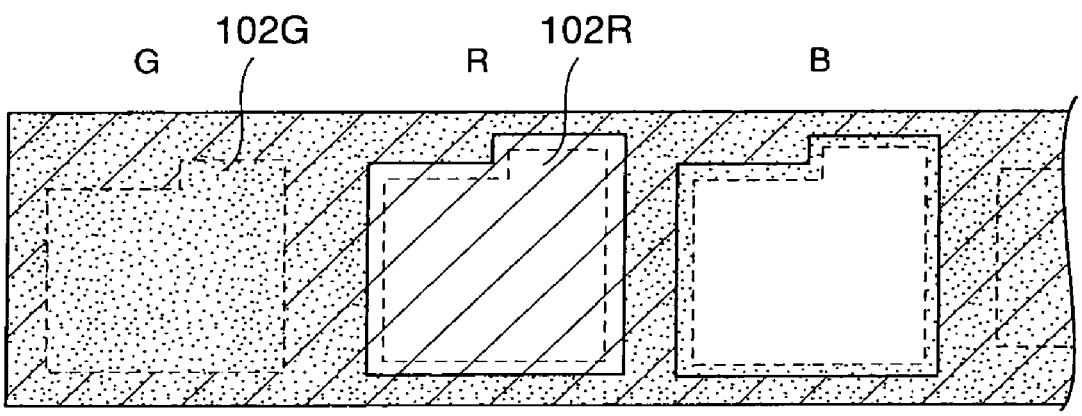
Figure 35C:
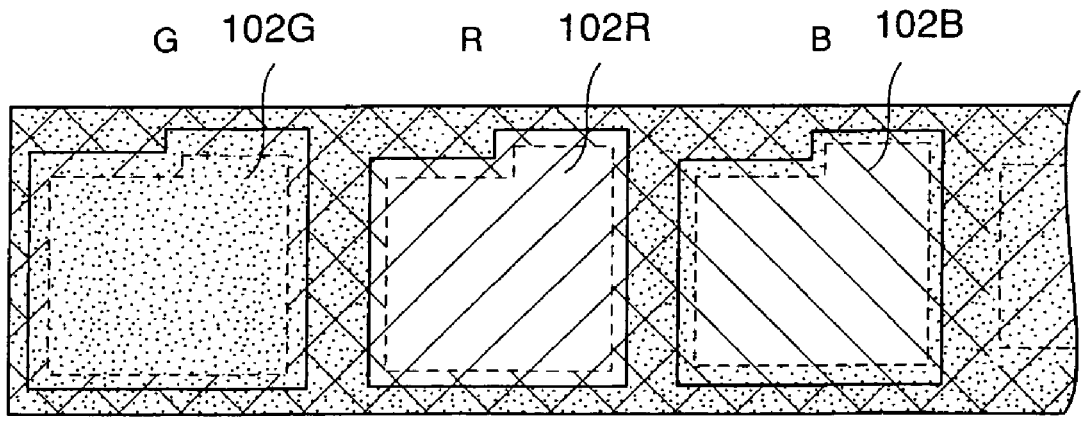

FIGS. 34A to 34C are sectional views showing a method of manufacturing a CF substrate of a liquid crystal display device according to an eighth embodiment of the present invention. FIGS. 35A to 35C are plan views showing the method of manufacturing the CF substrate of the liquid crystal display device shown in FIGS. 34A to 34C. In this case, in FIGS. 35A to 35C, the inside of the broken line indicates selectively the red pixel region, the green pixel region, and the blue pixel region.

First, as shown in FIG. 34A and FIG. 35A, the green color filter 102G is formed on the green pixel region (G) and its periphery, the red pixel region (R) and its periphery, and the blue pixel region (B) and its periphery, by coating the photoresist containing the green pigment on the glass substrate 101 to have a thickness of about 1.5 μm, and then exposing and developing the photoresist. In this case, as shown in FIG. 35A, the green color filter 102G is not formed in a predetermined area from the edge portion of the red pixel region (R).

Then, as shown in FIG. 34B and FIG. 35B, the red color filter 102R is formed on the red pixel region (R) and its periphery, the blue pixel region (B) and its periphery, and the green pixel region (G), by coating the photoresist containing the red pigment on the glass substrate 101 to have a thickness of about 1.5 μm, and then exposing and developing the photoresist. In this case, as shown in FIG. 35B, the red color filter 102R is not formed in a predetermined area from the edge portion of the blue pixel region (B).

Then, as shown in FIG. 34C and FIG. 35C, the blue color filter 102B is formed on the blue pixel region (B) and its periphery, the green pixel region (G) and its periphery, and the red pixel region (R) and its periphery, by coating the photoresist containing the blue pigment on the glass substrate 101 to have a thickness of about 1.5 μm, and then exposing and developing the photoresist. In this case, as shown in FIG. 35C, the blue color filter 102B is not formed in a predetermined area from the edge portion of the green pixel region (G).

Then, like the seventh embodiment, the common electrode made of ITO is formed on the overall upper surface of the glass substrate 101. Then, the spacers and the projections are formed as occasion demands, and then the alignment film is formed on the overall upper surface of the glass substrate 101. Accordingly, the CF substrate can be completed. Then, the CF substrate and the separately prepared TFT substrate are connected to each other and then the liquid crystal is sealed between both substrates. As a result, the liquid crystal display device can be completed.

Figure 36:
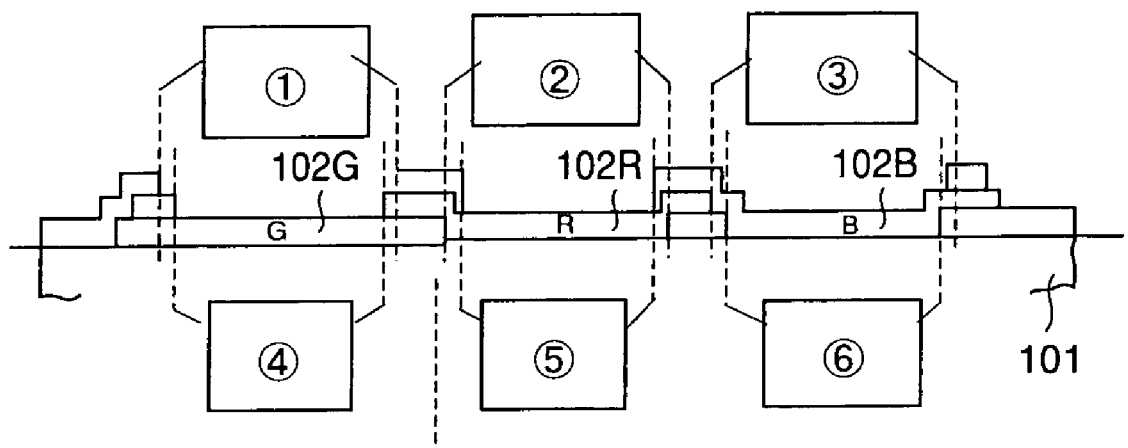
FIG. 36 is a schematic sectional view (#1) showing edges of the color filters to decide edges of the pixel portion, according to the eighth embodiment.

In the eighth embodiment, as shown in FIG. 36, the edge of the green pixel region (G) is decided by the edge of the second layer red color filter 102R, the edge of the red pixel region (R) is decided by the edge of the second layer blue color filter 102B, and the edge of the blue pixel region (B) is decided by the edge of the first layer green color filter 102G. In this manner, since the edges of the green pixel region (G) and the red pixel region (R) are decided by the edge of the second layer color filter, they are seldom affected by the reflected light from the stage of the exposing equipment, and thus the trace of the stage due to the reflected light from the groove on the stage can be avoided. Also, the edge of the blue pixel region is decided by the first layer green color filter 102G. In this case, as described in the seventh embodiment, since the OD value of the laminated body of the green color filter 102G and the blue color filter 102B is small, the trace of the stage is difficult to be conspicuous.

If UV absorbing material (e.g., HALS (Hindered Amine Light Stabilizer), etc.) is added into the resist as material of the green color filter and the red color filter, the influence of the reflected light from the stage can be reduced much more. Also, as described in the seventh embodiment, the plate formed of the acrylic resin may be employed as the substrate 101, or the glass substrate on which the resin such as acrylic resin, etc. is coated may be employed.

In the above eighth embodiment, the color filters are formed in the order of the green color filter, the red color filter, and the blue color filter. But the forming order of the red color filter and the blue color filter may be replaced with each other.

Further, in the liquid crystal display device such as the normally black type liquid crystal display device in which the OD value required for the black matrix may be set relatively low, the edges of the pixel regions may be positioned, as shown by (i) in FIG. 36. In the liquid crystal display device such as the normally white type liquid crystal display device in which the OD value required for the black matrix may be set relatively high, the edges of the pixel regions may be positioned, as shown by (ii) in FIG. 36. Thus, the eighth embodiment can correspond to various liquid crystal panels.

Figure 37:
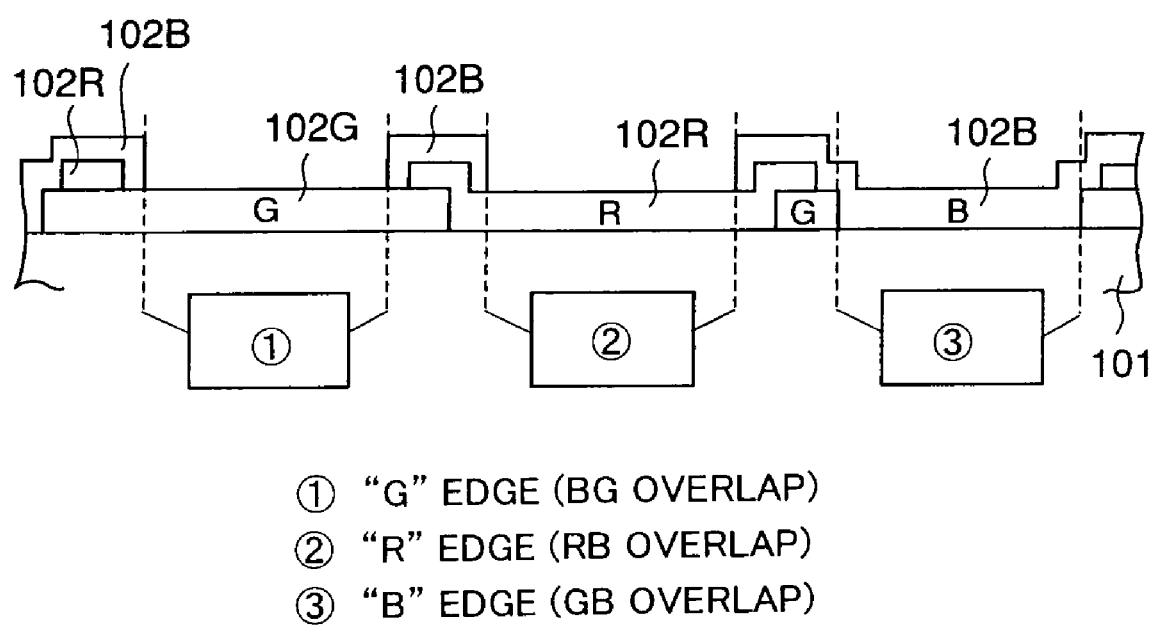
FIG. 37 is a schematic sectional view (#2) showing edges of the color filter to decide edges of the pixel portion, according to the eighth embodiment.

Moreover, as shown in FIG. 37, the blue color filter 102B may be extended up to the edge of the green pixel region.

Ninth Embodiment

A ninth embodiment of the present invention will be explained hereunder. A volume of the liquid crystal sealed into the liquid crystal display device is changed by the thermal expansion or thermal contraction due to the temperature change. For example, if the liquid crystal display device is placed in the environment from the atmospheric temperature to −20° C. and the environmental test for changing the temperature to 60° C. is executed, the volume of the liquid crystal is changed by such a degree that corresponds to the cell gap of ±0.1 µm.

If an elastic force of the spacers cannot follow to the thermal contraction of the liquid crystal, the pressure of the liquid crystal is lowered. In the extreme case, foams are generated in the liquid crystal display device (liquid crystal panel). Also, since normally the pressure in the cells is lower than the atmospheric pressure immediately after the liquid crystal is injected, the spacers are compressed. If the elastic force of the spacers cannot follow to the change of the cell gap when the liquid crystal is thermally expanded, the clearance is generated between the spacers and the substrate and thus the variation of the cell gap is caused.

In contrast, in the manufacturing steps of the liquid crystal display device, the pressure of about five atm pressure is applied to the overall liquid crystal panel by the autoclave. Also, the situation that, in used of the liquid crystal display device, the high pressure is applied partially by the finger, etc. of the user (so-called surface touch) may bed considered. If the high pressure is applied to the liquid crystal display device in this manner, the plastic deformation of the spacers is caused and the spacers cannot return to the original shape. In addition, if the high pressure is applied to the liquid crystal display device, it may also be considered that short-circuit between the pixel electrode on the TFT substrate side and the common electrode on the CF substrate side is caused. Therefore, it is needed to prevent the excessive deformation of the spacers.

For this reason, the ninth embodiment provides the liquid crystal display device that can avoid the pressure change of the liquid crystal and the variation in the cell gap because of the temperature change, prevent the excessive deformation of the spacers if the high pressure is applied, and provide the good display quality.

Figure 38:
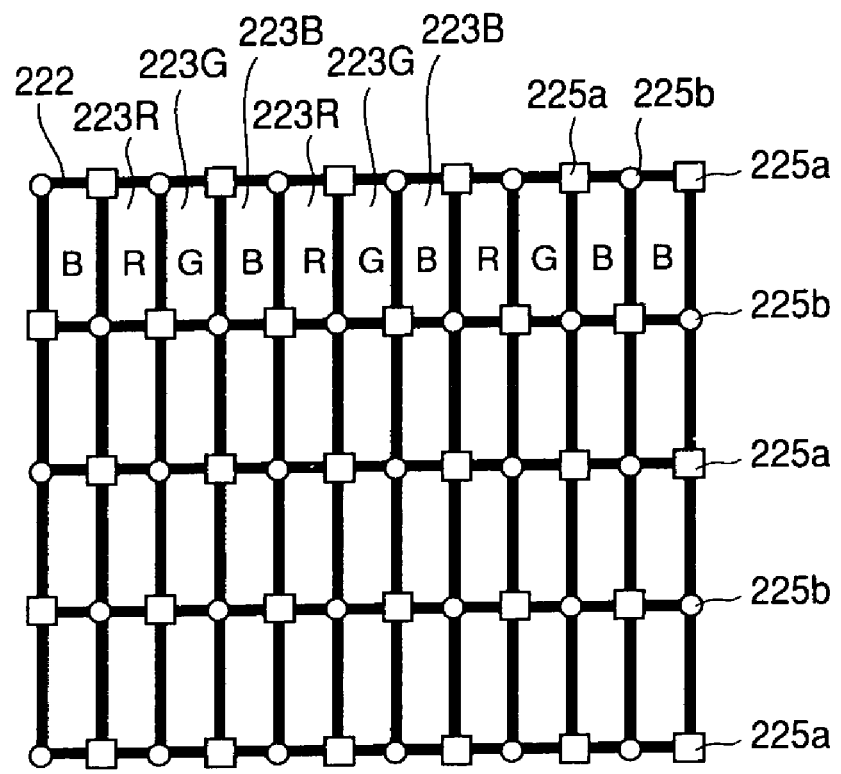
FIG. 38 is a schematic plan view showing a liquid crystal display device according to a ninth embodiment of the present invention.
Figure 39:
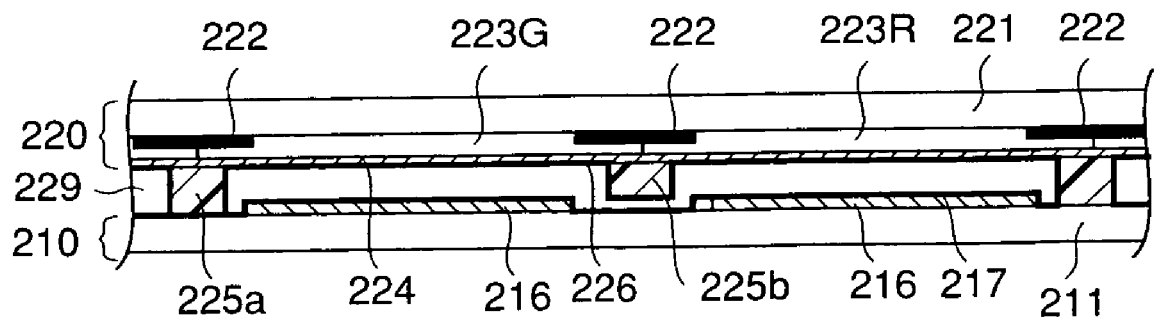
FIG. 39 is a sectional view showing a sectional shape taken along the black matrix of the liquid crystal display device in FIG. 38.

FIG. 38 is a plan view showing a CF substrate of the liquid crystal display device according to the ninth embodiment. FIG. 39 is a sectional view showing a sectional shape taken along the black matrix 222 of the liquid crystal display device in FIG. 38. In FIG. 38, a □ mark indicates the position of a spacer 225*a* having a high height, and a ○ mark indicates the position of a spacer 225*b* having a low height.

The liquid crystal display device according to the ninth embodiment consists of a TFT substrate 210, a CF substrate 220, and a liquid crystal 219 sealed between the TFT substrate 210 and the CF substrate 220.

The TFT substrate 210 is constructed as follows. That is, like the first embodiment, gate bus lines (not shown), data bus lines (not shown), and TFTs (not shown) are formed on a glass substrate 211, and pixel electrodes 216 made of ITO are formed on them via an insulating film (not shown). Also, an alignment film 217 is formed on the upper side of the glass substrate 211, and then surfaces of the pixel electrodes 216 are covered with the alignment film 217.

Meanwhile, the CF substrate 220 is constructed as follows. That is, a black matrix 222 is formed on the lower surface side of the glass substrate 221, and the RGB color filters 223R, 223G, 223B are formed to correspond to opening portions of the black matrix 222, i.e., respective pixel regions. Also, a common electrode 224 made of ITO is formed under the color filters 223R, 223G, 223B. Spacers 225*a*, 225*b* made of resin are formed under the common electrode 224. These spacers 225*a*, 225*b* are arranged at positions that correspond to intersecting points between the gate bus lines and the data bus lines on the TFT substrate side. Also, in this example, as shown in FIG. 38 and FIG. 39, the spacers 225*a* having the high height and the spacers 225*b* having the low height are arranged alternately. In addition, an alignment film 226 is formed on the lower surface side of the substrate 221, and then surfaces of the common electrode 224 and the spacers 225*a*, 225*b* are covered with the alignment film 226.

In the liquid crystal display device according to the ninth embodiment, as shown in FIG. 39, top end portions of the spacers 225*a* come into contact with the TFT substrate 210 at the ordinary temperature, but top end portions of the spacers 225*b* are separated from the TFT substrate 210. In this example, the height of the spacers 225*a* (height from the surface of the common electrode 224) is 4 µm, and the height of the spacers 225*b* (height from the surface of the common electrode 224) is 3.8 µm.

The deformation of the spacers according to the temperature change and the pressure application will be explained hereunder.

If the pressure in the cell is lower than one atm (1013.25 hPa), the compressive load is applied to the spacers 225*a*. When the compressive load is small, the load is applied only to the spacers 225*a* but the load is not applied to the spacers 225*b*. Accordingly, only the spacers 225*a* are elastically deformed to respond to the change in the pressure. In this case, an amount of deformation of the spacers 225*a* against the pressure can be adjusted by selecting appropriately the dispersion density, sectional area, and material of the spacers 225*a*.

If the large pressure is partially applied to the liquid crystal display device, or if the large pressure is applied to the overall liquid crystal display device because of the autoclave, the cell gap is reduced and thus the spacers 225*b* as well as the spacers 225*a* come into contact with the TFT substrate 210. As a result, since the pressure is scattered to the spacers 225*a* and the spacers 225*b*, the excessive deformation of the spacers 225*a*, 225*b* can be prevented.

Figure 40:
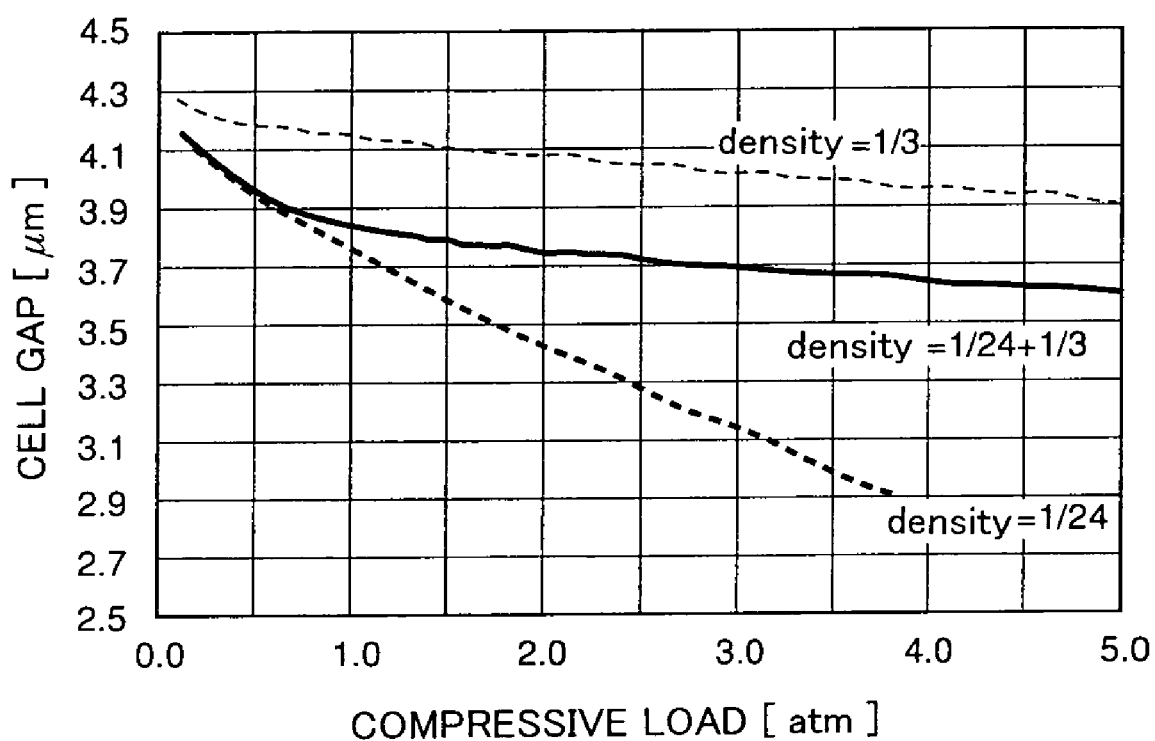
FIG. 40 is a graph showing calculated results of change in a cell gap by a compressive load.

FIG. 40 is a graph showing the change in the cell gap against the compressive load, in which an abscissa denotes the compressive load (atmospheric pressure) and an ordinate denotes the cell gap. In this case, in FIG. 40, there are shown an example of the case where the spacers having the uniform height (4 µm) are provided in every third pixel (labeled as the density=⅓), an example of the case where the spacers having the uniform height (4 µm) are provided in every twenty-fourth pixel (labeled as the density=1/24), and an example of the case where the spacers having the uniform height of 4 µm are provided in every twenty-fourth pixel and the spacers having the uniform height of 3.8 µm are provided in every third pixel (labeled as the density=1/24+⅓). As can be seen from FIG. 40, in the case of the density=1/24+⅓, the spacers can follow softly the change in the cell gap, like the case of the density=1/24, when the compressive load is less than one atm. Also, a rate of the change in the cell gap to the pressure change becomes small, like the case of the density=⅓, when the compressive load is large (more than one atm).

A method of manufacturing the liquid crystal display device according to the ninth embodiment will be explained hereunder.

FIGS. 41A to 41G are sectional views showing a method of manufacturing a CF substrate of the liquid crystal display device according to the ninth embodiment.

Figure 41A:
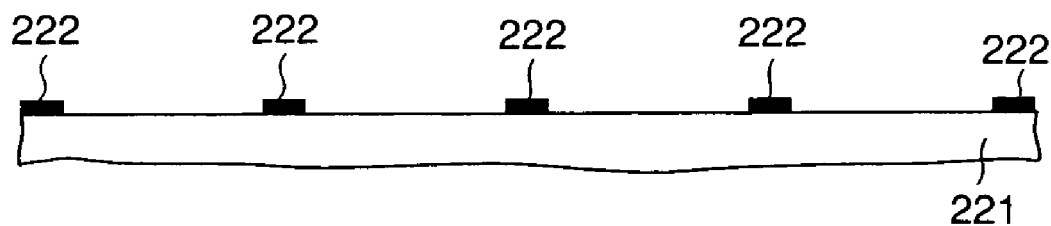
FIGS. 41A to 41G are sectional views showing a method of manufacturing a CF substrate of the liquid crystal display device according to the ninth embodiment.

First, as shown in FIG. 41A, the black matrix 222 is formed by forming the Cr film on the overall upper surface of the glass substrate 221 to have a thickness of 0.15 µm, and then patterning the Cr film by virtue of the photolithography method.

Figure 41B:
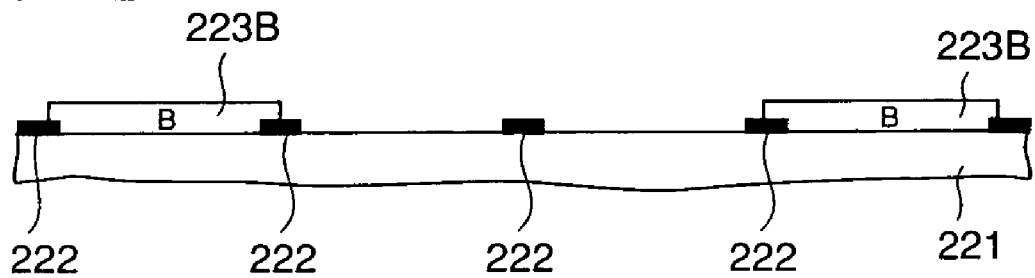

Then, as shown in FIG. 41B, the blue (B) color filter 223B is formed on the black matrix 222 in the blue pixel region and it periphery by coating the acrylic resist (negative type photoresist), into which the blue pigment is dispersed, on the overall upper surface of the glass substrate 221 by means of the spin coating method and then exposing/developing the resist.

Figure 41C:
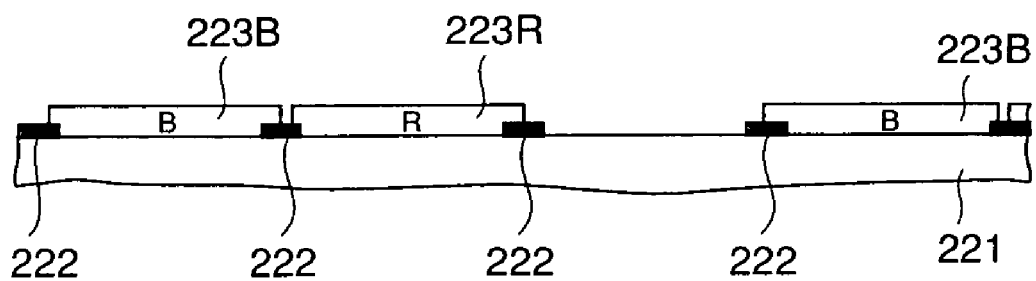

Then, as shown in FIG. 41C, the red (R) color filter 223R is formed on the black matrix 222 in the red pixel region and it periphery by coating the acrylic resist (negative type photoresist), into which the red pigment is dispersed, on the overall upper surface of the glass substrate 221 by means of the spin coating method and then exposing/ developing the resist.

Figure 41D:
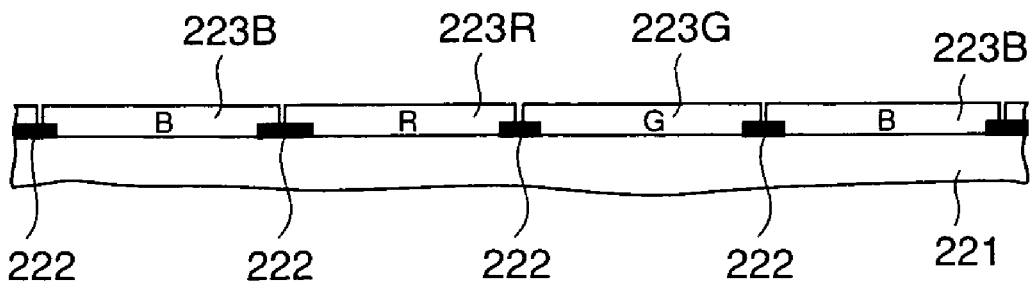

Then, as shown in FIG. 41D, the green (G) color filter 223G is formed on the black matrix 222 in the green pixel region and it periphery by coating the acrylic resist(negative type photoresist), into which the green pigment is dispersed, on the overall upper surface of the glass substrate 221 by means of the spin coating method and then exposing/developing the resist.

Figure 41E:
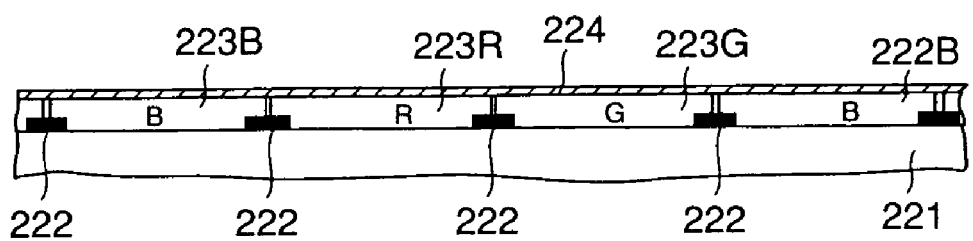

Then, as shown in FIG. 41E, the common electrode 224 made of ITO is formed on the overall upper surface of the glass substrate 221 by the sputter method to have a thickness of about 0.15 µm, and then surfaces of the color filters 223R, 223G, 223B are covered with the common electrode 224.

Figure 41F:
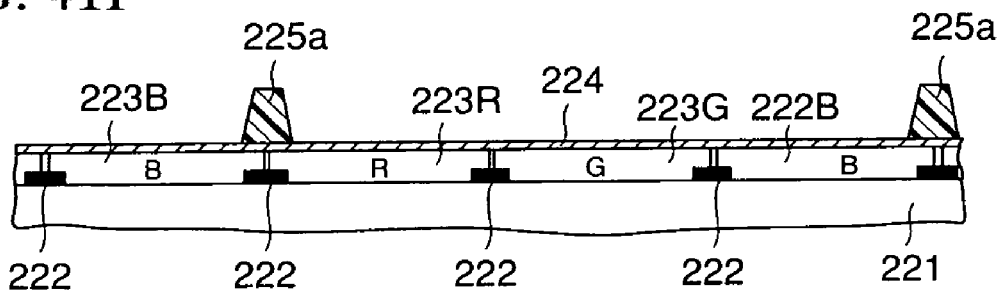

Then, as shown in FIG. 41F, the spacers 225a having a height of about 4 µm are formed by coating the negative type acrylic photoresist on the glass substrate 221 by means of the spin coating method and then exposing/developing the photoresist. In FIG. 41F, the case where the spacers 225a are formed at the rate of three pixels to one is illustrated, but the spacers 225a may be formed at the rate of twenty-four pixels to one, as described above. In this case, the spacers 225a are formed at the positions which correspond to the intersecting portions between the gate bus lines and the data bus lines on the TFT substrate side.

Figure 41G:
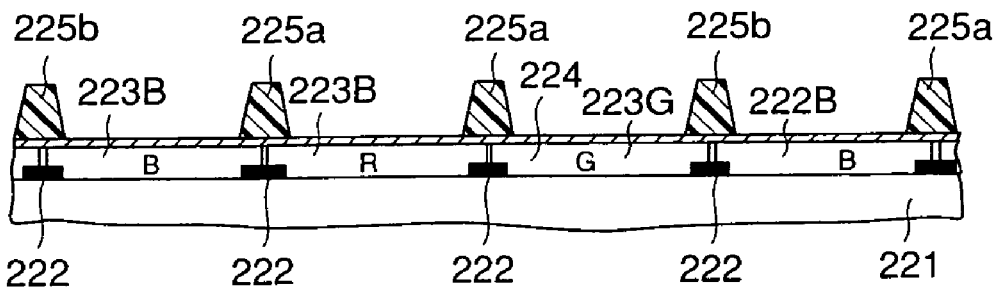

Then, as shown in FIG. 41G, the spacers 225a having the height of about 3.8 µm are formed by coating the negative type acrylic photoresist on the upper side of the glass substrate 221 by means of the spin coating method and then exposing/developing the photoresist. In FIG. 41G, the case where the spacers 225b are formed at the rate of three pixels to two is illustrated, but as described above the spacers 225b may be formed at the rate of three pixels to one. In this case, the spacers 225b are formed at the positions which correspond to the intersecting portions between the gate bus lines and the data bus lines on the TFT substrate side and at which the spacers 225a are not formed. In this case, the spacers 225a and the spacers 225b may be formed of the same material, otherwise the spacers 225a may be formed of the resin whose compressive strength is relatively low (i.e., whose elasticity is large) and the spacers 225b may be formed of the resin whose compressive strength is relatively high. Also, the distribution density of the spacers 225a and the distribution density of the spacers 225b are appropriately set according to the requested specifications.

After this, the alignment film made of polyimide is formed on the entire surface, and the surfaces of the common electrode 224 and the spacers 225a, 225b are covered with the alignment film. Accordingly, the CF substrate can be completed.

In contrast, the TFT substrate can be formed in the same way as the first embodiment, for example (see FIG. 4 to FIG. 6). More particularly, the gate bus lines and the auxiliary capacitance bus lines are formed by forming a metal film on the glass substrate 211 and then patterning the metal film by virtue of the photolithography method. Then, an insulating film is formed on the entire surface and then a silicon film acting as the active layers of the TFTs is formed thereon.

Then, an insulating film is formed on the entire surface. Then, a metal film is formed on the insulating film, and then the data bus line, the source electrodes and the drain electrodes are formed by patterning the metal film by virtue of the photolithography method.

Then, an insulating film is formed on the overall upper surface of the substrate 211, and then an ITO film is formed on the insulating film. Then, the pixel electrodes 216 are formed by patterning the ITO film. Then, the alignment film 217 is formed on the overall surface. Accordingly, the TFT substrate can be completed.

The CF substrate 220 formed in this manner and the TFT substrate 210 are stuck together, and then the liquid crystal 229 is sealed between both substrates. Accordingly, the liquid crystal display device according to the ninth embodiment can be completed.

In the above example, the case is explained where the acrylic resin is used as the material of the spacers 225a, 225b. The material of the spacers 225a, 225b is not limited to this, such spacers may be formed of polyimide resin, silica resin, epoxy resin, novolak resin, or the like. In case non-photosensitive resin such as polyimide is used, the non-photosensitive resin film is formed on the glass substrate 221 is formed and then patterned by using the photoresist.

In the above example, the case is explained where both the spacers 225a, 225b are formed on the CF substrate side. The spacers 225a, 225b may be formed on the TFT substrate side, otherwise one of the spacers 225a, 225b may be formed on the TFT substrate side and the other of them may be formed on the CF substrate side.

In addition, in the ninth embodiment, the TN liquid crystal display device is explained, but the scope of the present invention is not limited to the TN liquid crystal display device. The present invention may be applied to the STN (Super Twisted Nematic) liquid crystal display device, the MVA (Multi Vertically Aligned) liquid crystal display device, the IPS (In-Panel Switching) liquid crystal display device, the ferroelectric liquid crystal display device, the antiferroelectric liquid crystal display device, and the like.

The examined results of the preferable distribution density of the spacers will be explained hereunder.

Figure 42:
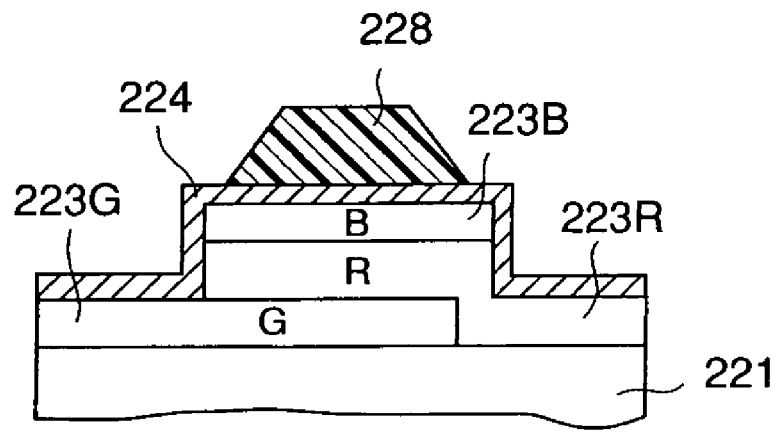
FIG. 42 is a sectional view showing the liquid crystal display device in which a novolak resin film is formed on the color filter as the spacer.
Figure 43:
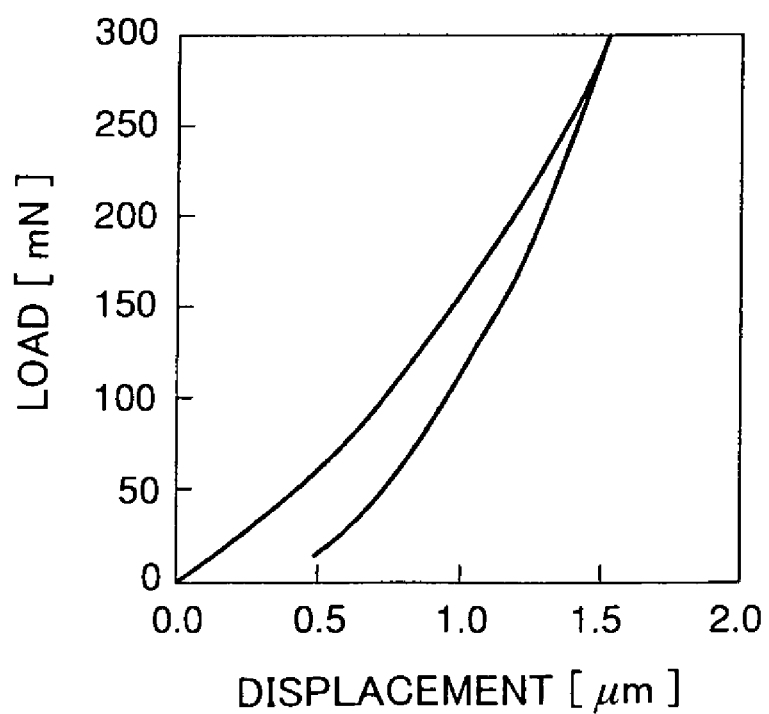
FIG. 43 is a graph showing compression curves of the spacer having a structure in FIG. 42.

As shown in FIG. 42, the spacers are formed by laminating three color filters 223R, 223G, 223B, the common electrode 224 formed of ITO, and the novolak resin film 228. Then, measurement of compression displacement of the spacers is given in FIG. 43. Where an area of the upper portion of the spacer is 500 µm², and the black matrix is formed by laminating three color filters 223R, 223G, 223B.

Figure 44:
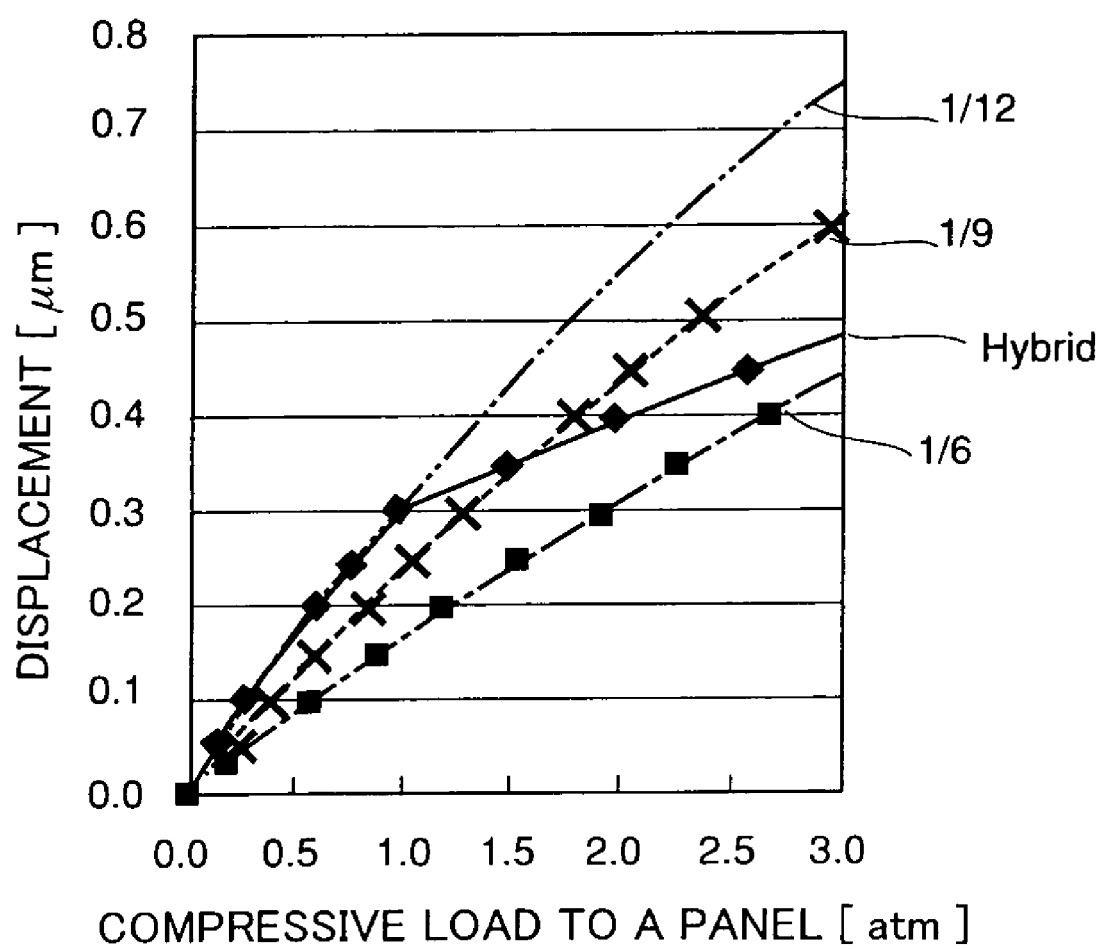
FIG. 44 is a graph showing calculated results of the displacement of the resin spacer against the compressive load.

In the case of such structure, if an amount of displacement against the compression load applied to the liquid crystal panel is calculated under the assumption that displacement hysteresis is small at the maximum load of 50 mN or so, curves shown in FIG. 44 can be obtained.

If the cell inner pressure of the liquid crystal panel is set to 0.7 atm by controlling an injection amount of the liquid crystal, the load of about 0.3 atm is applied to the spacers in the normal state. When the outer temperature is changed from 25° C. to −25° C. or from 25° C. to 60° C., the change in volume of the liquid crystal is about 0.1 µm in terms of the cell gap. That is, in the initial displacement when the load is small, the compressive load must be displaced by about ±0.1 µm from the displacement obtained at 0.3 atm as the center. In this manner, when the load is small, such a tendency is preferable that the spacers are ready to displace. In the above spacers, the upper limit of the spacer density is restricted to less than ⅙ (at the rate of six pixels to one) based on FIG. 44.

In contrast, to give the tolerance against the surface touch by the large load, the displacement must be suppressed in the large load range since the displacement hysteresis of the resin is about 10% of the maximum displacement. Since the actual surface-touch pressure is about two atm, the displacement must be suppressed lower than 0.5 μm to prevent the display irregularity when the compressive load is changed from 0.3 to 2 atm. Accordingly, the lower limit of the spacer density is restricted and is set to the density of 1/12 (at the rate of twelve pixels to one) based on FIG. 44.

On the contrary, according to the autoclave, in order to erase the foam by reducing the volume in the cell by 5%, the spacers must be compressed by about 0.2 μm. In the autoclave, the load of 5 atm is applied to the liquid crystal panel. In this case, since the liquid crystal is tightly sealed and also the sealing member is provided to the periphery of the display portion, the load applied actually to the spacers can be considered as about 1/2. If so, the spacer density must be set to less than 1/6 (at the rate of six pixels to one) to reduce the displacement to less than 0.5 μm.

With the above, the spacers are required to displace easily in the small load range but displace hardly in the small load range.

This requirement can be satisfied by forming the spacers having different heights, like the ninth embodiment. The displacements obtained when the first spacers having the height of 4.0 μm and the density of 1/12 and the second spacers having the height of 3.7 μm and the density of 1/6 are formed are shown by [Hybrid] in FIG. 44. In this fashion, such a desired characteristic of the spacers can be accomplished by the above spacer structure that the displacement is large at the compressive load of 0 to 1 atm and the displacement is relatively small at the compressive load of more than 1 atm.

Tenth Embodiment

Figure 45:
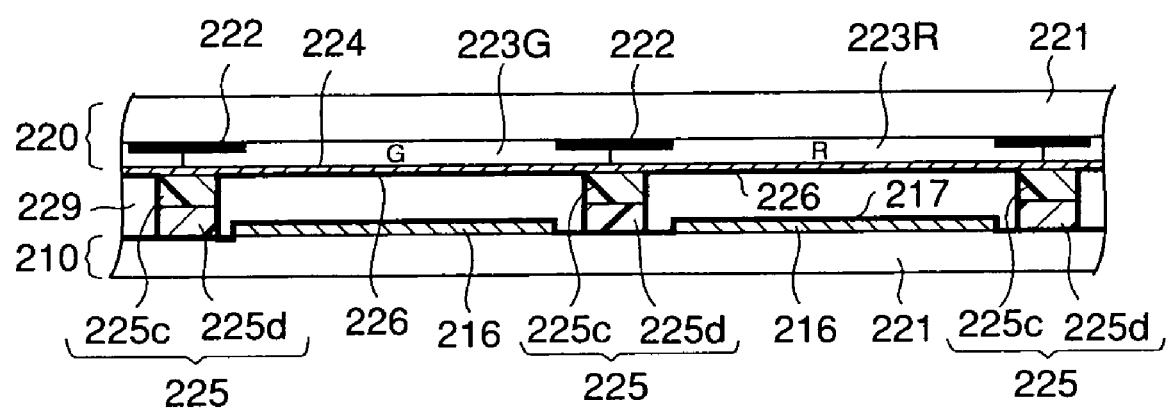
FIG. 45 is a sectional view showing a liquid crystal display device according to a tenth embodiment of the present invention.

FIG. 45 is a sectional view showing a liquid crystal display device according to a tenth embodiment of the present invention. In this case, a difference of the tenth embodiment from the ninth embodiment resides in that the structure of the spacers are different. Since other configurations are basically similar to the ninth embodiment, their detailed explanation will be omitted by affixing the same reference to the same elements as those in FIG. 39 in FIG. 45.

The black matrix 222 is formed on the lower surface side of the glass substrate 221, and the RGB color filters 223R, 223G, 223B are formed to correspond to opening portions of the black matrix 222, i.e., respective pixel regions. Also, the common electrode 224 made of ITO is formed under the color filters 223R, 223G, 223B. Double-layered spacers 225 made of resin films 225c, 225d are formed under the common electrode 224. The resin films 225c, 225d are formed of materials whose elastic force is different mutually. For example, the resin film 225c is formed of the acrylic resin which has the relatively large compressive strength (small elastic force), and the resin film 225d is formed of the acrylic resin which has the relatively small compressive strength (large elastic force). Also, the spacers 225 are arranged at positions that correspond to intersecting points between the gate bus lines and the data bus lines on the TFT substrate 210 side. In FIG. 45, the case is shown where the spacer 225 is formed every pixel, but the spacers 225 may be formed on at the rate of several pixels to one.

In addition, the alignment film 226 is formed on the lower surface side of the substrate 221, and then the surfaces of the common electrode 224 and the spacers 225 are covered with the alignment film 226. The top end portions of the spacers 225 come into contact with the TFT substrate 210 and thus the cell gap between the TFT substrate 210 and the CF substrate 220 can be maintained at the uniform thickness.

In the tenth embodiment, the spacers 225 are formed of the double-layered structure consisting of the resin film 225c having the small elastic force and the resin film 225d having the large elastic force. Accordingly, when the compressive stress is relatively small, mainly the resin film 225d is elastically deformed to follow the change in the cell gap. Also, when the large compressive stress is applied, the stress is applied to not only the resin film 225d but also the resin film 225c. However, since the resin film 225c has the small elastic force, an amount of deformation against the compressive stress is small. As a result, the situation that the spacers 225 are excessively deformed by the excessive stress can be avoided. In this example, the same advantage as that in the ninth embodiment can be achieved.

FIGS. 46A to 46G are sectional views showing a method of manufacturing the CF substrate 220 of the liquid crystal display device according to the tenth embodiment.

Figure 46A:
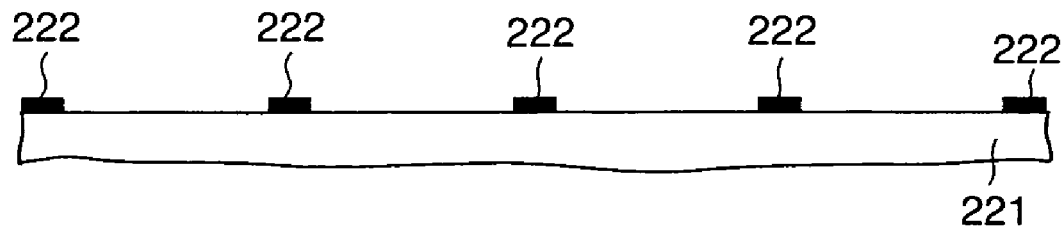
FIGS. 46A to 46G are sectional views showing a method of manufacturing a CF substrate of the liquid crystal display device according to the tenth embodiment.

First, as shown in FIG. 46A, the black matrix 222 is formed by forming the Cr film on the overall upper surface of the glass substrate 221 to have a thickness of 0.15 μm, and then patterning the Cr film by virtue of the photolithography method.

Figure 46B:
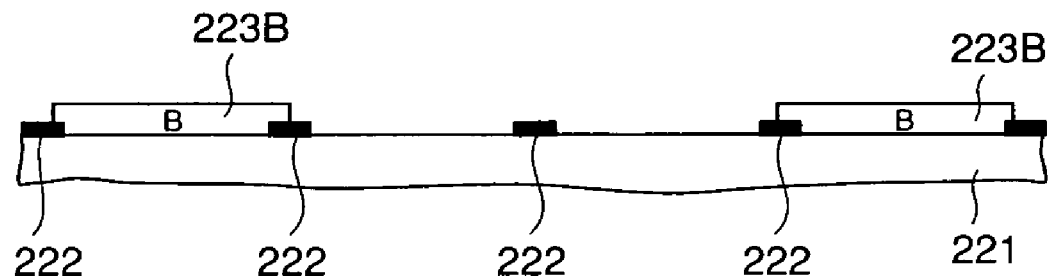

Then, as shown in FIG. 46B, the blue (B) color filter 223B is formed on the black matrix 222 in the blue pixel region and it periphery, by coating the acrylic resist (negative type photoresist), into which the blue pigment is dispersed, on the overall upper surface of the glass substrate 221 by means of the spin coating method and then exposing/developing the resist.

Figure 46C:
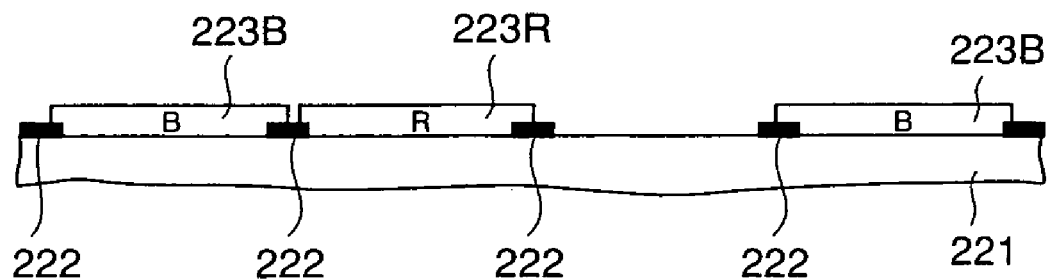

Then, as shown in FIG. 46C, the red (R) color filter 223R is formed on the black matrix 222 in the red pixel region and it periphery by coating the acrylic resist (negative type photoresist), into which the red pigment is dispersed, on the overall upper surface of the glass substrate 221 by means of the spin coating method and then exposing/developing the resist.

Figure 46D:
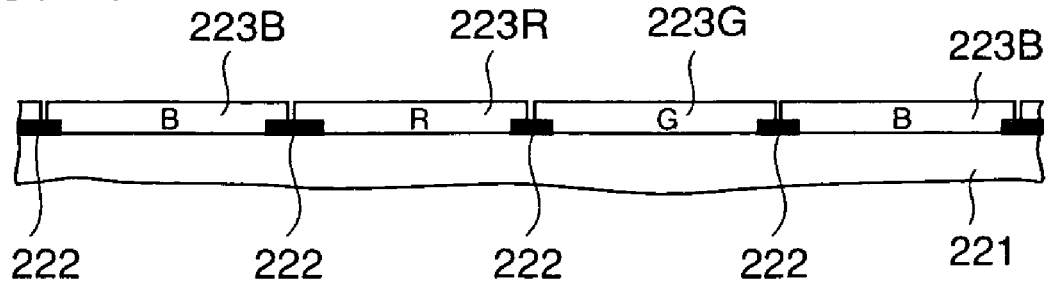

Then, as shown in FIG. 46D, the green (G) color filter 223G is formed on the black matrix 222 in the green pixel region and it periphery by coating the acrylic resist (negative type photoresist), into which the green pigment is dispersed, on the overall upper surface of the glass substrate 221 by means of the spin coating method and then exposing/developing the resist.

Figure 46E:
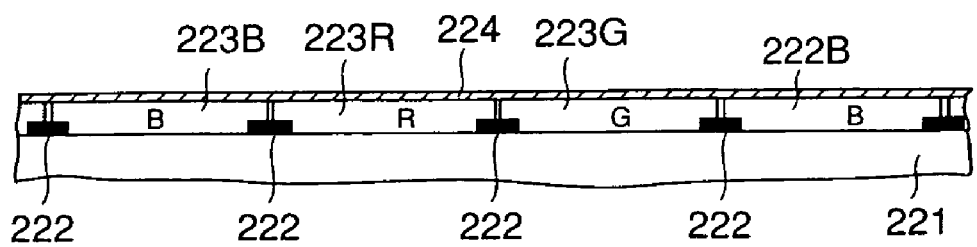

Then, as shown in FIG. 46E, the common electrode 224 made of ITO is formed on the overall upper surface of the glass substrate 221 by the sputter method to have a thickness of about 0.15 μm, and then surfaces of the color filters 223R, 223G, 223B are covered with the common electrode 224.

Figure 46F:
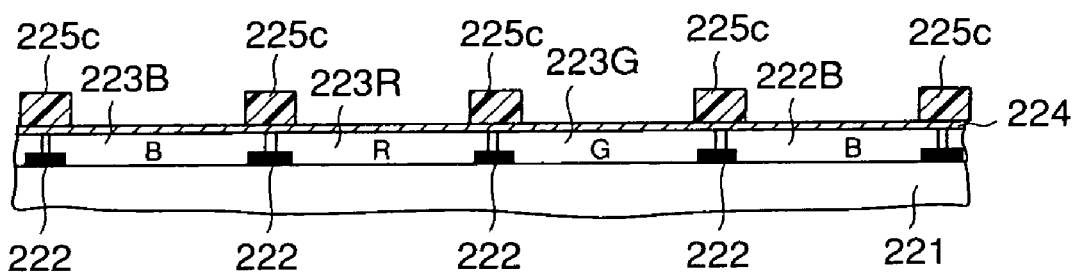

Then, as shown in FIG. 46F, the resin films 225c having a height of about 2.0 μm are formed by coating the negative type acrylic photoresist on the glass substrate 221 by means of the spin coating method and then exposing/developing the photoresist. In FIG. 46F, the case where the resin films 225c are formed in every third pixel is illustrated, but the resin films 225c may be formed on a one-by-several pixels basis. In this case, the resin films 225c are formed at the positions which correspond to the intersecting portions between the gate bus lines and the data bus lines on the TFT substrate side.

Figure 46G:
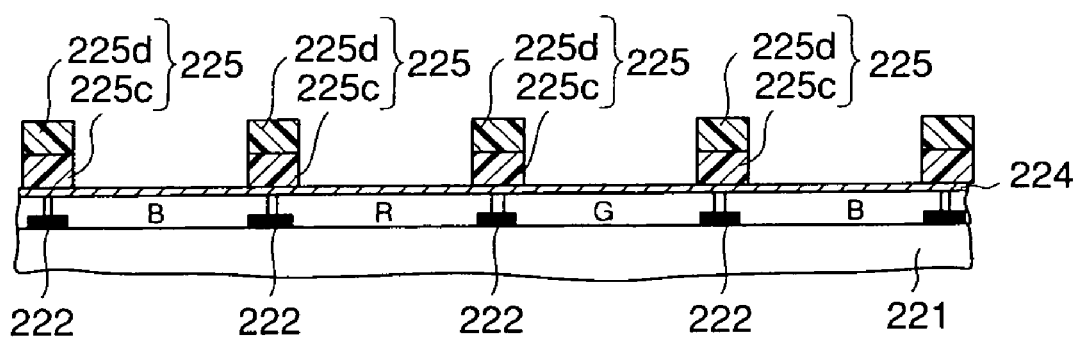

Then, as shown in FIG. 46G, the resin films 225d having a height of about 2.0 μm are formed on the resin films 225c respectively by coating the negative type acrylic photoresist on the upper side of the glass substrate 221 by means of the spin coating method and then exposing/developing the photoresist. Accordingly, the spacers 255 formed of the laminated structure of the resin films 225c, 225d are formed. In this case, the resin films 225*d* are formed of the material that has the larger elasticity than the resin films 225*c*. Also, the elasticity of the resin films 225*c*, 225*d*, the thickness of the resin films 225*c*, 225*d*, and the distribution density of the spacers 225 can be set appropriately according to the requested specifications.

Then, the alignment film made of polyimide is formed on the overall upper surface of the glass substrate 221, and the surfaces of the common electrode 224 and the spacers 225 are covered with the alignment film. Accordingly, the CF substrate can be completed.

In the above example, the case is explained where both the resin films 225*c*, 225*d* are formed on the CF substrate side. But the resin films 225*c*, 225*d* may be formed on the TFT substrate side, otherwise one of the resin films 225*c*, 225*d* may be formed on the CF substrate side and the other of them may be formed on the TFT substrate side.

Eleventh Embodiment

Figure 47:
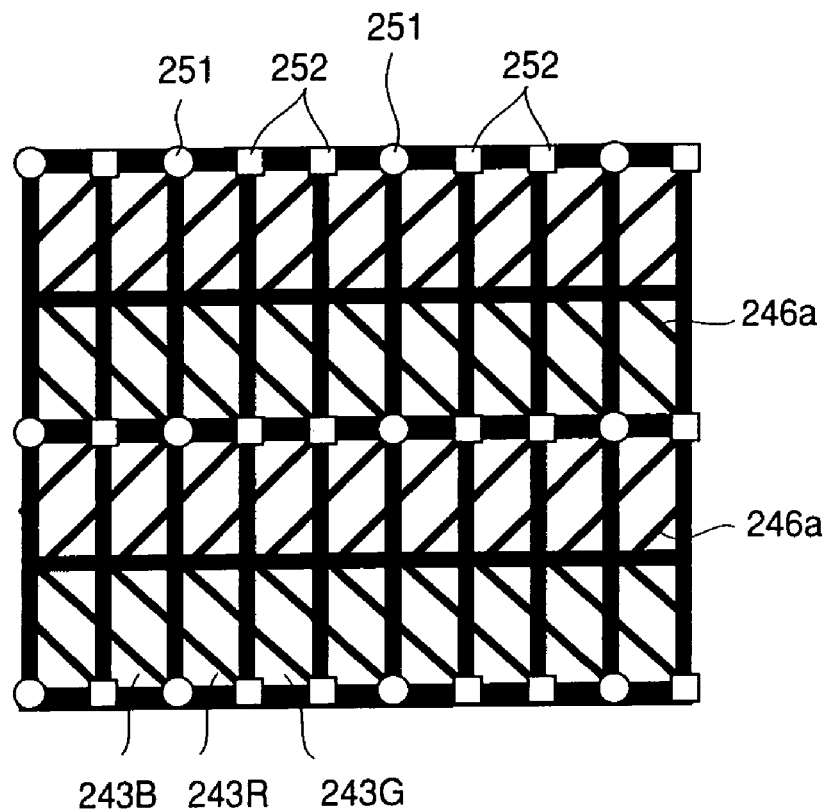
FIG. 47 is a plan view showing a liquid crystal display device according to an eleventh embodiment of the present invention.
Figure 48:
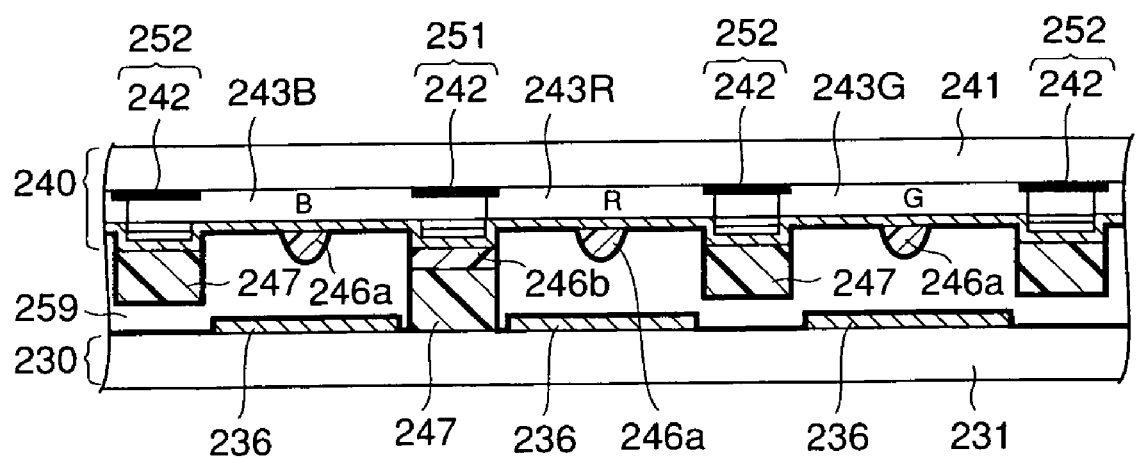
FIG. 48 is a sectional view showing the liquid crystal display device shown in FIG. 47.

FIG. 47 is a plan view showing a liquid crystal display device according to an eleventh embodiment of the present invention. FIG. 48 is a sectional view showing the liquid crystal display device shown in FIG. 47.

The liquid crystal display device according to the eleventh embodiment consists of a TFT substrate 230, a CF substrate 240, and a vertically aligned liquid crystal 259 sealed between the TFT substrate 230 and the CF substrate 240.

The TFT substrate 230 is formed in the same way as the first embodiment (see FIG. 4). That is, gate bus lines (not shown), data bus lines (not shown), auxiliary capacitance bus lines (not shown) and TFTs (not shown) are formed on a glass substrate 231, and pixel electrodes 236 made of ITO are formed on them via an insulating film (not shown). Like the first embodiment, slits (not shown) are provided in the pixel electrodes 236. Also, an alignment film 237 is formed on the upper side of the glass substrate 231, and then surfaces of the pixel electrodes 236 are covered with the alignment film 237.

While, the CF substrate 240 is constructed as follows. That is, a black matrix 242 is formed on the lower surface side of the glass substrate 241. This black matrix 242 is formed in regions that correspond to the gate bus lines, the data bus lines, and the auxiliary capacitance bus lines on the TFT substrate 230 side.

Also, RGB color filters 243R, 243G, 243B are formed on the lower surface side of the glass substrate 241 to correspond to opening portions of the black matrix 242, i.e., respective pixel regions. In the eleventh embodiment, as shown in FIG. 48, the color filters 243R, 243G, 243B are laminated as three layers under the black matrix 242 respectively.

Also, as shown in FIG. 47, domain defining projections 246*a* are formed under the color filters 223R, 223G, 223B in a zigzag fashion. Also, the resin films 246*b* are arranged at the ratio of three pixels to one at positions that correspond to intersecting points between the gate bus lines and the data bus lines. As described above, the resin films 246*b* are formed simultaneously with the projections 246*a* by the same resist film.

In addition, resin films 247 are formed at the intersecting points between the gate bus lines and the data bus lines respectively. Spacers 251 shown in FIG. 47 consist of the color filters 223R, 223G, 223B laminated under the black matrix 242, and the resin films 246*b* and the resin films 247. Also, spacers 252 shown in FIG. 47 consist of the color filters 223R, 223G, 223B laminated under the black matrix 242, and the resin films 247.

Further, an alignment film 248 is formed on the lower surface side of the glass substrate 241, and then surfaces of the common electrode 245, the projections 246*a*, and the spacers 251, 252 are covered with the alignment film 248. In the eleventh embodiment, top end portions of the spacers 251 come into contact with the TFT substrate 230 at the atmospheric temperature, but top end portions of the spacers 252 are separated from the TFT substrate 230.

In the eleventh embodiment, since two types of spacers 251, 252 having the different heights can respond to the change in the cell gap, the same advantage as that in the ninth embodiment can be achieved.

FIGS. 49A to 49G are sectional views showing a method of manufacturing the CF substrate of the liquid crystal display device according to the eleventh embodiment.

Figure 49A:
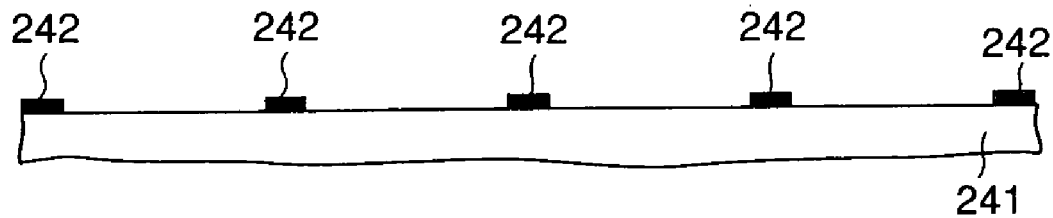
FIGS. 49A to 49G are sectional views showing a method of manufacturing a CF substrate of the liquid crystal display device according to the eleventh embodiment.

First, as shown in FIG. 49A, the low reflection Cr film is formed on the glass substrate 241 to have a thickness of 0.15 μm, and the positive type novolak-based resist (not shown) is formed to have a thickness of about 1.5 μm thereon. Then, the black matrix 222 is formed by patterning the resist via the exposing step and the developing step and then etching the Cr film while using the resist as a mask. Then, the resist is removed.

Figure 49B:
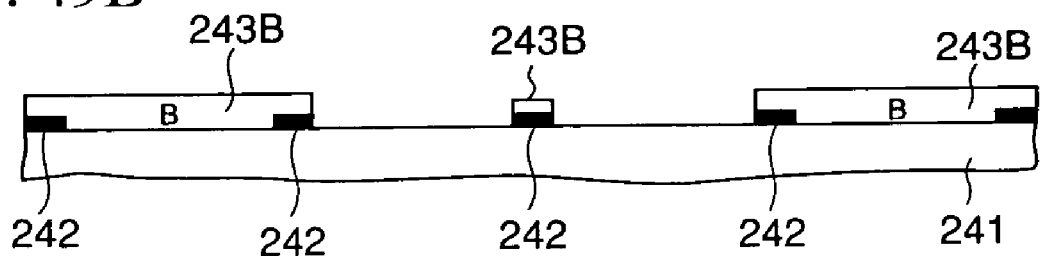

Then, as shown in FIG. 49B, the blue (B) color filter 243B of 1.5 μm thickness is formed in the blue pixel region and the spacer forming region by coating the resist, into which the blue pigment is dispersed, on the overall upper surface of the glass substrate 241 by means of the spin coating method and then exposing/developing the resist.

Figure 49C:
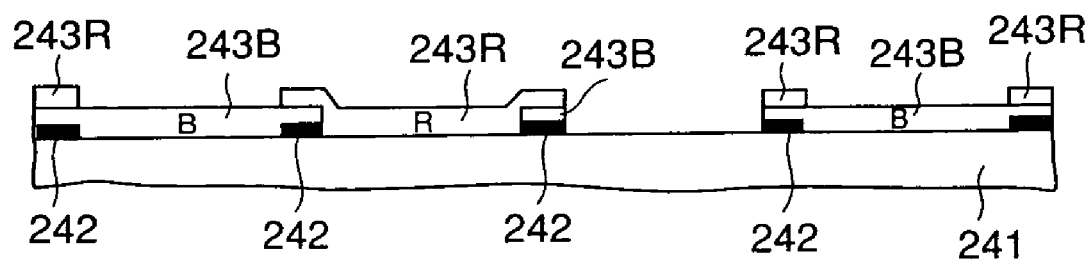

Then, as shown in FIG. 49C, the red (R) color filter 243R of 1.5 μm thickness is formed in the red pixel region and the spacer forming region by coating the resist, into which the red pigment is dispersed, on the overall upper surface of the glass substrate 241 by means of the spin coating method and then exposing/developing the resist. In this case, the thickness of the red color filter 243R in the spacer forming region is thinner than the above thickness.

Figure 49D:
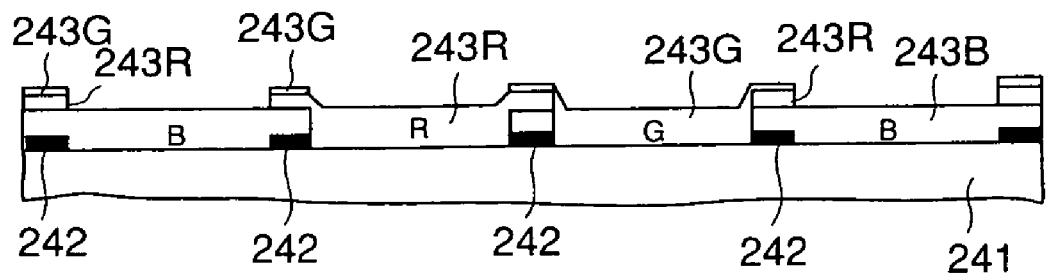

Then, as shown in FIG. 49D, the green (G) color filter 243G of 1.5 μm thickness is formed in the green pixel region and the spacer forming region by coating the resist, into which the green pigment is dispersed, on the overall upper surface of the glass substrate 241 by means of the spin coating method and then exposing/developing the resist. In this case, the thickness of the green color filter 243G in the spacer forming region is thinner than the above thickness.

Figure 49E:
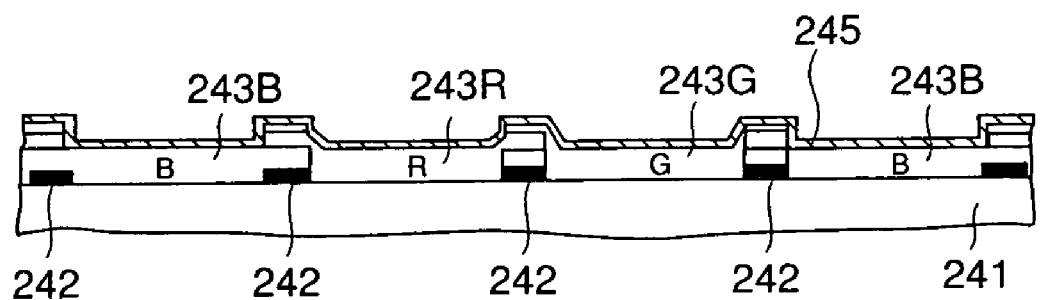

Then, as shown in FIG. 49E, the common electrode 245 about 0.15 μm thickness is formed by sputtering ITO on the overall upper surface of the glass substrate 241.

Then, the positive type novolak-based resist is coated on the common electrode 245 by the spin coating method to have a thickness of about 1.5 μm. Then, the resist is exposed and developed such that the resist is left in a predetermined pattern (pattern of the projections 246*a* and pattern of the spacers 251). Then, the resist pattern is post-baked at the temperature of 200° C.

Figure 49F:
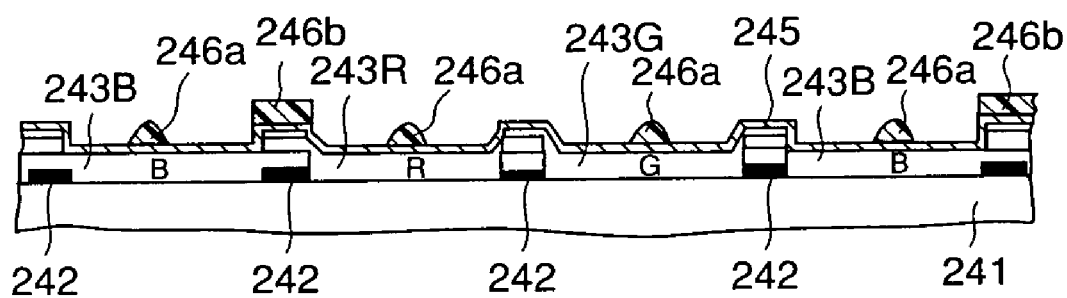

In this manner, as shown in FIG. 49F, the projections 246*a* and the resin films 246*b* are formed on the upper side of the substrate 241. In this case, a laminated height of the color filters 243B, 243R, 243G (height from the surface of the color filter in the pixel region) becomes about 1.7 μm, and a height (thickness) of the resin films 246*b* formed thereon becomes about 0.4 μm because of leveling.

Figure 49G:
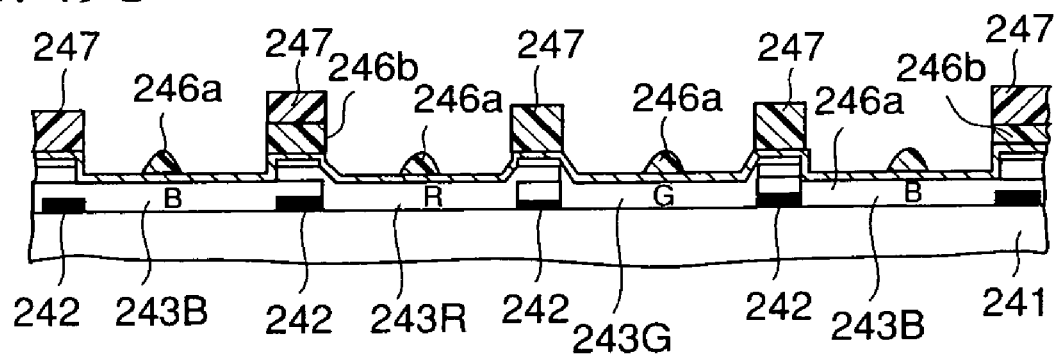

Then, the positive type novolak-based resist is coated on the glass substrate 241 by means of the spin coating method to have a thickness of about 3 μm. Then, the resist is exposed and developed to leave as a predetermined pattern (pattern of the spacers 251, 252). In this way, as shown in FIG. 49G, the resin films 247 are formed on the upper side of the glass substrate 241.

Then, the alignment film 248 is formed on the overall upper surface of the glass substrate 241. Accordingly, the CF substrate can be completed.

Since the method of manufacturing the TFT substrate 230 is similar to that in the first embodiment, its explanation will be omitted herein.

According to the above method, two types of spacers 251, 252 having different heights by about 0.4 μm can be formed relatively easily.

In the above example, the case is explained where the black matrix 242 is formed of the low reflection Cr film. But the black matrix may be formed of black resin (thickness of about 1.0 μm). Also, in the above example, the case is explained where the color filters 243B, 243R, 243G are laminated as three layers in all the spacer forming portions. One or two layers may be laminated in the spacer forming portions if the predetermined cell gap can be assured.

In addition, two types of spacers having different heights may be formed by changing the number of laminated layers of the color filters. This method can be applied to the TN liquid crystal display device that has not the domain defining projections, etc.

Twelfth Embodiment

A method of manufacturing a liquid crystal display device according to a twelfth embodiment of the present invention will be explained hereunder. In this case, since a difference of the twelfth embodiment from the ninth embodiment resides in that the method of manufacturing a CF substrate is different, their redundant explanation of overlapped portion will be omitted.

FIGS. 50A to 50G are sectional views showing the method of manufacturing the CF substrate of the liquid crystal display device according to the twelfth embodiment. FIG. 51 is a schematic plan view showing the CF substrate of the above liquid crystal display device. In FIG. 51, a □ mark indicates the position of the spacer contacting to the TFT substrate in the normal state (spacer having a large height), and a ○ mark indicates the position of the spacer is not contacting to the TFT substrate in the normal state (spacer having a small height).

Figure 50A:
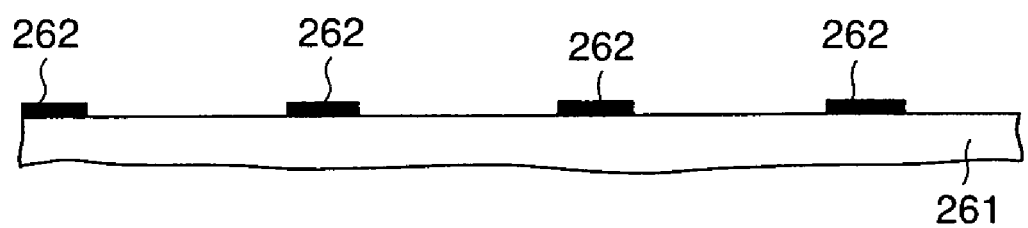
FIGS. 50A to 50G are sectional views showing a method of manufacturing a CF substrate of a liquid crystal display device according to a twelfth embodiment of the present invention.
Figure 51:
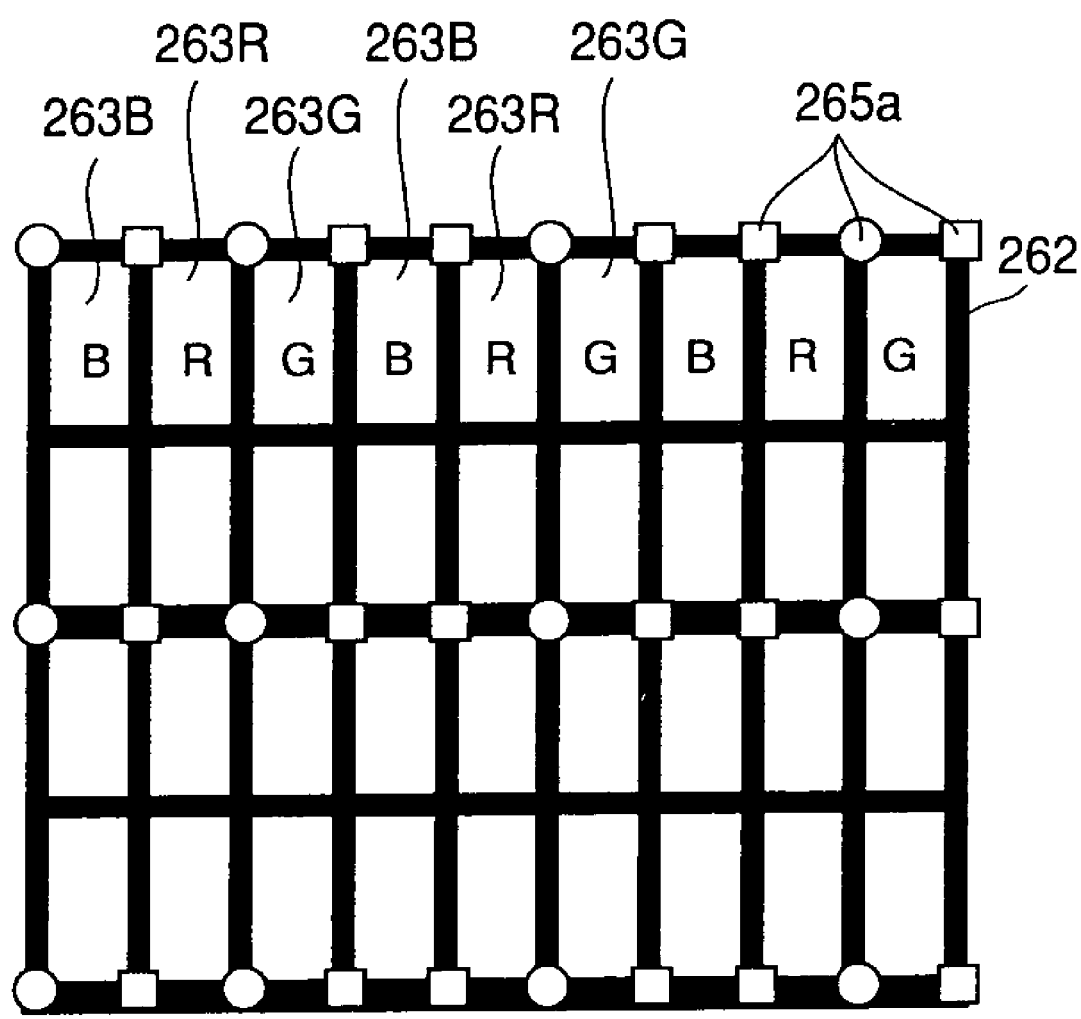
FIG. 51 is a schematic plan view showing the CF substrate of the liquid crystal display device according to the twelfth embodiment.

First, as shown in FIG. 50A, the black matrix 262 is formed by forming the Cr film on the overall upper surface of a glass substrate 261 to have a thickness of 0.15 μm, and then patterning the Cr film by virtue of the photolithography method.

Figure 50B:

Then, as shown in FIG. 50B, the blue (B) color filter 263B is formed in the blue pixel region, by coating the acrylic resist (negative type photoresist), into which the blue pigment is dispersed, on the overall upper surface of the glass substrate 261 by means of the spin coating method and then exposing/developing the resist. At this time, the color filter 263B is also formed on the black matrix 262 at the rate of three pixels to one. In this example, the color filter 263B is formed on the black matrix 262 between the blue pixel region and the red pixel region.

Figure 50C:
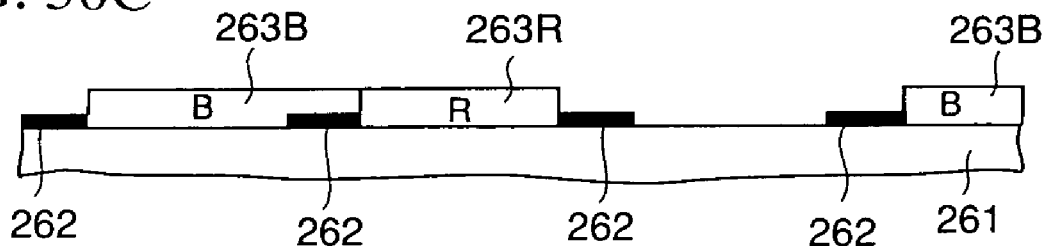

Then, as shown in FIG. 50C, the red (R) color filter 263R is formed in the red pixel region by coating the acrylic resist (negative type photoresist), into which the red pigment is dispersed, on the overall upper surface of the glass substrate 261 by means of the spin coating method and then exposing/developing the resist. In this case, the red color filter 263R is not left on the black matrix 222.

Figure 50D:
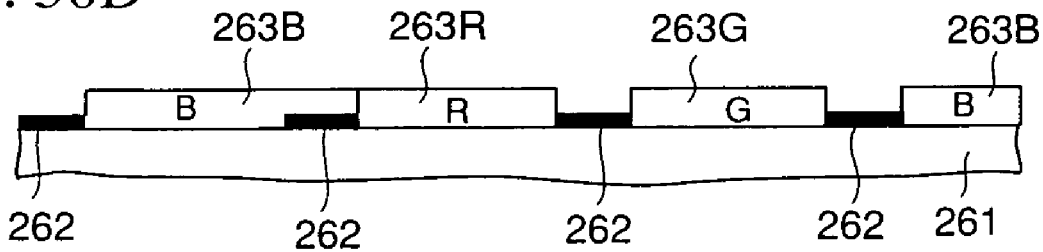
Figure 50E:
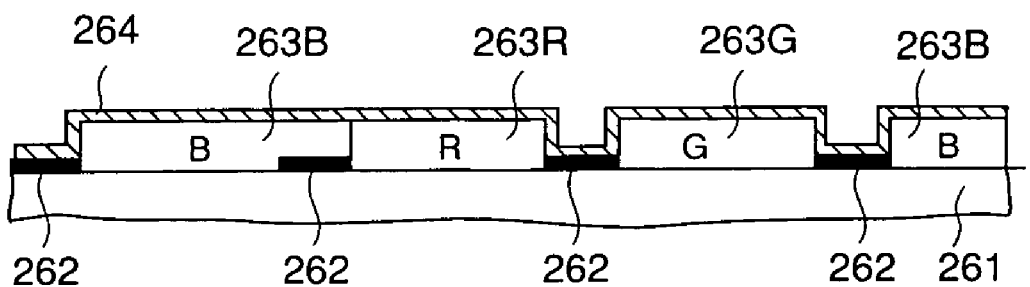

Then, as shown in FIG. 50D, the green (G) color filter 263G is formed in the green pixel region by coating the acrylic resist (negative type photoresist), into which the green pigment is dispersed, on the overall upper surface of the glass substrate 261 by means of the spin coating method and then exposing/developing the resist. In this case, the green color filter 263G is not left on the black matrix 222 Then, as shown in FIG. 50E, the common electrode 264 is formed by depositing ITO on the overall upper surface of the glass substrate 261 by the sputter method to have a thickness of about 0.15 μm.

Figure 50F:
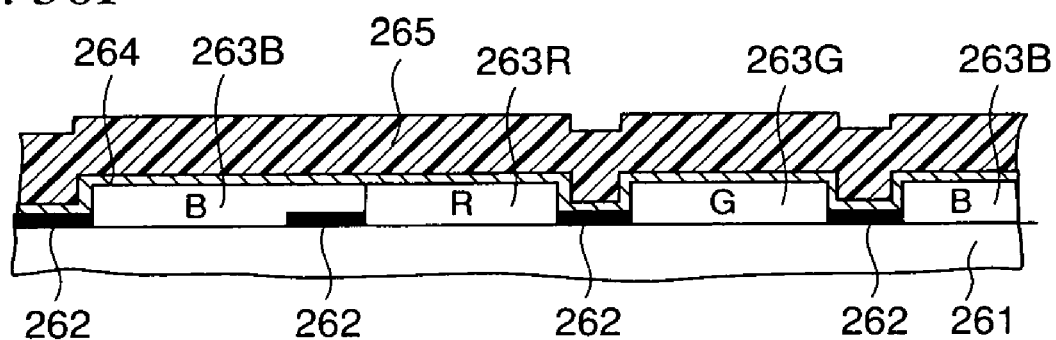

Then, as shown in FIG. 50F, the photoresist film 265 of 4 μm thickness, for example, are formed by means of the spin coating method. In this case, the blue color filter 263B is formed on the black matrix 262 between the blue pixel region and the red pixel region whereas no color filter is formed on the black matrix 262 between the red pixel region and the green pixel region and on the black matrix 262 between the green pixel region and the blue pixel region. As a result, level difference is caused on a surface of the resist film 265.

Figure 50G:
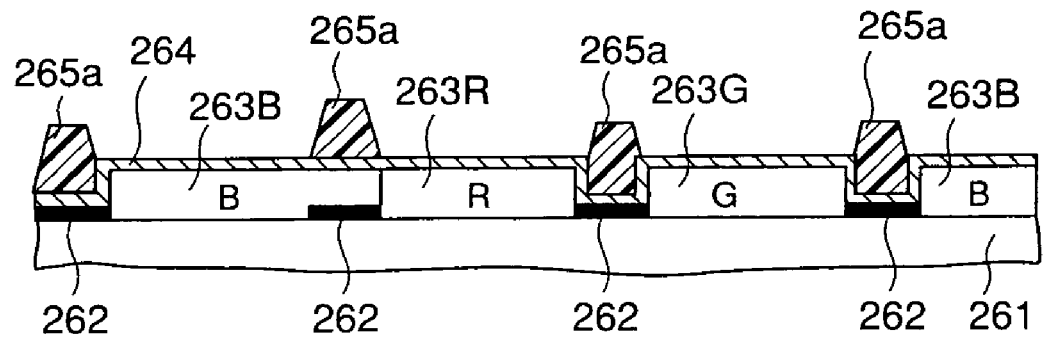

Then, as shown in FIG. 50G, spacers 265a are formed over the black matrix 262, each in an area of no more than one of the color filters 263B, 263R, 263G, by patterning the resist film 265 via the exposing and developing processes. In this case, the spacers 265a between the blue pixel regions and the red pixel regions are different in height from the spacers 265a between the red pixel regions and the green pixel regions and between the green pixel regions and the blue pixel regions by a height that corresponds to the level difference between the color filters 223R, 223G and the black matrix 262. In this fashion, the spacers having the different heights can be formed of the same material at the same time.

Then, the alignment film (not shown) is formed on the overall upper surface of the glass substrate 261, and the surfaces of the CF substrate 246 and the spacers 265a are covered with the alignment film. The same advantage as that in the ninth embodiment can be achieved by the twelfth embodiment.

Thirteenth Embodiment

A thirteenth embodiment of the present invention will be explained hereunder. In the thirteenth embodiment, it is assumed that the distribution density of the spacers is n (cm$^{-2}$), an amount of displacement when a force of 9.8/n (N) is applied per one spacer is x, an average distance between a pair of substrates is d, the density of the liquid crystal at 60° C. is $q_{60}$ (g/cm$^3$), and the density of the liquid crystal at −20° C. is $q_{-20}$ (g/cm$^3$), the spacers are formed such that an amount of displacement against the load satisfy a following inequality (1).

$$x/d > (1/q_{60} - 1/q_{-20})/(1/q_{60}) \tag{1}$$

Also, when the density of the liquid crystal at −20° C. is not defined but the density of the liquid crystal at 20° C. is defined, the spacers may be formed to satisfy a following inequality (2).

$$x/d > 2 \times (1/q_{60} - 1/q_{20})/(1/q_{60}) \tag{2}$$

The reason for the above will be explained hereunder.

In the system in which the spherical or cylindrical spacers are distributed in the prior art, the alignment of the liquid crystal molecules is disturbed by the spacers existing in the pixel regions. In contrast, if the cylindrical spacers are formed between the TFT substrate and the CF substrate like the first embodiment, there is no disturbance of the alignment in the pixel regions. Thus, the high quality image can be obtained.

However, in the case that the cylindrical spacers have no elasticity, sometimes the liquid crystal is thermally expanded to separated the spacer from the substrate when the liquid crystal display device is left as it is in the high temperature environment. This phenomenon is called "high temperature expansion" hereinafter. On the contrary, when the liquid crystal display device is left as it is in the low temperature environment, sometimes the liquid crystal is thermally shrunken to generate the foam. This phenomenon is called "low temperature foaming" hereinafter.

In order to prevent the high temperature expansion and the low temperature foaming, the cylindrical spacers must have elasticity to some extent to follow the thermal expansion and the thermal contraction of the liquid crystal.

Figure 52:
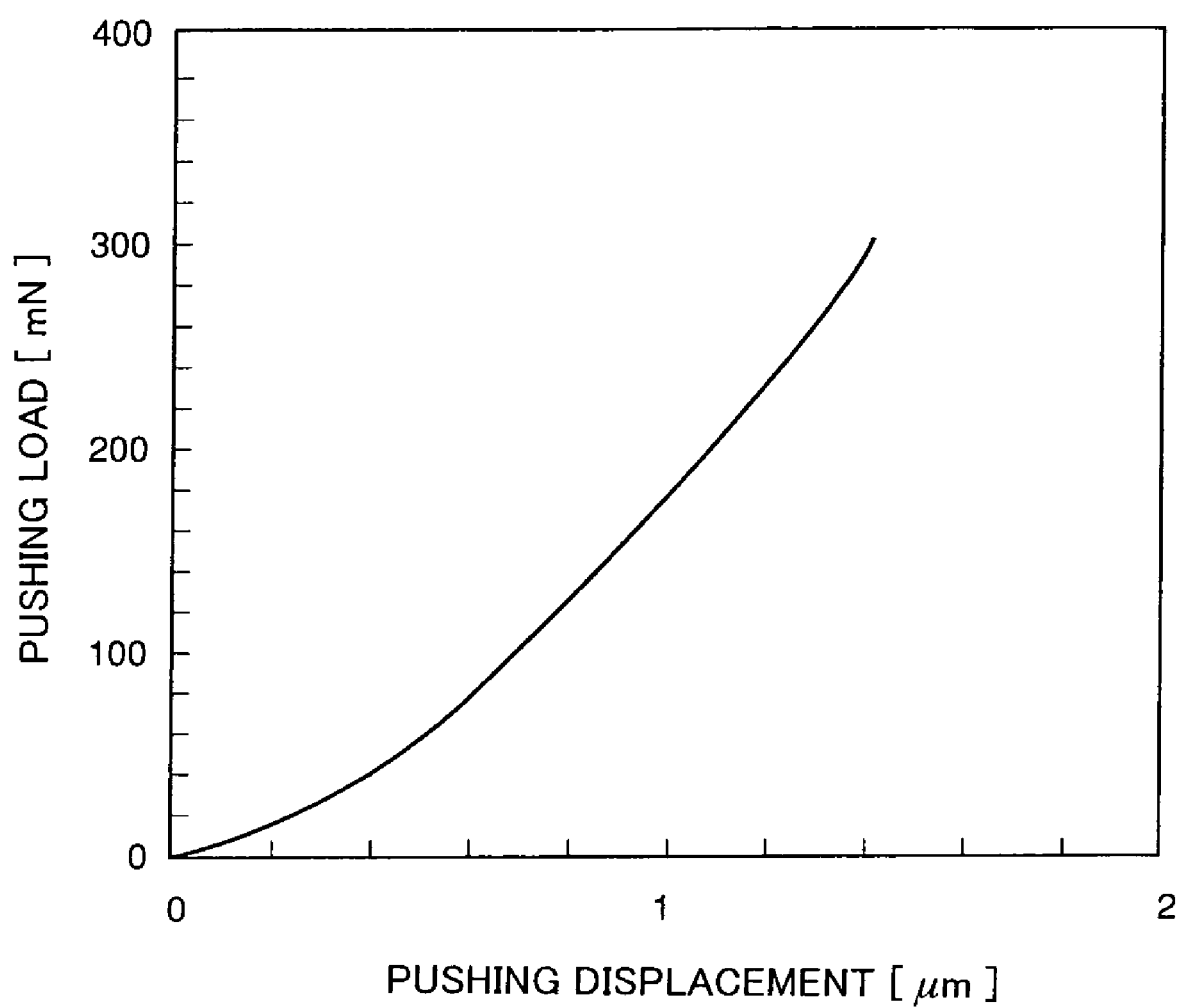
FIG. 52 is a graph showing the load-displacement characteristic of the spacer.

When the spacers are formed by the photoresist resin, such spacers have the elasticity in itself. FIG. 52 is a graph showing an example of the examined result concerning the relationship between the displacement per one spacer formed of the photoresist resin and the load, wherein an abscissa denotes pushing displacement (compressive displacement) and an ordinate denotes pushing load (compressive load). As shown in FIG. 52, in the case of the spacers formed by the photoresist resin, such spacers are deformed according to the load. In this case, the load applied to one spacer and the displacement can be adjusted by adjusting the distribution density of the spacers.

The inventors of the present invention examined the presence of the high temperature expansion and the low temperature foaming in the XGA (1024×768 pixel) 15-inch liquid crystal display device, while changing the distribution density of the spacers. FIG. 53 shows the results of the examination of the presences of the high temperature expansion and the low temperature foaming by changing the distribution density of the spacers. An average value d of the cell gap is 4 μm. Also, the density 141/cm$^2$ corresponds to the case where the spacers are formed at the rate of twenty-four pixels to one, the density 283/cm corresponds to the case where the spacers are formed at the rate of twelve pixels to one, the density 567/cam corresponds to the case where the spacers are formed at the rate of six pixels to one, the density 1133/cm$^2$ corresponds to the case where the spacers are formed at the rate of three pixels to one, and the density 3400/cm$^2$ corresponds to the case where the spacers are formed at the rate of one pixel to one.

The density $q_{60}$ of the liquid crystal at 60° C. is about 0.97 g/m$^3$, and the density $q_{-20}$ of the liquid crystal at −20° C. is about 1.03 g/cm$^3$. Therefore, the right side in the above inequality (1) becomes 0.058.

As shown in FIG. 53, in case the value x/d is larger than 0.058 (No.1, No.2, No.3), both the high temperature expansion and the low temperature foaming are not generated. In contrast, in case the value x/d is smaller than 0.058 (No.4, No.5), both the high temperature expansion and the low temperature foaming are generated.

Accordingly, in the thirteenth embodiment, the material and the density of the spacers are set to satisfy the inequality (1) or the inequality (2). For example, in the case of the liquid crystal display device wherein, as shown in FIG. 54A, the cylindrical spacers 25a are formed on any one of the TFT substrate 10 and the CF substrate 20 (on the CF substrate 20 side in FIG. 54A), or in the case of the liquid crystal display device wherein, as shown in FIG. 54B, the cylindrical spacers 25c, 25d are formed on both the TFT substrate 10 and the CF substrate 20 respectively, the material and the density of the spacers 25a, 25c, 25d are set to satisfy the inequality (1) or the inequality (2).

Figure 54A:
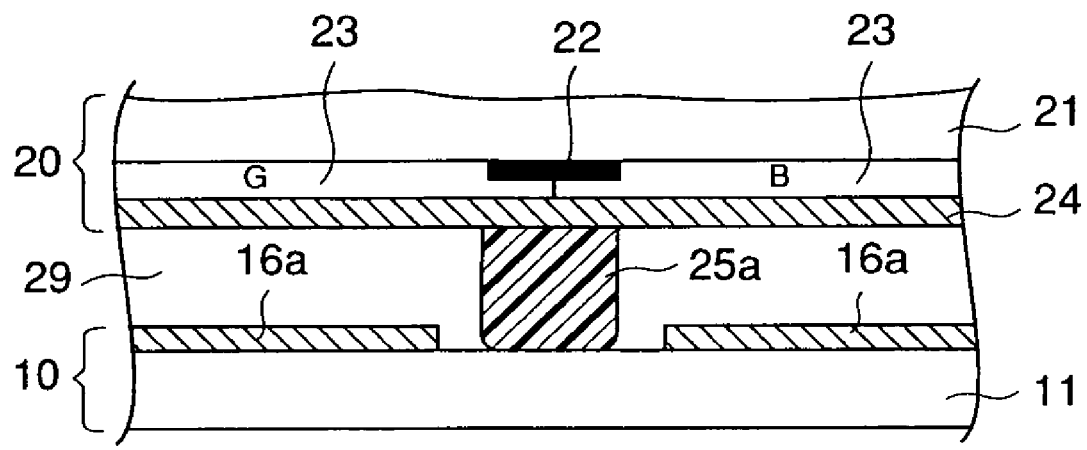
FIGS. 54A and 54B are sectional views showing an example of a cell gap holding spacer of a liquid crystal display device according to a thirteenth embodiment of the present invention respectively.
Figure 54B:
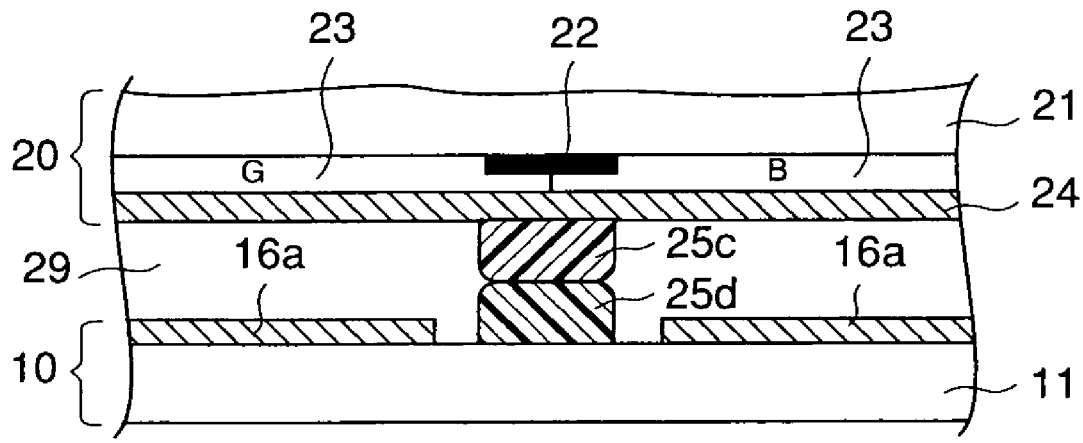

In FIGS. 54A, 54B, the TFT substrate 10 consists of the glass substrate 11, and the pixel electrodes 16a, TFTs (not shown), the gate bus lines (not shown), and the data bus lines (not shown), etc., all formed on the glass substrate 11. The CF substrate 20 consists of the glass substrate 21, and the black matrix 22, the color filters 23, and the common electrode 24, etc., all formed under the glass substrate 21. Also, the liquid crystal 29 is sealed between the TFT substrate 10 and the CF substrate 20.

In the thirteenth embodiment, the material of the spacers is not particularly restricted to the above. For example, the polyimide resin, the phenol-based resin, the novolak-based resin, the acryl-based resin, etc. may be employed.

Fourteenth Embodiment

A fourteenth embodiment of the present invention will be explained hereunder.

Figure 55:
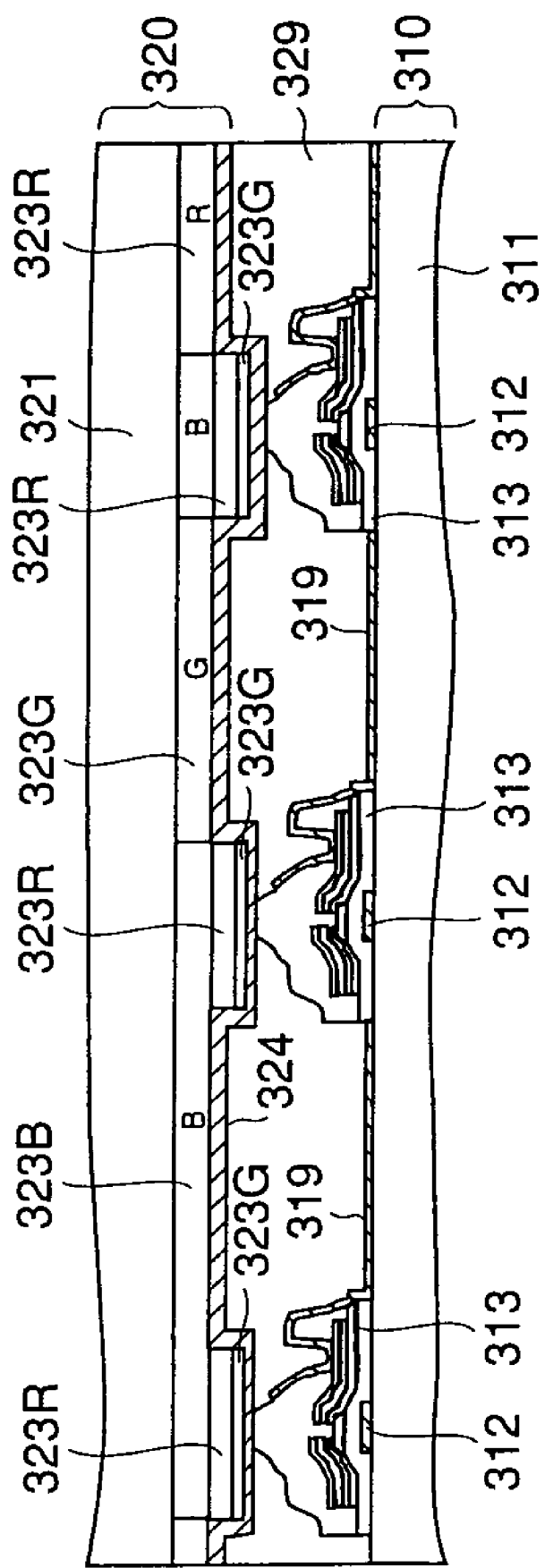
FIG. 55 is a sectional view showing a TFT substrate of a liquid crystal display device according to a fourteenth embodiment of the present invention.
Figure 56:
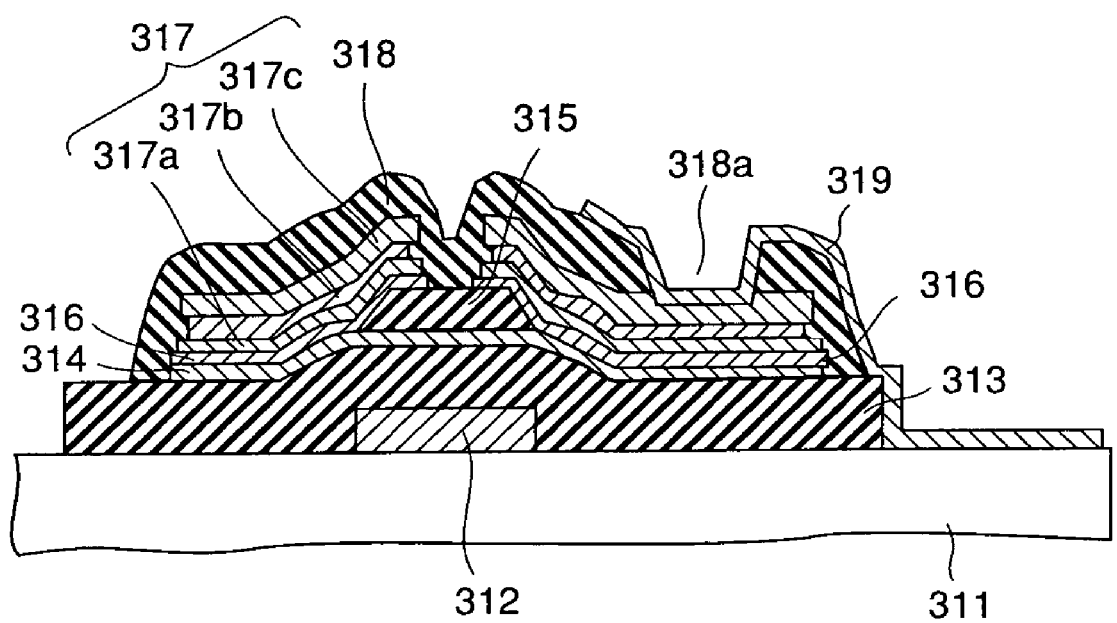
FIG. 56 is an enlarged sectional view showing the TFT forming portion and its neighboring area of the liquid crystal display device shown in FIG. 55.

FIG. 55 is a sectional view showing a TFT substrate of a liquid crystal display device according to the fourteenth embodiment. FIG. 56 is an enlarged sectional view showing the TFT forming portion and its neighboring area of the liquid crystal display device shown in FIG. 55. In FIG. 55, an example is shown in which the cell gap is maintained constant by forming selectively the resin films (projections) acting as the spacers on an insulating film 318 shown in FIG. 56 to bring top end portions of the projections into contact with the CF substrate The liquid crystal display device consists of a TFT substrate 310, a CF substrate 320, and a liquid crystal 329 sealed between the TFT substrate 310 and the CF substrate 320.

The TFT substrate 310 is constructed as follows. That is, gate bus lines 312 are formed on the glass substrate 311, and an insulating film (gate insulating film) 313 is formed on the gate bus lines 312. In the fourteenth embodiment, as shown in FIG. 55 and FIG. 56, the insulating film 313 is not formed in the pixel region.

A silicon film 314 acting as the active region of the TFT is selectively formed on the insulating film 313. Also, a channel protection film (insulating film) 315 that has the same width as the gate bus lines 312 is formed on the silicon film 314. An n+-type silicon film 316 into which the n-type impurity is highly doped is formed respective regions extended from both ends of the channel protection film 315 to both ends of the silicon film 314. Then, a conductive film (data bus line, source electrode and drain electrode) 317 having a triple-layered structure consisting of a Ti (titanium) film 317a, an Al (aluminum) film 317b, and a Ti film 317c is formed on the silicon film 316.

The silicon film 314, the channel protection film 315, the n$^+$-type silicon film 316 and the conductive film 317 are covered with an insulating film (final protection film) 318. This insulating film 318 is not formed on the pixel region.

A contact hole 318a is formed in the insulating film 318 to reach the source electrode (conductive film 317) of the TFT. A pixel electrode 319 is formed in the region extended from the contact hole 318a to the pixel region on the glass substrate 311 and is electrically connected to the conductive film 317 on the source side of the TFT via the contact hole 318a. The pixel electrode 319 is formed of ITO.

Also, the alignment film (not shown) is formed on the overall surface of the glass substrate 311, and surfaces of the pixel electrode 319 and the insulating film 318 are covered with this alignment film.

While, the CF substrate 320 is formed as follows. That is, the blue color filter 323B is formed in the blue pixel region on the lower surface side of the glass substrate 321, the red color filter 323R is formed in the red pixel region, and the green color filter 323G is formed in the green pixel region. Also, the black matrix is formed by laminating the color filters 323B, 323R, 323G as three layers in regions between the pixels on the lower surface side of the glass substrate 321.

The common electrode 324 made of ITO is formed under the color filters 323B, 323R, 323G. Also, the alignment film (not shown) is formed under the common electrode 324.

In the fourteenth embodiment, since the insulating films 313, 318 are not formed in the pixel regions, the predetermined cell gap can be assured if the height of the cell gap adjusting spacers opposing to the insulating film 318 is not increased. As a result, formation of the cell gap adjusting spacers can be facilitated. Also, the thickness of the liquid crystal display device (liquid crystal panel) can be reduced by the thickness of the insulating films 313, 318.

Next, a method of manufacturing the liquid crystal display device according to the fourteenth embodiment will be explained hereunder. In this case, since a method of manufacturing the CF substrate is basically similar to the prior art and also the CF substrate explained in the first embodiment, etc. can be used in place of the CF substrate shown in FIG. 55, the method of manufacturing the CF substrate will be omitted herein.

FIGS. 57A to 57E are sectional views showing a method of manufacturing the TFT substrate of the liquid crystal display device according to the fourteenth embodiment.

Figure 57A:
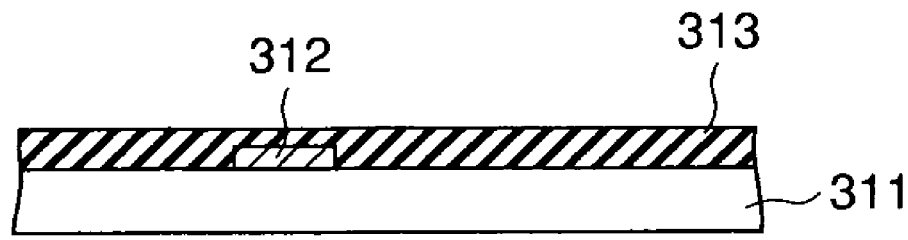
FIGS. 57A to 57E are sectional views showing a method of manufacturing a TFT substrate of a liquid crystal display device according to the fourteenth embodiment.
Figure 57B:
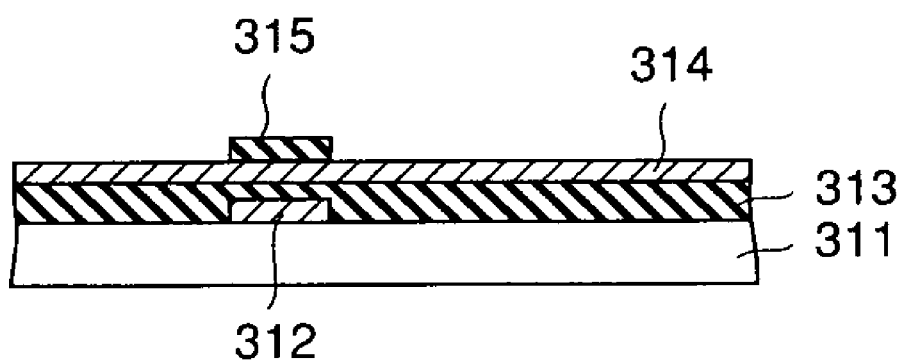

First, as shown in FIG. 57A, the conductive film made of Al (aluminum), Ti (titanium) or their laminated body, or Cr, etc. is formed on the glass substrate 311 to have a thickness of 0.15 μm, and then the gate bus lines, the auxiliary capacitance bus lines (not shown), etc. are formed by patterning the conductive film by virtue of the photolithography method. Then, the insulating film (gate insulating film) 313 is formed by depositing SiNx on the glass substrate 311 to have a thickness of about 0.35 μm Then, the amorphous silicon film 314 acting as the active layer of the TFT is formed on the insulating film 313. Then, SiNx of about 0.15 μm thickness is deposited on the amorphous silicon film 314. Then, the photoresist is coated on the SiNx film, and then the photoresist is exposed from the lower surface side of the glass substrate 311. After this, the resist film is left only over the gate bus lines 312 by applying the developing process. Then, as shown in FIG. 57B, the channel protection film 315 is selectively formed on the amorphous silicon film 314 by etching the SiNx film using the resist film as a mask. Then, the resist film on the channel protection film 315 is removed.

Then, the $n^+$-type amorphous silicon film 316, into which the n-type impurity is doped, is formed on the upper side of the glass substrate 311 to have a thickness of about 0.03 μm. Then, the Ti film of about 0.02 μm thickness, the Al film of about 0.08 μm thickness, and the Ti film of about 0.05 μm thickness are formed sequentially on the $n^+$-type amorphous silicon film, and thus the conductive film 317 having the laminated structure consisting of the Ti film, the Al film, and the Ti film is formed. Then, the conductive film 317, the $n^+$-type amorphous silicon film 316, and the amorphous silicon film 314 are patterned into the shape shown in FIG. 57C by the photolithography method.

Figure 57C:
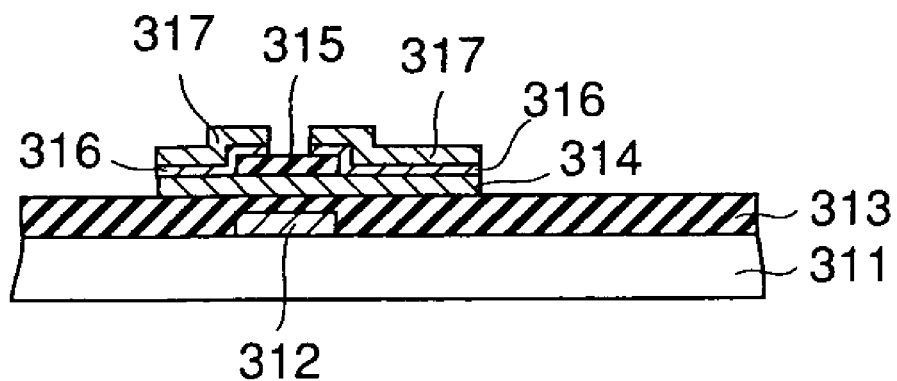
Figure 57D:
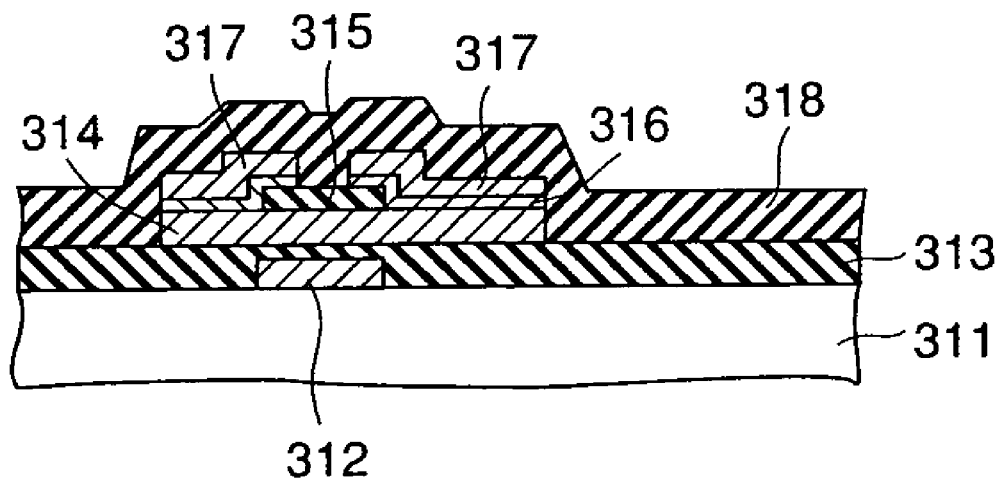

Then, as shown in FIG. 57D, the insulating film (final protection film) 318 made of SiNx is formed on the overall upper surface of the glass substrate 311 to have a thickness of about 0.33 μm.

Then, the contact hole is formed in the insulating film 318 by the photolithography method to reach the source electrode (conductive film 317) of the TFT, and then the insulating films 318, 313 on respective pixel regions are removed. The dry etching, for example, may be employed in forming the contact hole and removing the insulating films on respective pixel regions. As the conditions in dry etching, for example, the used gas and its flow rate is $SF_6/O_2=150/250$ (sccm), the pressure is 8.0 Pa, and the power is 600 W.

Figure 57E:
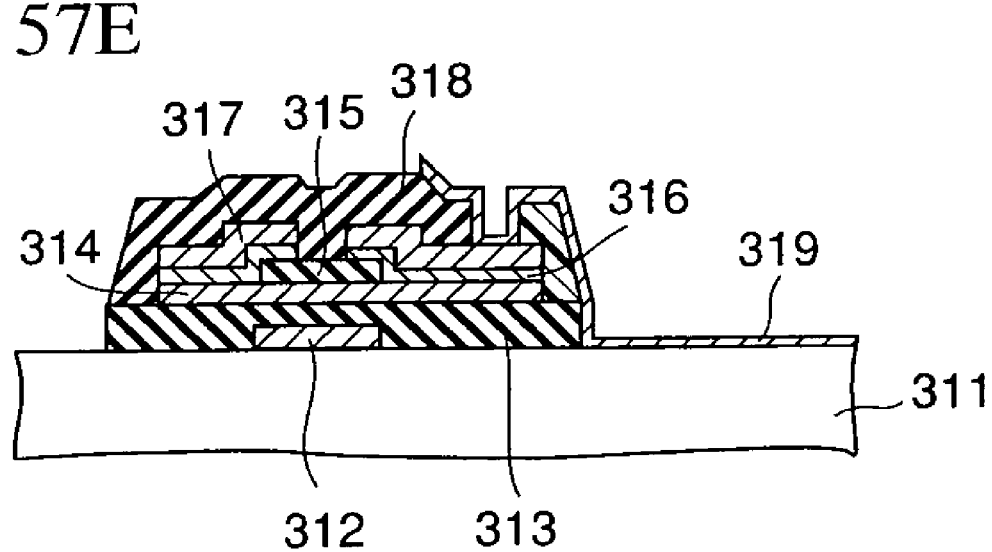

Then, as shown in FIG. 57E, ITO is formed on the upper side of the substrate 311 by the sputter, and then the pixel electrodes 319 are by patterning the ITO film by virtue of the photolithography method. Then, the alignment film made of polyimide is formed on the overall upper surface of the substrate 311 to have a thickness of 0.05 to 0.1 μm. Accordingly, the TFT substrate 310 can be completed.

Figure 58:
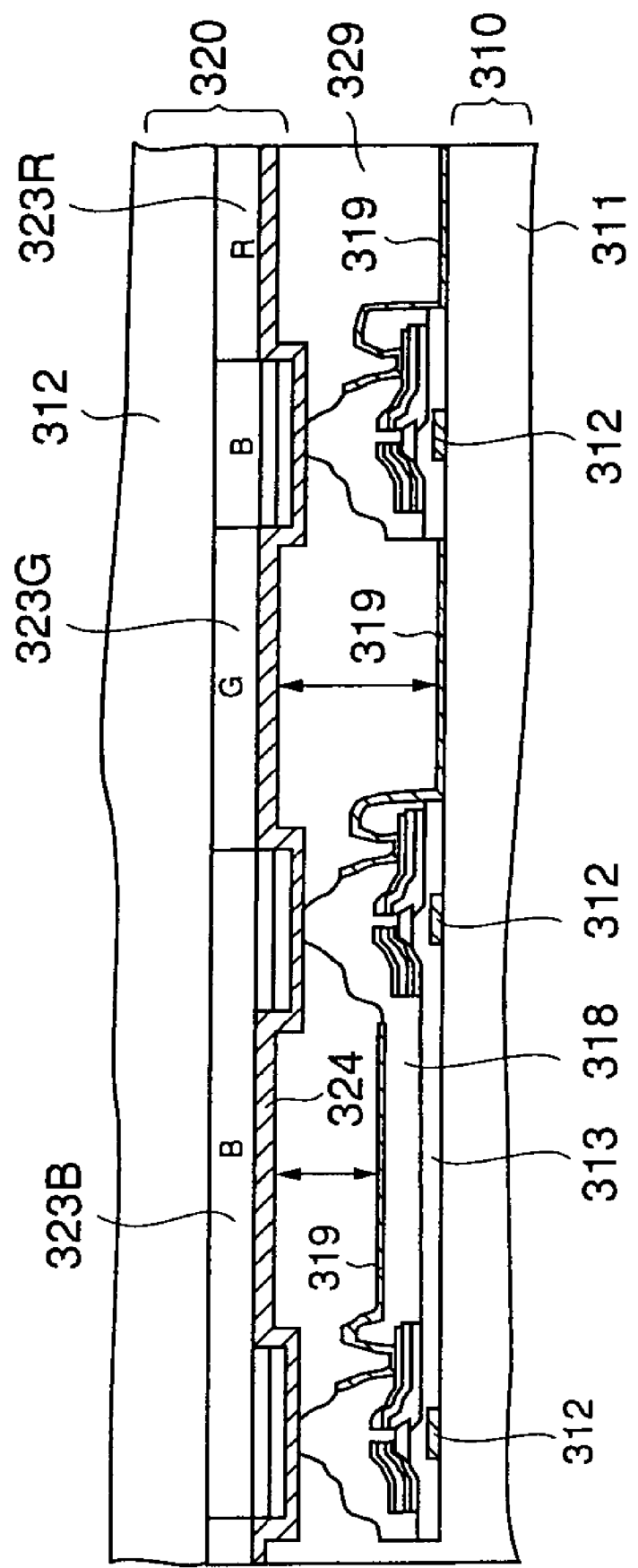
FIG. 58 is a sectional view showing a variation of the liquid crystal display device according to the fourteenth embodiment, wherein insulating films under a pixel electrode of a blue pixel region are left but the insulating films under a red pixel region and a green pixel region are removed.
Figure 59:
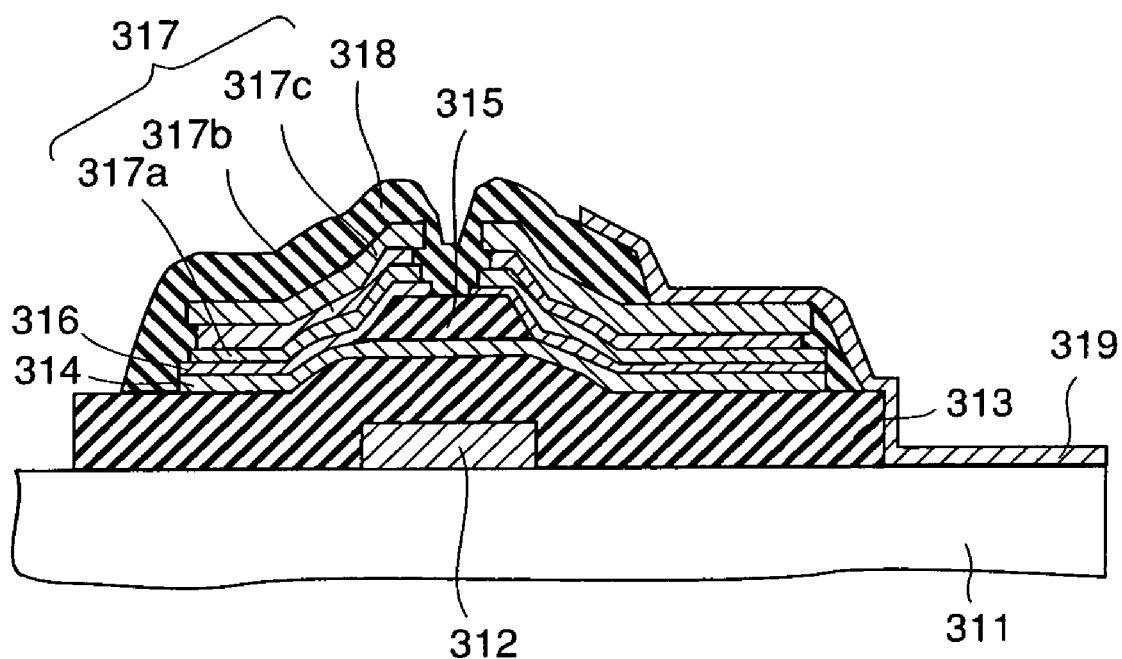
FIG. 59 is a sectional view showing the liquid crystal display device according to the fourteenth embodiment, wherein the insulating film is etched to expose a conductive film of the TFT on the source side.

In the above example, the case is explained where the insulating films 313, 318 on the red pixel regions, the green pixel regions, and the blue pixel regions are removed perfectly. As shown in FIG. 58, the insulating films 313, 318 may be left on any one or two of the red pixel regions, the green pixel regions, and the blue pixel regions. Accordingly, the liquid crystal display device wherein the cell gap is adjusted every color, i.e., the so-called multi-gap liquid crystal display device can be implemented. For example, in the example shown in FIG. 58, the insulating films 313, 318 in the blue pixel region are left but the insulating films 313, 318 in the red pixel region and the green pixel region are removed. Therefore, a difference of the cell gap between the blue pixel and the red pixel/the green pixel is about 0.68 μm. In the multi-gap liquid crystal display device, since the optical characteristic can be optimized by adjusting the cell gap every pixel, there is such as advantage that the display quality can be improved further more. At this time, as shown in FIG. 59, the insulating film 318 between the source electrode of the TFT and the pixel region may be removed. Accordingly, level difference of the pixel electrode 319 from the source electrode to the pixel region can be reduced, and thus disconnection due to the level difference (connection failure) can be prevented.

Also, the insulating films 313, 318 may be left by a desired thickness in the pixel region by controlling the etching conditions in dry-etching the insulating films 313, 318.

In addition, in the above example, the case is explained where both the insulating films 313, 318 are formed of inorganic material (SiNx), but such insulating films 313, 318 may be formed of insulating organic material. For example, in case the insulating film 318 is formed of resin material such as acryl, polyimide, epoxy, or the like, such resin material is formed by the spin coating method, etc. to have a thickness of about 1 Am and then the resin material on the pixel regions is selectively removed simultaneously with formation of the contact hole 318a. If to do so, the cell gap in the pixel regions can be assured and the liquid crystal display device can meet the multi-cell gap, like the above example. In addition, in this case, since the level difference between the colors is changed by the film thickness of the insulating film 318, the cell gap can be simply adjusted if the film thickness is changed upon coating the insulating film 318 by virtue of the spin coating method, etc.

In the fourteenth embodiment, if the cell gap is identical, the distance between the glass substrates 311, 312 is reduced by thickness of the insulating films 313, 318 rather than the liquid crystal display device in the prior art. Therefore, it may be considered that it takes a lot of time according to the method of jointing the TFT substrate 310 and the CF substrate 320 by sealing material and then injecting the liquid crystal between the substrates 310, 320. However, if the liquid crystal is dropped onto the TFT substrate 310, then the CF substrate 320 is placed on the TFT substrate 310, and then the TFT substrate 310 and the CF substrate 320 are jointed, for example, i.e., the so-called drop injecting method is employed, a time required for the manufacturing the liquid crystal display device can be reduced.

Fifteenth Embodiment

Figure 60:
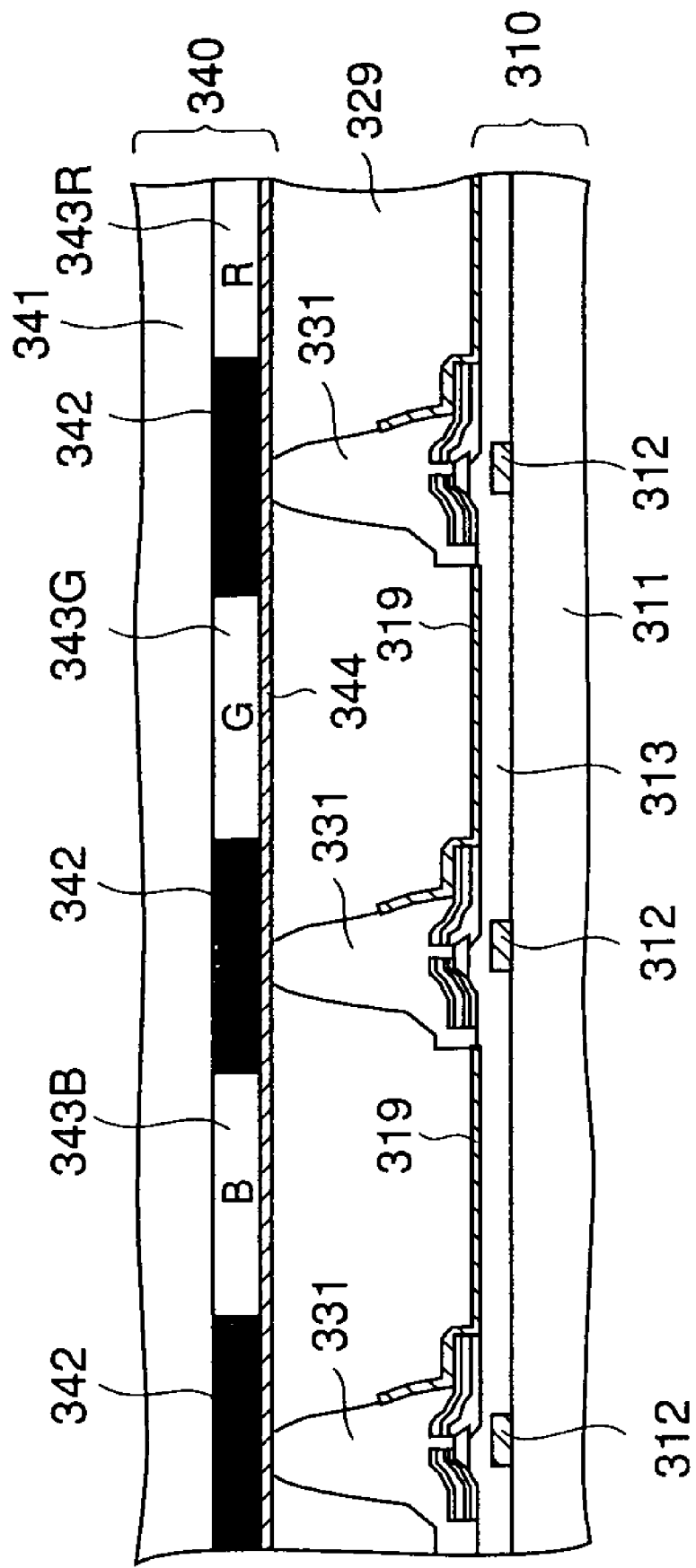
FIG. 60 is a sectional view showing a liquid crystal display device according to a fifteenth embodiment of the present invention.

FIG. 60 is a sectional view showing a liquid crystal display device according to a fifteenth embodiment of the present invention.

The liquid crystal display device consists of the TFT substrate 310, the CF substrate 340, and the liquid crystal sealed between the TFT substrate 310 and the CF substrate 340.

The TFT substrate 310 is basically constructed in the same way as the fourteenth embodiment, except that the final protection film 331 is formed of the photosensitive acrylic resin. That is, the gate bus lines 312 are formed on the glass substrate 311, and the insulating film (gate insulating film) 313 is formed on the gate bus lines 312 and the pixel regions.

Like the fourteenth embodiment, the silicon film acting as the active layer of the TFT, the data bus lines, the conductive layer as the source electrode and the drain electrode, etc. are formed on the insulating film 313 (see FIG. 56). Then, the final protection film 331 made of resin is formed over the TFTs, and this final protection film 331 operates as the spacers. That is, the top end portion of the final protection film 331 comes into contact with the CF substrate 340 to maintain the cell gap constant.

The final protection film on the end side of the source electrode of the TFT is removed, and the pixel electrode 319 made of ITO is formed in the region from the end portion of the source electrode to the insulating film 313 in the pixel region. Surfaces of the final protection film 331 and the pixel electrode 319 are covered with the alignment film (not shown).

In contrast, the CF substrate 340 is constructed as follows. That is, the black matrix 342 made of a metal such as Cr, etc. or black resin is formed on the lower surface side of the glass substrate 341, and the gate bus lines, the data bus lines, and the TFTs on the TFT substrate 310 side are covered with the black matrix 342. Also, red (R), green (G), and blue (B) color filters 343R, 343G, 343B are formed in the pixels regions on the lower surface side of the CF substrate 340 to correspond to the pixel electrodes on the TFT substrate 310 side.

Further, the common electrode 344 made of ITO is formed under the black matrix 343 and the color filters 343R, 343G, 343B. Also, the alignment film (not shown) is formed under the common electrode 344.

Figure 61A:
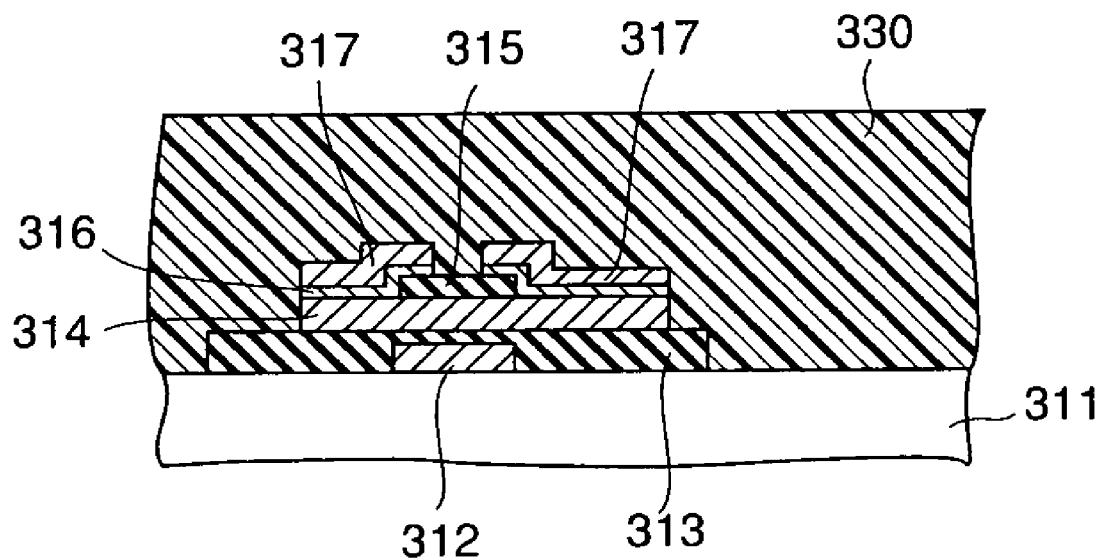
FIGS. 61A and 61B are sectional views showing a method of manufacturing a TFT substrate of a liquid crystal display device according to the fifteenth embodiment.
Figure 61B:
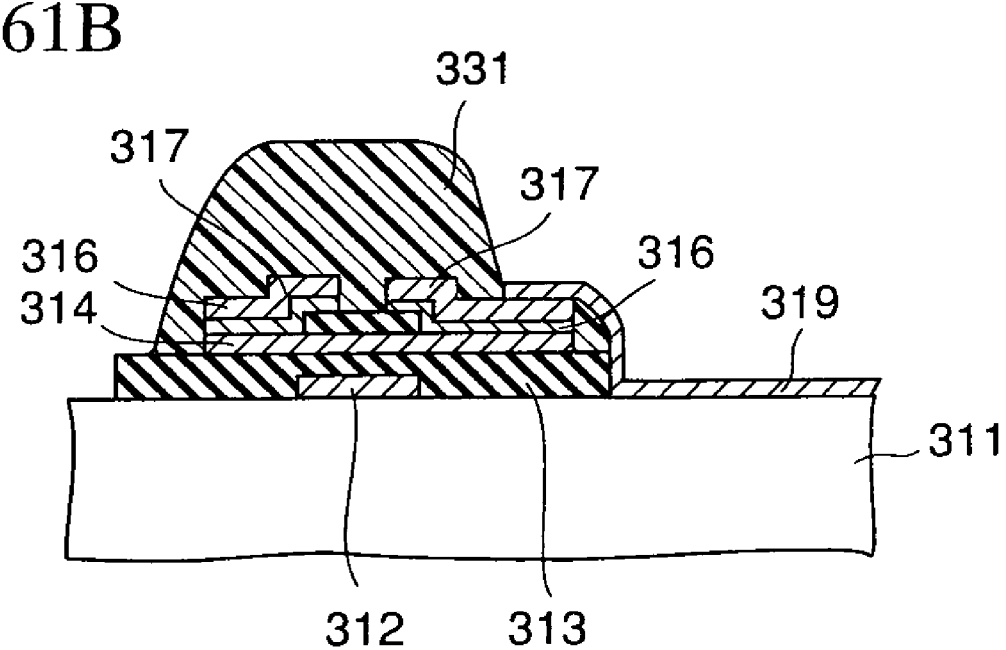

FIGS. 61A and 61B are sectional views showing a method of manufacturing a TFT substrate of the liquid crystal display device according to the fifteenth embodiment.

First, like the fourteenth embodiment, the gate bus lines 312, the gate insulating film 313, the silicon film 314, the channel protection film 315, the n⁺-silicon film 316, and the conductive film 317 are formed on the glass substrate 311 (see FIGS. 57A to 57C).

Then, as shown in FIG. 61A, the photosensitive acrylic resin film 330 is formed by coating the photosensitive acrylic resin on the overall upper surface of the substrate 311 by means of the spin coating method to have a thickness of about 4 μm.

Then, as shown in FIG. 61B, the final protection film 331 for covering the conductive film 317 and the silicon films 314, 316 is formed by exposing and developing the photosensitive acrylic resin. At this time, the final protection film 331 on the conductive film 317 on the source side of the TFTs and the pixel regions is removed.

After this, the ITO film is formed on the overall upper surface of the glass substrate 311, and then the pixel electrodes 319 are formed by patterning this ITO film. Then, the alignment film (not shown) is formed on the overall upper surface of the glass substrate 311 to cover the surfaces of the pixel electrodes 319 and the final protection film 331. Accordingly, the TFT substrate 310 can be completed.

Since the CF substrate 340 can be manufactured by the well-known method, its explanation will be omitted herein.

In the fifteenth embodiment, because the final protection film 331 is formed of the photosensitive acrylic resin, it can be easily formed thick such as about 4 μm. Then, the cell gap can be maintained constant (about 4 μm) by bringing top end portions of the thick final protection film 331 into contact with the CF substrate 340. That is, the thick final protection film 331 acts as the spacers. The cell gap is decided by the film thickness of the photosensitive acrylic resin film, and such film thickness of the photosensitive acrylic resin film can be set arbitrarily by adjusting the coating conditions. Also, the liquid crystal display device can meet to the multi-gap by selectively removing the gate insulating film 313 in the pixel regions according to the colors of the pixels.

Therefore, according to the fifteenth embodiment, in addition to the same advantage as that in the fourteenth embodiment, there is an advantage such that, since the final protection film 331 is also used as the spacers, the manufacturing steps can be simplified and thus the manufacturing cost can be reduced. As described above, the liquid crystal display device can respond to the multi-gap and also the liquid crystal display device whose optical characteristics such as chromaticity, transmittance, contrast, etc. are optimized can be manufactured.

Sixteenth Embodiment

A sixteenth embodiment of the present invention will be explained hereunder.

Figure 1:
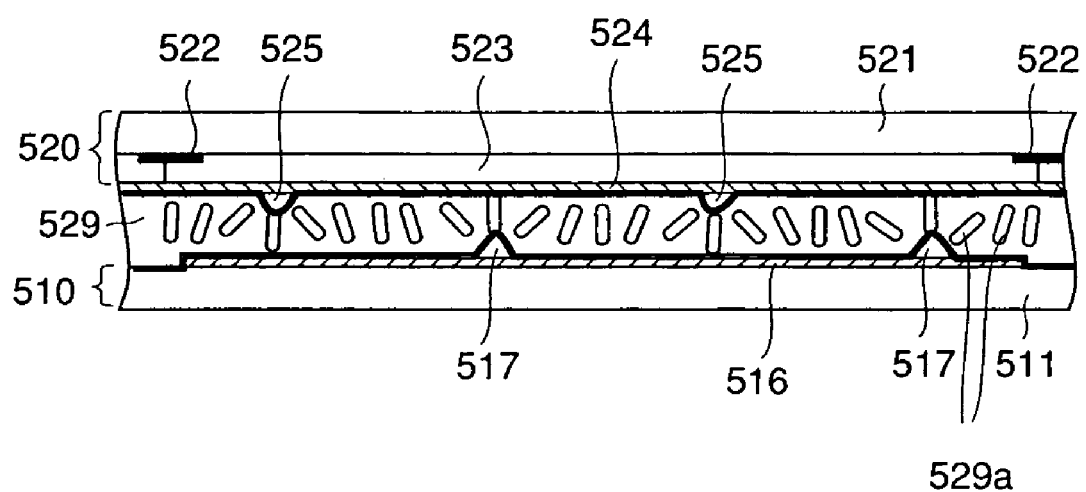
FIG. 1 is a sectional view (schematic view) showing an example of an MVA liquid crystal display device in the prior art.
Figure 2:
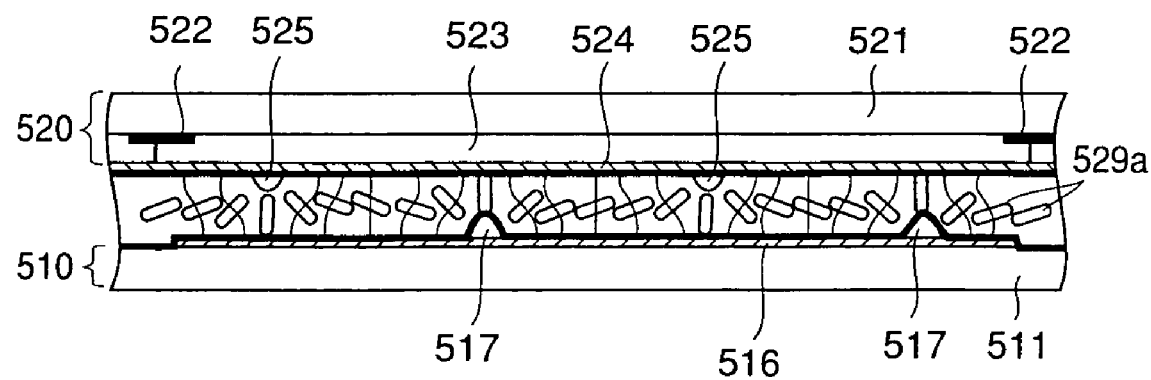
FIG. 2 is a sectional view (schematic view) showing a state of the MVA liquid crystal display device shown in FIG. 1 when the voltage is applied.
Figure 3:
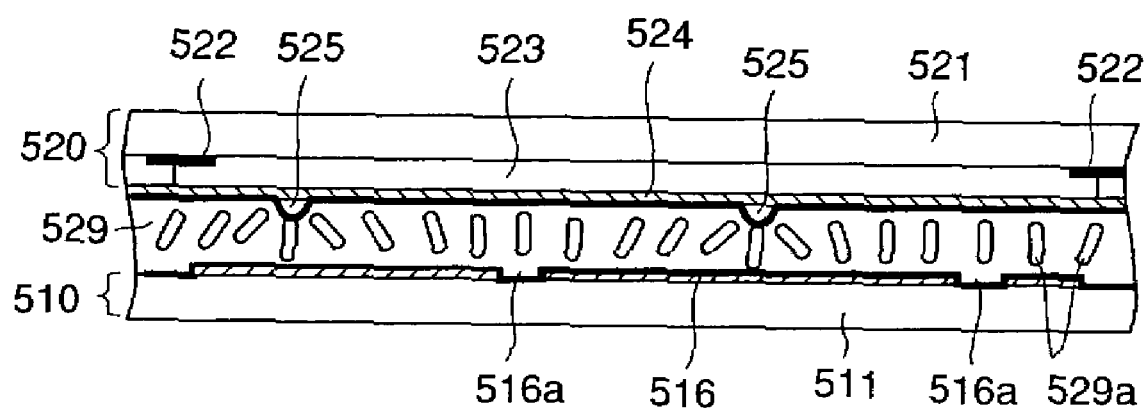
FIG. 3 is a sectional view (schematic view) showing another example of the MVA liquid crystal display device in the prior art.
Figure 62:
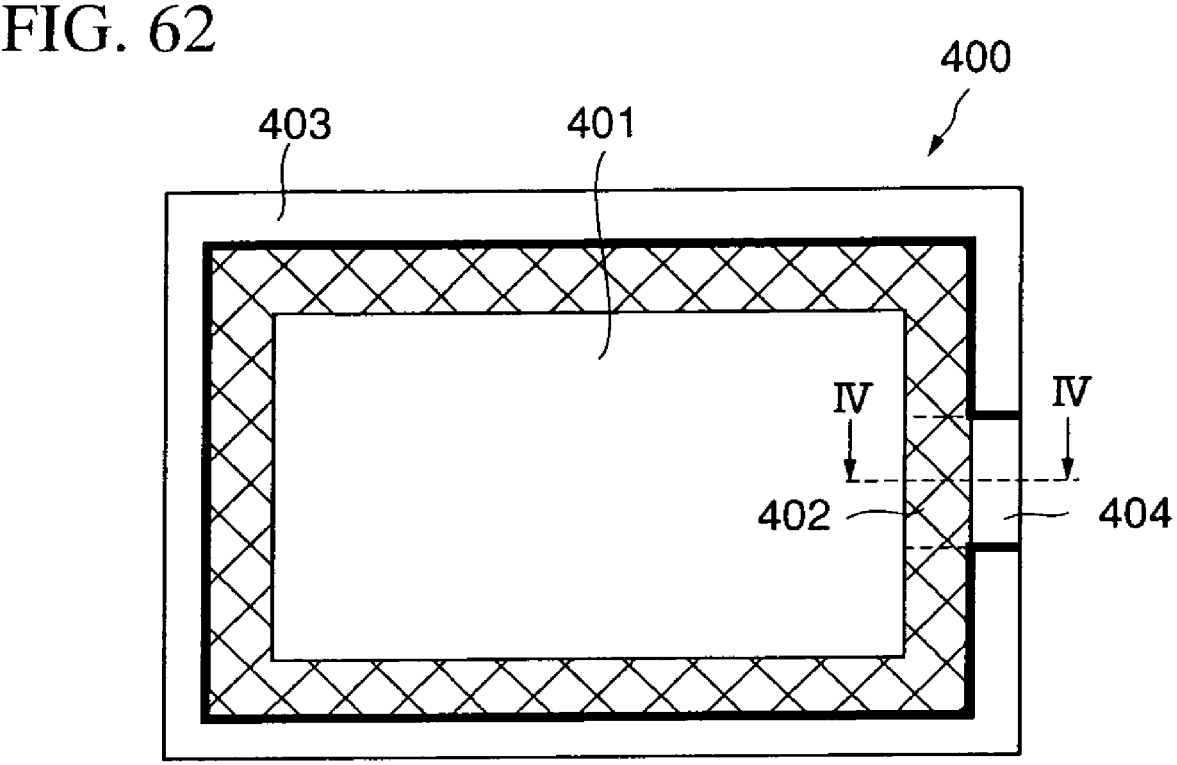
FIG. 62 is a plan view showing a state of a liquid crystal display device according to a sixteenth embodiment of the present invention before the liquid crystal is injected.
Figure 63:
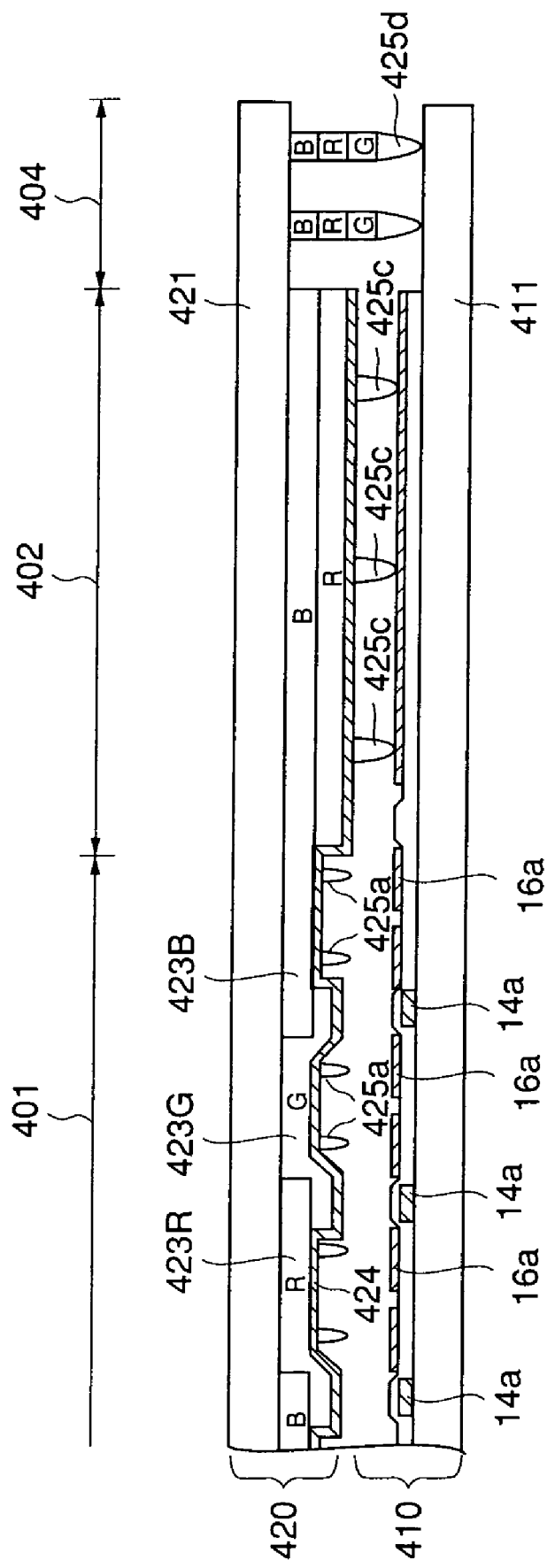
FIG. 63 is a sectional view showing the liquid crystal display device, taken along a IV-IV line in FIG. 62.

FIG. 62 is a plan view showing a state of a liquid crystal display device (liquid crystal panel) according to a sixteenth embodiment of the present invention before the liquid crystal is injected. FIG. 63 is a sectional view showing the liquid crystal display device, taken along a IV-IV line in FIG. 62. In FIG. 63, illustration of the gate bus lines, the gate insulating film, etc. are omitted, and the same references are affixed to the same elements as those in FIG. 1.

The CF substrate 420 of the liquid crystal display device according to the sixteenth embodiment is constructed as follows. That is, the red color filter 423R, the green color filter 423G, and the blue color filter 423B are formed in respective patterns on the one surface side of the glass substrate 421 (on the lower surface side in FIG. 63).

In the sixteenth embodiment, as shown in FIG. 63, the black matrix for light-shielding the regions between the pixels is formed by laminating two color filters out of the red color filter 423R, the green color filter 423G, and the blue color filter 423B. Also, the black matrix made of the laminated body consisting of the red color filter 423R and the blue color filter 423B is formed in the light-shielding region 402 provided on the outside of the display region 401. In addition, a plurality of gap holding spacers 425c are formed on the light-shielding region 402 in the neighborhood of the liquid crystal injection port 404. Further, a plurality of columns formed by laminating the color filters 423R, 423G, and 423B as three layers are formed in the liquid crystal injection port 404, and gap holding spacers 425d are formed on the bottom portions of the columns. The top end portions of these spacers 245c, 425d come into contact with the TFT substrate 410 to maintain the gap in the liquid crystal injection port 404 and the light-shielding regions near the port 404 constant.

The TFT substrate 410 and the CF substrate 420 are jointed by sealing material 403 coated on the outer side than the display region 401, and then the liquid crystal is injected between the TFT substrate 410 and the CF substrate 420 via the liquid crystal injection port 404.

Normally, the vacuum chamber is used to inject the liquid crystal. That is, the liquid crystal panel is constructed by jointing the TFT substrate and the CF substrate by the seal member, and then the liquid crystal panel as well as the vessel containing the liquid crystal is put into the vacuum chamber. Then, the inside of the vacuum chamber is sucked into vacuum, then the liquid crystal injection port is dipped into the liquid crystal, and then the inside of the vacuum chamber is returned to the atmospheric pressure. At that time, the liquid crystal is injected into a space in the liquid crystal panel by the pressure difference. After the liquid crystal is injected sufficiently into the liquid crystal panel, the liquid crystal injection port is sealed by the resin.

For example, in the above liquid crystal display device shown in FIG. 24, since the black matrix is formed by laminating the color filters, the manufacturing steps can be simplified rather than the method of forming the black matrix by using the Cr film, etc. Also, since the cell gap adjusting spacers are formed at predetermined positions by using the photoresist, the cell gap in the display regions can be maintained constant. However, the clearance between the TFT substrate and the CF substrate is reduced in the light-shielding region on the outside of the display region rather than the liquid crystal display device in which the black matrix is formed by the Cr film, etc. Therefore, variation in the liquid crystal injecting speed is increased every liquid crystal panel. As a result, not only the time required for injection is extended but also there is the possibility that the drawbacks such that generation of the foam due to the deficient injection, increase in the cell gap due to the excessive injection, etc. are caused.

In order to avoid such disadvantages, it may be considered that the injection time is adjusted every liquid crystal panel. However, if the injection time should be adjusted every liquid crystal panel, the manufacturing efficiency is extremely reduced and the increase in the manufacturing cost is brought about.

In contrast, in the sixteenth embodiment, as shown in FIG. 63, the clearance between the TFT substrate 410 and the CF substrate 420 can be maintained constant by providing the spacers 425d, 425c in the liquid crystal injection port 404 and the light-shielding region 402 near the port 404. Therefore, the variation in the time required for the liquid crystal injection can be avoided and also the generation of the above disadvantages can be prevented.

Figure 64A:
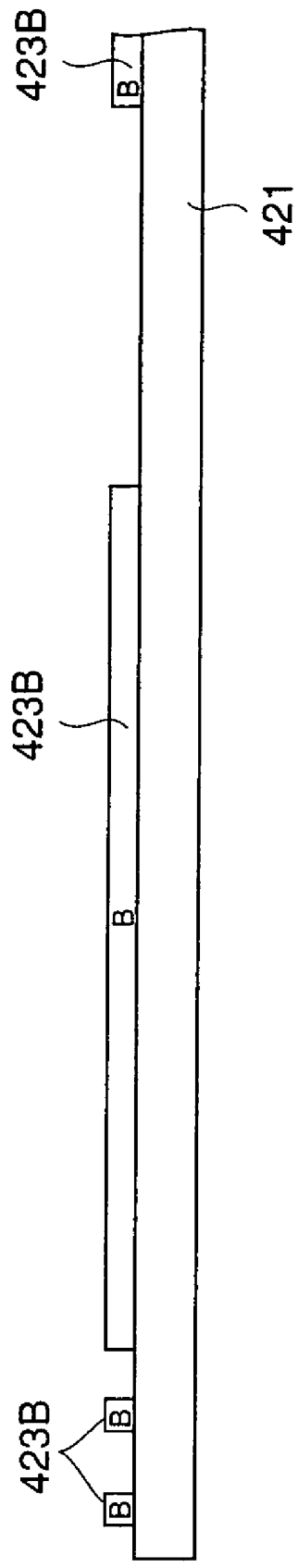
FIGS. 64A and 64E are sectional views showing a method of manufacturing the liquid crystal display device according to the sixteenth embodiment.
Figure 65A:
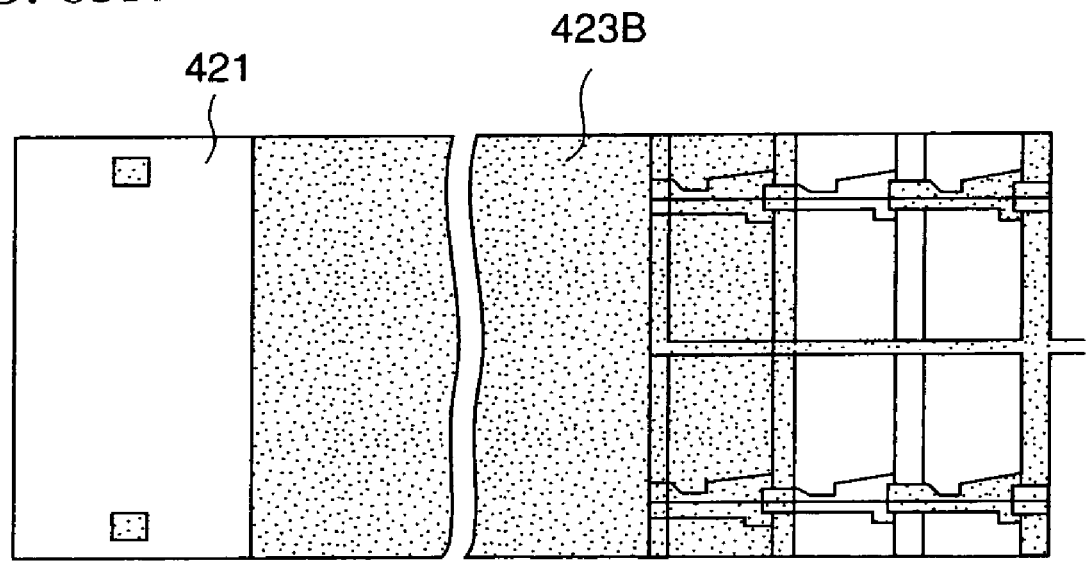
FIGS. 65A and 65D are plan views showing the method of manufacturing the liquid crystal display device according to the sixteenth embodiment.
Figure 65B:
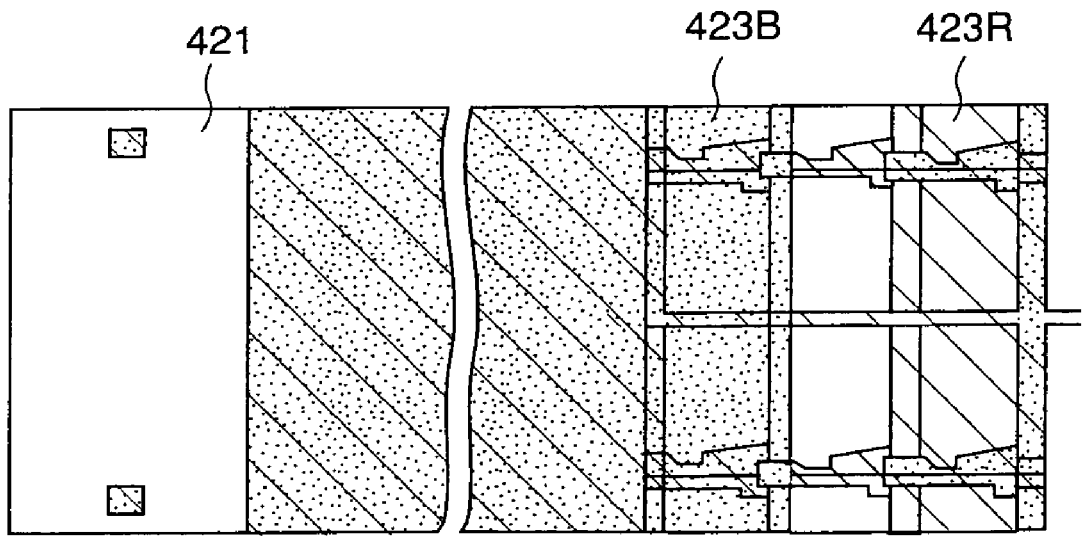
Figure 65C:
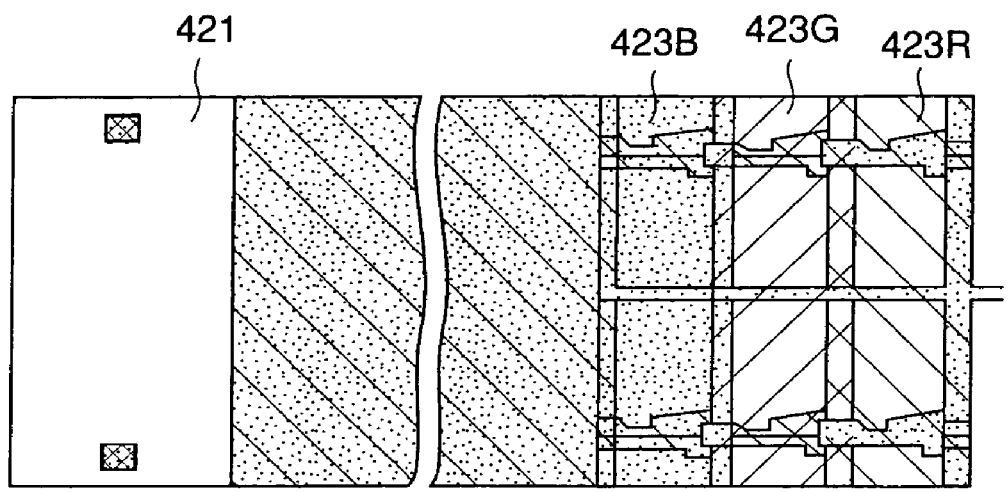
Figure 65D:
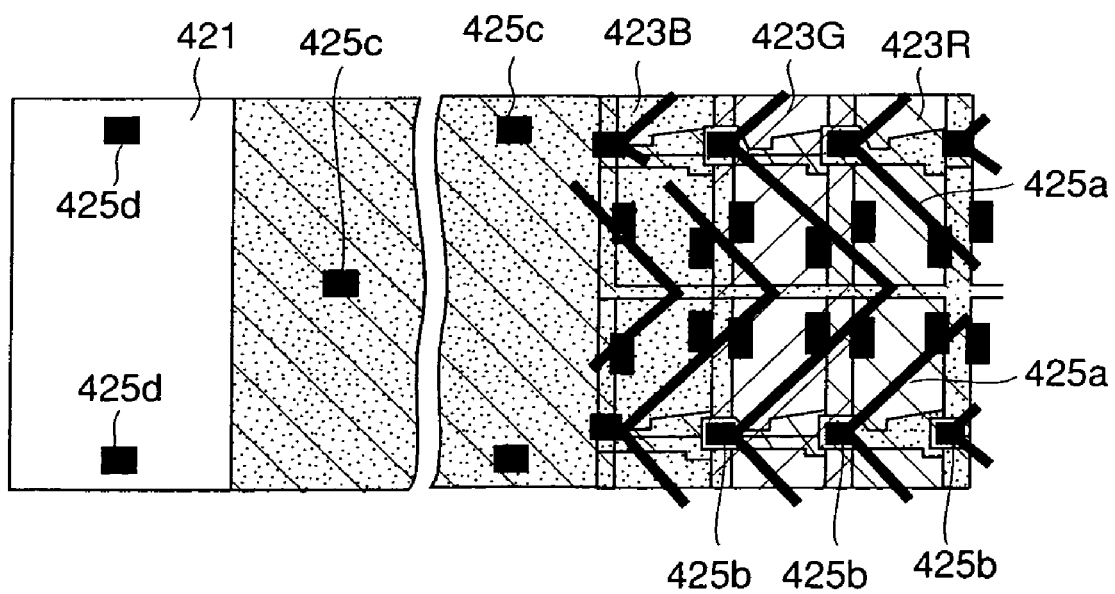

FIGS. 64A and 64E are sectional views showing a method of manufacturing the CF substrate of the liquid crystal display device according to the sixteenth embodiment. FIGS. 65A and 65D are plan views showing the method of manufacturing the CF substrate of the liquid crystal display device in FIGS. 64A and 64E. In FIGS. 65A and 65D, shapes of the black matrix to be formed are also illustrated. In FIGS. 64A and 64E, the color filter forming surface is directed upward.

First, the blue photoresist is coated on the overall upper surface of the glass substrate 421. Then, as shown in FIG. 64A, FIG. 65A, the blue color filter 423B of 1.7 μm thickness is formed on the blue pixel regions, the black matrix forming regions in the periphery of the blue pixel regions and the periphery of the red pixel regions, the spacer forming regions in the display regions (see FIG. 24), the light-shielding regions on the outside of the display regions, and the spacer forming regions in the liquid crystal injection ports, by exposing the photoresist by using a mask having a predetermined pattern, and then developing the photoresist.

Figure 64B:
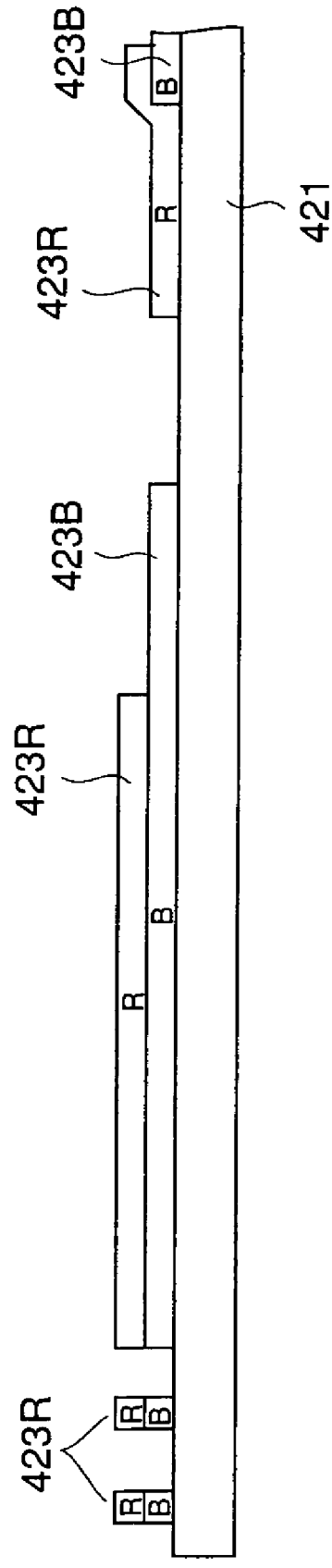

Then, the red photoresist is coated on the overall upper surface of the glass substrate 421. Then, as shown in FIG. 64B, FIG. 65B, the red color filter 423R of 1.7 μm thickness is formed on the red pixel regions, the black matrix forming regions around respective pixel regions, the spacer forming regions in the display regions, the light-shielding regions on the outside of the display regions, and the spacer forming regions in the liquid crystal injection ports, by exposing the photoresist by using a mask having a predetermined pattern, and then developing the photoresist.

In this case, the thickness of the red color filter 423R laminated on the blue color filter 423B in the display region 401 becomes thinner than 1.7 μm because of the leveling in the prebaking and the postbaking since the width of the laminated portion (width of the black matrix) is narrow (10 to 40 μm). In contrast, the thickness of the red color filter 423R laminated on the blue color filter 423B in the light-shielding region 402 and the spacer forming region in the liquid crystal injection port 404 become substantially equal to the red color filter 423R in the pixel regions since the width of the pattern is sufficiently large.

Then, the green photoresist is coated on the overall upper surface of the glass substrate 421. Then, as shown in FIG. 64C, FIG. 65C, the green color filter 423G of 1.7 μm thickness is formed on the green pixel regions, the black matrix forming regions in the periphery of the green pixel regions, the spacer forming regions in the display region 401, the light-shielding regions on the outside of the display regions, and the spacer forming regions in the liquid crystal injection port 404, by exposing the photoresist by using a mask having a predetermined pattern, and then developing the photoresist.

In this case, the thickness of the green color filter 423G laminated on the blue color filter 423B or the red color filter 423R in the display region 401 becomes thinner than 1.7 μm because of the leveling in the prebaking and the postbaking since the width of the laminated portion is narrow. In contrast, the thickness of the green color filter 423G formed on the red color filter 423R in the liquid crystal injection port 404 become equal to the green color filter 423G in the pixel regions since the width of the pattern is large.

Then, as shown in FIG. 64D, the common electrode 424 made of ITO is formed on the glass substrate 421 to have a thickness of about 0.1 μm, and surfaces of the color filters 423R, 423G, 423B in the display regions and the color filter 423R in the light-shielding region 402 are covered with the common electrode 424. In this case, the common electrode is not formed in the liquid crystal injection port 404.

Then, the photoresist is coated on the overall upper surface of the glass substrate 421. Then, as shown in FIG. 64E, FIG. 65D, by exposing the photoresist by using a mask having a predetermined pattern, and then developing the photoresist, the domain defining projections 425a are formed on the color filters 423R, 423G, 423B in the display region 401, the cell gap adjusting spacers 425b are formed at predetermined positions in the display region 401, the gap holding spacers 425c are formed at predetermined positions in the light-shielding region 402, and the gap holding spacers 425d are formed on the columns consisting of three layer color filters 423R, 423G, 423B in the liquid crystal injection port 404.

In this case, the height of the spacers 425c, 425d (height from the surface of the substrate 421) can be higher than the domain defining projections 425a and the cell gap adjusting spacers 425b by adjusting the pattern widths of the domain defining projections 425a in the display region 401 and the cell gap adjusting spacers 425b in the display region 401 and the pattern widths of the gap holding spacers 425c in the light-shielding region 402 and the gap holding spacers 425d in the liquid crystal injection port 404. The heights of the spacers 425b, 425c, 425d are set differently respectively such that the height of the cell gap adjusting spacers 425b in the display region 401 is 5.6 μm, the height of the gap holding spacers 425c in the light-shielding region 402 on the outside of the display region is 5.8 μm, and the height of the gap holding spacers 425d in the liquid crystal injection port 404 is 6.0 μm, for example.

Then, the alignment film (not shown) of 0.8 nm thickness is formed on the upper side of the glass substrate 421, and surfaces of the color filter 423R, 423G, 423B, the domain defining projections 425a, and the spacers 425b, 425c are covered with the alignment film. Accordingly, the CF substrate 420 can be completed.

Since the TFT substrate 410 is identical to the first embodiment, explanation of the method of manufacturing the TFT substrate 410 will be omitted herein.

Sealing material is coated along the edge portion of the CF substrate 420 formed in this manner, then the top end portions of the spacers 425b, 425c, 425d are brought into contact with the TFT substrate 410, and then the TFT substrate 410 and the CF substrate 420 are jointed together. Thus, the liquid crystal panel 400 is constructed. In this case, the sealing material is not coated on the liquid crystal injection port 404 such that the inner space between the TFT substrate 410 and the CF substrate 420 after they are jointed can be communicated with the outside via the liquid crystal injection port 404.

Then, the liquid crystal panel 400 as well as the vessel containing the liquid crystal is put into the vacuum chamber, and then the inside of the chamber is sucked into vacuum. Then, the liquid crystal injection port 404 is dipped into the liquid crystal, and then the inside of the chamber is returned to the atmospheric pressure. At that time, the liquid crystal is injected into the inner space in the liquid crystal panel 400 by the pressure difference. In the sixteenth embodiment, since the spacers 425d, 425c are formed in the liquid crystal injection port 404 and the light-shielding region 402 near the port 404, the clearance between the TFT substrate 410 and the CF substrate 420 is relatively large and thus the liquid crystal injection speed is relatively quick although the laminated color filters are used as the black matrix.

Then, after the liquid crystal is sufficiently injected into the liquid crystal panel, UV-curable resin is filled in the liquid crystal injection port 404, and then the liquid crystal injection port 404 is sealed by the UV irradiation.

At this time, the gap in the liquid crystal injection port 404 and the light-shielding region 402 is narrowed because of the contraction of the UV-curable resin. Accordingly, the gap can be made uniform in the overall liquid crystal panel.

In this manner, the liquid crystal panel in which the cell gap is about 4.0 μm and is uniform over the entire liquid crystal panel can be obtained. Then, the polarizing plates are arranged in a cross-nicol fashion on the upper side and the lower side of the liquid crystal panel, and then stuck thereto. Accordingly, the liquid crystal display device can be completed.

When the liquid crystal display device is actually manufactured according to the above method and then the time required to inject the liquid crystal is measured, the liquid crystal injection time can be reduced by about 20 % rather than the case where no spacer is formed in the light-shielding region 402 and the liquid crystal injection port 404.

What is claimed is:

1. A liquid crystal display device including a TFT substrate having thin film transistors thereon, a CF substrate having color filters for a plurality of colors, and liquid crystal sealed between the TFT substrate and the CF substrate, the TFT substrate comprising:

a transparent substrate;

the thin film transistors formed on the transparent substrate;

an insulating final protection film for covering at least the thin film transistors; and pixels electrodes connected electrically to the thin film transistors at portions, from which the final protection film is removed, and extended onto pixel regions, wherein said pixel regions are adjacent the thin film transistors, wherein the pixel regions include both first pixel regions that oppose color filters of a first color, in which the final protection film is interposed between the pixel electrodes and the transparent substrate, and second pixel regions that oppose color filters of a second color, in which the final protection film is not interposed between the pixel electrodes and the transparent substrate, wherein said first color is different from said second color.

2. A liquid crystal display device according to claim 1, wherein a thickness of the final protection film interposed on the pixel regions is set differently according to colors of the pixels.

3. A liquid crystal display device according to claim 1, wherein the final protection film is formed of insulating inorganic material.

4. A liquid crystal display device according to claim 1, wherein the final protection film is formed of insulating organic material.

5. A liquid crystal display device including a TFT substrate having thin film transistors thereon, a CF substrate having color filters for a plurality of colors, and liquid crystal sealed between the TFT substrate and the CF substrate, the TFT substrate comprising:

a transparent substrate;

the thin film transistors formed on the transparent substrate;

an insulating final protection film for covering at least the thin film transistors; and pixels electrodes connected electrically to the thin film transistors at portions, from which the final protection film is removed, and extended onto pixel regions, wherein said pixel regions are adjacent the thin film transistors, wherein the pixel regions include both first pixel regions, that oppose color filters of a first color, and second pixel regions, that oppose color filters of a second color which is different from said first color, and further wherein a thickness of the final protection film is different -between the first pixel regions and the second pixel regions.

6. A liquid crystal display device according to claim 5, wherein a thickness of the final protection film interposed on the pixel regions is set differently according to colors of the pixels.

7. A liquid crystal display device according to claim 5, wherein the final protection film is formed of insulating inorganic material.

8. A liquid crystal display device according to claim 5, wherein the final protection film is formed of insulating organic material.

9. A liquid crystal display device, comprising:
a pair of substrates;
a plurality of spacers interposed between the pair of substrates to form a clearance between the pair of substrates; and
liquid crystal sealed between the pair of substrates;
wherein the spacers are formed to satisfy a following inequality, $$x/d > (1/q_{60} - 1/q_{-20})/(1/q_{60})$$

where a distribution density of the spacers is n (cm$^{-2}$), an amount of displacement when a force of 9.8/n (N) is applied to one spacer is x, an average distance between the pair of substrates is d, a density of the liquid crystal at 60° C. is $q_{60}$ (g/cm$^3$), and the density of the liquid crystal at −20° C. is $q_{-20}$ (g/cm$^3$).

10. A liquid crystal display device, comprising:
a pair of substrates;
a plurality of spacers interposed between the pair of substrates to form a clearance between the pair of substrates; and
liquid crystal sealed between the pair of substrates;
wherein the spacers are formed to satisfy a following inequality, $$x/d > 2 \times (1/q_{60} - 1/q_{20})/(1/q_{60})$$

where a distribution density of the spacers is n (cm$^{-2}$), an amount of displacement when a force of 9.8/n (N) is applied to one spacer is x, an average distance between the pair of substrates is d, a density of the liquid crystal at 60° C. is $q_{60}$ (g/cm$^3$), and the density of the liquid crystal at 20° C. is $q_{20}$ (g/cm$^3$).

11. A liquid crystal display device in which liquid crystal is sealed between a pair of substrates,
wherein first spacers for deciding a cell gap between the substrates in a normal state and second spacers having a height lower than the first spacers are provided between the pair of substrates, and
wherein the first spacers are formed of a material which displaces easily in a small load range and the second spacers are formed of a material which does not displace easily in a large load range.

12. A liquid crystal display device in which liquid crystal is sealed between a pair of substrates,
wherein first spacers for deciding a cell gap between the substrates in a normal state and second spacers having a height lower than the first spacers are provided between the pair of substrates, and
wherein a density of the first spacers is higher than the rate of six pixel to one and a density of the second spacers is lower than the rate of twelve pixels to one.

13. A liquid crystal display device in which liquid crystal is sealed between a pair of substrates,
wherein first spacers for deciding a cell gap between the substrates in a normal state and second spacers having a height lower than the first spacers are provided between the pair of substrates, and
further comprising projections having a height lower than the second spacers and dividing alignment of a liquid crystal.

14. A color filter substrate for a liquid crystal display device, comprising:
a substrate;
first spacers formed above one surface of the substrate; and
second spacers formed above the surface, and having a height lower than the first spacers,
wherein a density of the first spacers is higher than a rate of six pixels to one and a density of the second spacers is lower than a rate of twelve pixels to one.

15. A color filter substrate for a liquid crystal display device, comprising:
a substrate;
first spacers formed above one surface of the substrate;
second spacers formed above the surface, and having a height lower than the first spacers; and
projections having a height lower than the second spacers and dividing alignment of a liquid crystal.

16. A color filter substrate for liquid crystal display device, comprising:
a substrate;
first spacers formed above one surface of the substrate; and
second spacers formed above the surface, and having a height lower than the first spacers,
wherein the first spacers and the second spacers are formed over a black matrix formed on the substrate, and
wherein the first spacers and the second spacers are formed on a common electrode, and the first spacers are formed by laminating a first resin film and a second resin film, and second spacers are formed of any one of the first resin film and the second resin film.

17. A liquid crystal display device in which liquid crystal is sealed between a pair of substrates,
wherein first spacers for deciding a cell gap between the substrates in a normal state and second spacers, which are separate from the first spacers seen perpendicular to a planar direction of the substrates, having a height lower than the first spacers are provided between the pair of substrates,
wherein the first spacers and the second spacers are formed over a black matrix formed on one of the pair of the substrates, and
wherein the first spacers and the second spacers are formed on a common electrode, and the first spacers are formed by laminating a first resin film and a second resin film, and second spacers are formed of any one of the first resin film and the second resin film.

* * * * *